(12) United States Patent
Furusato et al.

(10) Patent No.: US 10,782,566 B2
(45) Date of Patent: *Sep. 22, 2020

(54) LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yoshimasa Furusato, Chiba (JP); Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/501,438

(22) PCT Filed: Jun. 30, 2015

(86) PCT No.: PCT/JP2015/068745
§ 371 (c)(1),
(2) Date: Feb. 3, 2017

(87) PCT Pub. No.: WO2016/021333
PCT Pub. Date: Feb. 11, 2016

(65) Prior Publication Data
US 2017/0227820 A1    Aug. 10, 2017

(30) Foreign Application Priority Data
Aug. 4, 2014 (JP) .................................. 2014-158464

(51) Int. Cl.
*G02F 1/1333* (2006.01)
*G02F 1/1337* (2006.01)
(Continued)

(52) U.S. Cl.
CPC ........ *G02F 1/133723* (2013.01); *C09K 19/08* (2013.01); *C09K 19/12* (2013.01); *C09K 19/20* (2013.01); *C09K 19/30* (2013.01); *C09K 19/3003* (2013.01); *C09K 19/3066* (2013.01); *C09K 19/3068* (2013.01); *C09K 19/34* (2013.01); *C09K 19/3402* (2013.01); *C09K 19/42* (2013.01); *C09K 19/56* (2013.01); *G02F 1/13* (2013.01); *G02F 1/1337* (2013.01); *G02F 1/1362* (2013.01); *G02F 1/133788* (2013.01); *C09K 2019/0466* (2013.01);
(Continued)

(58) Field of Classification Search
CPC ............ C09K 19/3066; C09K 19/3402; C09K 19/3003; C09K 19/12; C09K 19/20; C09K 19/3068; C09K 2019/3422; C09K 2019/3004; C09K 2019/301; C09K 2019/3016; C09K 2019/3019; C09K 2019/3009; C09K 2019/3071; C09K 2019/3025; C09K 2019/3078; C09K 2019/3006; C09K 2019/3083; C09K 2019/3021; G02F 1/1333; G02F 1/1362; G02F 1/133788; G02F 1/133723
USPC .......................... 252/299.01, 299.6; 428/1.1
See application file for complete search history.

(56) References Cited

U.S. PATENT DOCUMENTS 6,040,890 A * 3/2000 Sawada .............. C09K 19/0216
                                                              252/299.01
6,063,829 A    5/2000 Endou et al.
(Continued)

FOREIGN PATENT DOCUMENTS

CN    102893210      1/2013
JP    H09-297313    11/1997
(Continued)

OTHER PUBLICATIONS

Yasumasa Takeuchi, "Liquid Crystal Alignment Control Technology to Realize 'Rubbingless'," EKISHO, vol. 3, No. 4, 1999, with English translation thereof, pp. 1-25.
(Continued)

*Primary Examiner* — Geraldina Visconti
(74) *Attorney, Agent, or Firm* — JCIPRNET

(57) ABSTRACT

The subject is to provide liquid crystal display device having a short response time, a large voltage holding ratio, a low threshold voltage, a large contrast ratio, a long service life and a small flicker rate.

The liquid crystal display device having a liquid crystal alignment film formed on the opposing surfaces of a pair of substrates, and a liquid crystal composition therebetween, wherein the liquid crystal alignment film includes a polymer derived from a polyamic acid having a photodegradable group, and the liquid crystal composition includes at least one compound represented by formula (1) as a first component:

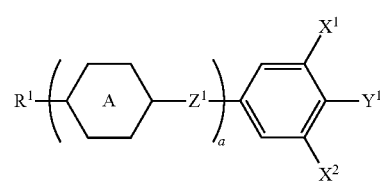

(1)

$R^1$ is alkyl having 1 to 12 carbons or the like; ring A is 1,4-cyclohexylene, 1,4-phenylene or the like; $Z^1$ is a single bond or the like; $X^1$ and $X^2$ are hydrogen or fluorine; $Y^1$ is fluorine or the like; and a is 1, 2, 3 or 4.

19 Claims, No Drawings

(51) Int. Cl.
  *C09K 19/12* (2006.01)
  *C09K 19/20* (2006.01)
  *C09K 19/34* (2006.01)
  *C09K 19/30* (2006.01)
  *C09K 19/08* (2006.01)
  *C09K 19/42* (2006.01)
  *G02F 1/13* (2006.01)
  *C09K 19/56* (2006.01)
  *G02F 1/1362* (2006.01)
  *C09K 19/04* (2006.01)

(52) U.S. Cl.
  CPC .. *C09K 2019/123* (2013.01); *C09K 2019/301* (2013.01); *C09K 2019/3004* (2013.01); *C09K 2019/3006* (2013.01); *C09K 2019/3009* (2013.01); *C09K 2019/3016* (2013.01); *C09K 2019/3019* (2013.01); *C09K 2019/3021* (2013.01); *C09K 2019/3025* (2013.01); *C09K 2019/3071* (2013.01); *C09K 2019/3077* (2013.01); *C09K 2019/3078* (2013.01); *C09K 2019/3083* (2013.01); *C09K 2019/3422* (2013.01)

(56) References Cited

U.S. PATENT DOCUMENTS

| | | | |
|---|---|---|---|
| 9,771,519 B2* | 9/2017 | Katano | G02F 1/134363 |
| 2006/0061719 A1 | 3/2006 | Tomioka et al. | |
| 2012/0069275 A1 | 3/2012 | Saito | |
| 2015/0225647 A1 | 8/2015 | Furusato et al. | |
| 2017/0114277 A1* | 4/2017 | Furusato | C09K 19/3066 |
| 2017/0199432 A1* | 7/2017 | Furusato | G02F 1/133723 |

FOREIGN PATENT DOCUMENTS

| | | |
|---|---|---|
| JP | 2004-206091 | 7/2004 |
| JP | 2005-275118 | 10/2005 |
| JP | 2005-275364 | 10/2005 |
| JP | 2006-171304 | 6/2006 |
| JP | 2010049230 | 3/2010 |
| WO | 2005083504 | 9/2005 |
| WO | 2010131594 | 11/2010 |
| WO | 2014045905 | 3/2014 |

OTHER PUBLICATIONS

"International Search Report (Form PCT/ISA/210) of PCT/JP2015/068745", dated Sep. 29, 2015, with English translation thereof, pp. 1-4.

"Office Action of Taiwan Counterpart Application," dated Oct. 16, 2018, with English translation thereof, p. 1-p. 14.

"Office Action of China Counterpart Application," dated Feb. 3, 2020, with English translation thereof, p. 1-p. 17.

* cited by examiner

LIQUID CRYSTAL DISPLAY DEVICE

CROSS-REFERENCE TO RELATED APPLICATION

This application is a 371 of international application of PCT application serial no. PCT/JP2015/068745, filed on Jun. 30, 2015, which claims the priority benefit of Japan application no. 2014-158464, filed on Aug. 4, 2014. The entirety of each of the abovementioned patent applications is hereby incorporated by reference herein and made a part of this specification.

TECHNICAL FIELD

The invention relates to a liquid crystal display device, and a liquid crystal composition having positive dielectric anisotropy and a liquid crystal alignment film, those of which are used for the device. It relates especially to a liquid crystal display device having a mode such as TN, OCB, IPS, FFS or FPA. It also relates to a liquid crystal display device with a polymer sustained alignment type.

TECHNICAL BACKGROUND

In a liquid crystal display device, a classification based on an operating mode for liquid crystal molecules includes modes such as PC (phase change), TN (twisted nematic), STN (super twisted nematic), ECB (electrically controlled birefringence), OCB (optically compensated bend), IPS (in-plane switching), VA (vertical alignment), FFS (fringe field switching) and FPA (field-induced photo-reactive alignment). A classification based on a driving mode in the device includes PM (passive matrix) and AM (active matrix). The PM is classified into static, multiplex and so forth, and the AM is classified into TFT (thin film transistor), MIM (metal-insulator-metal) and so forth. The TFT is further classified into amorphous silicon and polycrystal silicon. The latter is classified into a high temperature type and a low temperature type depending on the production process. A classification based on a light source includes a reflection type utilizing natural light, a transmission type utilizing a backlight and a semi-transmission type utilizing both natural light and a backlight.

The liquid crystal display device includes a liquid crystal composition having a nematic phase. This composition has suitable characteristics. An AM device having good characteristics can be obtained by an improvement of the characteristics of this composition. Table 1 below summarizes the relationship between these two characteristics. The characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Response time that is one millisecond shorter than that of other devices is desirable. Thus a small viscosity of the composition is desirable. A small viscosity at a low temperature is more desirable.

TABLE 1

Characteristics of Compositions and AM Devices

| No. | Characteristics of Compositions | Characteristics of AM Devices |
|---|---|---|
| 1 | a wide temperature range of a nematic phase | a wide temperature range in which the device can be used |
| 2 | a small viscosity | a short response time |
| 3 | a suitable optical anisotropy | a large contrast ratio |
| 4 | a large positive or negative dielectric anisotropy | a low threshold voltage and low power consumption, a large contrast ratio |
| 5 | a large specific resistance | a large voltage holding ratio and a large contrast ratio |
| 6 | a high stability to ultraviolet light and heat | a long service life |
| 7 | a large elastic constant | a large contrast ratio and a short response time |

The optical anisotropy of the composition relates to the contrast ratio of the device. A large optical anisotropy or a small optical anisotropy, namely a suitable optical anisotropy, is necessary in accordance with the mode of the device. The product (Δn×d) of the optical anisotropy (Δn) of the composition and the cell gap (d) of the device is designed so as to maximize the contrast ratio. A suitable value of the product depends on the type of operating mode. This value is approximately 0.45 micrometer for a device having a mode such as TN. This value is in the range of approximately 0.20 micrometer to approximately 0.30 micrometer for a device having an IPS mode or an FFS mode. In these cases, a composition having a large optical anisotropy is desirable for a device having a small cell gap. A large dielectric anisotropy of the composition contributes to a low threshold voltage, low power consumption and a large contrast ratio of the device. A large dielectric anisotropy is thus desirable. The stability of the composition to ultraviolet light and heat relates to the service life of the device. The device has a long service life when the stability is high. These types of characteristics are desirable for an AM device used for a liquid crystal projector, a liquid crystal television and so forth.

A liquid crystal composition including a polymer is used for a liquid crystal display device with a polymer sustained alignment (PSA) type. First, a composition to which a small amount of a polymerizable compound has been added is poured into a device. Next, the composition is irradiated with ultraviolet light, while a voltage is applied between the substrates of this device. The polymerizable compound is polymerized to give a network structure of a polymer in the composition. In this composition, the polymer makes it possible to adjust the orientation of liquid crystal molecules, and thus the response time of the device is decreased and image burn-in is improved. Such effects of the polymer can be expected for a device having a mode such as TN, ECB, OCB, IPS, VA, FFS or FPA.

When a liquid crystal display device is used for a long time, flicker sometimes occurs in the display screen. The flicker relates to image burn-in. It is presumed that the flicker occurs due to the formation of a potential difference between positive and negative frames when the device is driven by AC current. An improvement has been tried in order to decrease the occurrence of the flicker in view of the structure of the device or the components of the composition.

A composition having positive dielectric anisotropy is used for an AM device having a TN mode. A composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device with a polymer sustained alignment (PSA) type. An example of a liquid crystal composition having positive dielectric anisotropy is disclosed in Patent document No. 1 described below.

An adjustment of the orientation of liquid crystal molecules is necessary for uniform display characteristics in these liquid crystal display devices. That is, specifically, to orient the liquid crystal molecules on the substrate uniformly in one direction, and to give a uniform angle of inclination (pretilt angle) from the substrate plane to the liquid crystal molecules, for instance. A liquid crystal alignment film plays such a role. The liquid crystal alignment film is one of important elements with regard to display quality of the liquid crystal display device. The role of the liquid crystal alignment film is becoming important year after year as the quality of the display device is improved.

The liquid crystal alignment film is prepared from a liquid crystal aligning agent. A liquid crystal aligning agent used mainly is a solution (varnish) of a polyamic acid or a soluble polyimide dissolved in an organic solvent. After this solution has been applied to a substrate, the coating film is heated to give a polyimide-type liquid crystal alignment film. At present, a rubbing method is industrially used to give a function for orientation of the liquid crystal molecules to this alignment film (alignment treatment). The rubbing method is a treatment in which the surface of the liquid crystal alignment film is rubbed in one direction using a cloth planted with fibers such as nylon, rayon and polyester. This method makes it possible to orient liquid crystal molecules uniformly.

In contrast, a photoalignment method has been proposed in which alignment treatment is carried out by irradiation of a photo-reactive film with light, and this method includes photodegradation, photoisomerization, photodimerization and photobridging (for example, see Non-Patent document No. 1 and Patent documents Nos. 2 to 6). The photoalignment method has advantages such that the method gives a high orientation uniformity in comparison with the rubbing method, and the film is not injured because of the non-contact alignment method, and the cause that generates a poor display of a liquid crystal display device, such as dusts or static electricity, can be decreased.

Starting materials used for a photoreactive liquid crystal alignment film (hereinafter, sometimes abbreviated to "a photoalignment film") have been greatly studied. It has been reported that a polyimide, where a tetracarboxylic acid dianhydride, especially a cyclobutanetetracarboxylic acid dianhydride, is used as a starting material, orients liquid crystal molecules uniformly and stably (for example, see Patent document No. 2). In this method, a film formed on a substrate is irradiated with ultraviolet light, causing a chemical change to the polyimide and thus giving a function for orientation of the liquid crystal molecules in one direction. However, a photoalignment film prepared by such a method has a possibility that the voltage holding ratio is decreased because of an increase in impurity ions for instance, and thus the electrical characteristics are inferior to those of an alignment film subjected to rubbing. A molecular structure of the polyimide has been variously studied to solve this issue (for example, see Patent document Nos. 2 and 3).

The possibility has been pointed out that the photoalignment method has a smaller anchoring energy than the rubbing method, and is inferior in the orientation of liquid crystal molecules, and thus the response time is increased and the image burn-in is caused in a liquid crystal display device. We have found a method as described, for example, in Patent document No. 5 that after a polyamic acid has been applied to a substrate and irradiated with light, it is calcined, giving a photoalignment film having a large anchoring energy. However, there is a possibility that the light-transmittance is low and the brightness of a liquid crystal display device is decreased, in a photoalignment film using a polyamic acid prepared from a diamine having an azo group as a starting material.

PRIOR ART

Patent Document

Patent document No. 1: WO 2010-131594 A.
Patent document No. 2: JP 09-297313 A (1997).
Patent document No. 3: JP 2004-206091 A.
Patent document No. 4: WO 2005-083504 A.
Patent document No. 5: JP 2005-275364 A.
Patent document No. 6: JP 2006-171304 A.

Non-Patent Document

Non-Patent document No. 1: EKISHO (in English, liquid crystals) Vol. 3, No. 4, page 262 (1999).

SUMMARY OF THE INVENTION

Subject to be Solved by the Invention

One of the aims of the invention is to provide a liquid crystal display device that has characteristics such as a short response time, a large voltage holding ratio, a low threshold voltage, a large contrast ratio, a long service life and a small flicker rate. Another aim is to provide a liquid crystal composition used for such a device. A further aim is to provide a liquid crystal composition that satisfies at least one of characteristics such as a high maximum temperature of a nematic phase, a low minimum temperature of a nematic phase, a small viscosity, a suitable optical anisotropy, a large positive dielectric anisotropy, a large specific resistance, a high stability to ultraviolet light, a high stability to heat and a large elastic constant. An additional aim is to provide a liquid crystal composition that is suitably balanced between at least two of the characteristics.

Means for Solving the Subject

The invention relates to a liquid crystal display device having an electrode group formed on one or both of a pair of substrates that are opposed to each other, and a plurality of active devices connected to the electrode group, and a liquid crystal alignment film formed on the opposing surfaces of the pair of substrates, and a liquid crystal composition sandwiched in between the pair of substrates, wherein the liquid crystal alignment film includes a polymer derived from a polyamic acid having a photodegradable group, and the liquid crystal composition includes at least one compound represented by formula (1) as a first component, and relates to the liquid crystal composition included in the device and the liquid crystal alignment film included in the device:

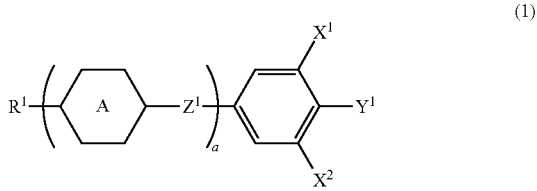

(1)

in formula (1), $R^1$ is alkyl having 1 to 12 carbons, alkoxy having 1 to 12 carbons or alkenyl having 2 to 12 carbons; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine or alkenyloxy having 2 to 12 carbons in which at least one hydrogen has been replaced by fluorine or chlorine; and a is 1, 2, 3 or 4.

Effect of the Invention

One of the advantages of the invention is to provide a liquid crystal display device that has characteristics such as a short response time, a large voltage holding ratio, a low threshold voltage, a large contrast ratio, a long service life and a small flicker rate. Another advantage is to provide a liquid crystal composition used for such a device. A further advantage is to provide a liquid crystal composition that satisfies at least one of characteristics such as a high maximum temperature of a nematic phase, a low minimum temperature of a nematic phase, a small viscosity, a suitable optical anisotropy, a large positive dielectric anisotropy, a large specific resistance, a high stability to ultraviolet light, a high stability to heat and a large elastic constant. An additional advantage is to provide a liquid crystal composition that is suitably balanced between at least two of the characteristics.

EMBODIMENT TO CARRY OUT THE INVENTION

The usage of the terms in this specification and claims is as follows. The terms "liquid crystal composition" and "liquid crystal display device" are sometimes abbreviated to "composition" and "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, and for a compound having no liquid crystal phases but being mixed to a composition for the purpose of adjusting the characteristics, such as the temperature range of a nematic phase, the viscosity and the dielectric anisotropy. This compound has a six-membered ring such as 1,4-cyclohexylene or 1,4-phenylene, and its molecular structure is rod-like. "Polymerizable compound" is a compound that is added to a composition in order to form a polymer in it. A compound represented by formula (1) is sometimes abbreviated to "compound (1)." At least one compound selected from the group of compounds represented by formula (1) is sometimes abbreviated to "compound (1)." "Compound (1)" means one compound, a mixture of two compounds or a mixture of three or more compounds represented by formula (1). This applies to a compound represented by another formula.

A liquid crystal composition is prepared by mixing a plurality of liquid crystal compounds. The ratio of a liquid crystal compound (content) is expressed as a percentage by weight (% by weight) based on the weight of the liquid crystal composition. An additive such as an optically active compound, an antioxidant, an ultraviolet light absorber, a coloring matter, an antifoaming agent, a polymerizable compound, a polymerization initiator and a polymerization inhibitor is added to this liquid crystal composition as required. The ratio of the additive (added amount) is expressed as a percentage by weight (% by weight) based on the weight of the liquid crystal composition in the same manner as with the liquid crystal compound. Weight parts per million (ppm) is sometimes used. The ratio of the polymerization initiator and the polymerization inhibitor is exceptionally expressed on the basis of the weight of the polymerizable compound.

"A higher limit of the temperature range of a nematic phase" is sometimes abbreviated to "the maximum temperature." "A lower limit of the temperature range of a nematic phase" is sometimes abbreviated to "the minimum temperature." That "a voltage holding ratio is large" means that a device has a large voltage holding ratio at a temperature close to the maximum temperature of a nematic phase as well as at room temperature in the initial stages, and that the device has a large voltage holding ratio at a temperature close to the maximum temperature of a nematic phase as well as at room temperature, after it has been used for a long time. The expression "increase the dielectric anisotropy" means that its value is positively increased when the composition has positive dielectric anisotropy, and that its value is negatively increased when the composition has negative dielectric anisotropy.

The expression "at least one 'A' may be replaced by 'B'" means that the number of 'A' is arbitrary. The position of 'A' is arbitrary when the number of 'A' is one, and the positions can also be selected without restriction when the number of 'A' is two or more. The same rule also applies to the expression "at least one 'A' has been replaced by 'B'." For example, the expression "in the alkyl, at least one —$CH_2$— may be replaced by —O— or —S—" includes a group such as —$OCH_3$, —$CH_2OCH_3$, —$CH_2OCH_2CH_2OCH_3$, —$SCH_2CH_2CH_3$, —$CH_2CH_2SCH_3$ and —$CH_2OCH_2CH_2SCH_3$.

The symbol for the terminal group, $R^1$, is used for a plurality of compounds in the chemical formulas of component compounds. In these compounds, two groups represented by two arbitrary $R^1$ may be the same or different. In one case, for example, $R^1$ of compound (1-1) is ethyl and $R^1$ of compound (1-2) is ethyl. In another case, $R^1$ of compound (1-1) is ethyl and $R^1$ of compound (1-2) is propyl. The same rule applies to symbols such as other terminal groups. In formula (1), two of ring A are present when a is 2. In this compound, two groups represented by two of ring A may be the same or different. The same rule applies to two arbitrary of ring A, when a is greater than 2. The same rule also applies to symbols such as $Z^2$ and ring B.

2-Fluoro-1,4-phenylene means the two divalent groups described below. Fluorine may be facing left (L) or facing right (R) in a chemical formula. The same rule also applies to an asymmetric divalent group such as tetrahydropyran-2,5-diyl. The same rule also applies to a bonding group such as carbonyloxy (—COO— and —OCO—).

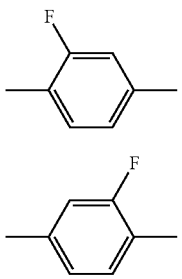

(L)

(R)

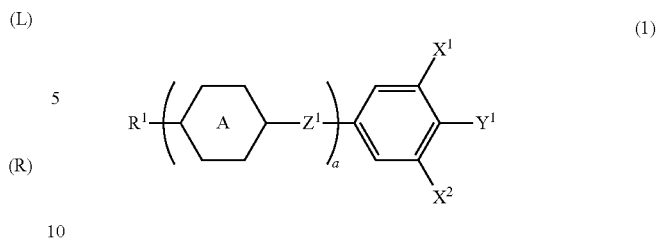

(1)

A liquid crystal alignment film used for the liquid crystal display device of the invention includes a polymer derived from at least one of a polyamic acid having a photoreactive group, especially a photodegradable group and the derivatives of the polyamic acid. That is to say, the liquid crystal alignment film is prepared from a polyamic acid having a photoreactive group or its derivatives. At least one of a tetracarboxylic acid dianhydride having a photoreactive group or a diamine having a photoreactive group is an essential component for introducing the photoreactive group to the polymer. Another component is any other tetracarboxylic acid dianhydride or any other diamine. Any other tetracarboxylic acid dianhydride includes aliphatic tetracarboxylic acid dianhydrides, alicyclic tetracarboxylic acid dianhydrides and aromatic tetracarboxylic acid dianhydrides. Any other diamine includes diamines having no side chains, diamines having a side chain and dihydrazides. The derivative of the polyamic acid includes soluble polyimides, polyamic acid esters, polyhydrazide acids, polyamic acid amides and polyhydrazide acid-amide acids.

Specific examples include the following: (1) polyimides formed by the cyclodehydration of all of amino and carboxyl in a polyamic acid. (2) partial polyimides formed by the partial cyclodehydration of a polyamic acid. (3) polyamic acid esters formed by the transformation of the carboxyl of a polyamic acid to its ester. (4) polyamic acid-polyamide copolymers formed by the reaction of a mixture of a tetracarboxylic acid dianhydride and an organic dicarboxylic acid. (5) polyamidoimides formed by the partial or total cyclodehydration of the polyamic acid-polyamide copolymers. The polyamic acid or its derivatives may be one compound or a mixture of two or more compounds.

A polyamic acid having a photodegradable group or its derivatives is prepared by using a tetracarboxylic acid dianhydride having a photodegradable group (or a diamine having a photodegradable group) as a starting material. The term "tetracarboxylic acid dianhydride" may mean one compound, or a mixture of two or more tetracarboxylic acid dianhydrides. This rule applies to a diamine.

The invention includes the following items.

Item 1. A liquid crystal display device having an electrode group formed on one or both of a pair of substrates that are opposed to each other, and a plurality of active devices connected to the electrode group, and a liquid crystal alignment film formed on the opposing surfaces of the pair of substrates, and a liquid crystal composition sandwiched in between the pair of substrates, wherein the liquid crystal alignment film includes a polymer derived from a polyamic acid having a photodegradable group, and the liquid crystal composition includes at least one compound represented by formula (1) as a first component:

in formula (1), $R^1$ is alkyl having 1 to 12 carbons, alkoxy having 1 to 12 carbons or alkenyl having 2 to 12 carbons; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine or alkenyloxy having 2 to 12 carbons in which at least one hydrogen has been replaced by fluorine or chlorine; and a is 1, 2, 3 or 4.

Item 2. The liquid crystal display device according to item 1, wherein the first component is at least one compound selected from the group of compounds represented by formula (1-1) to formula (1-35):

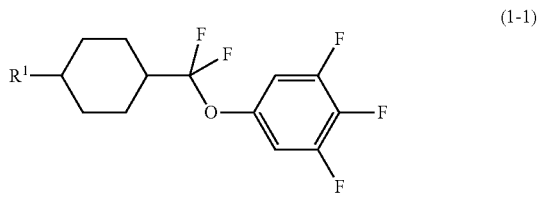

(1-1)

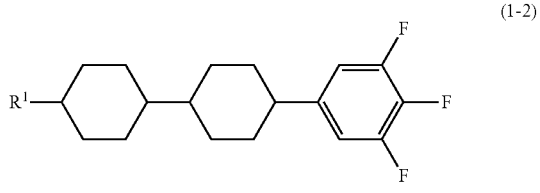

(1-2)

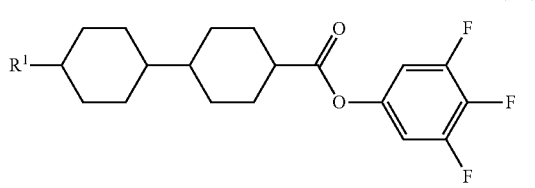

(1-3)

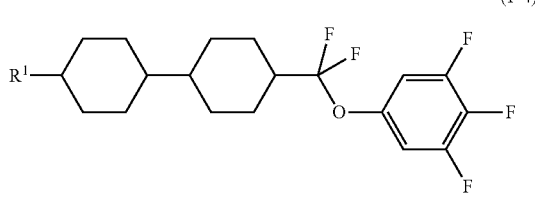

(1-4)

(1-5)
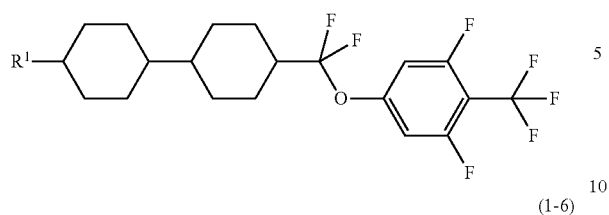
(1-6)
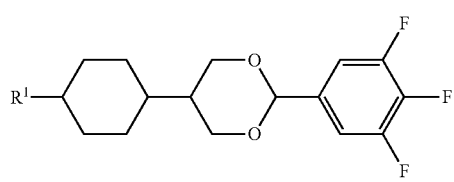
(1-7)
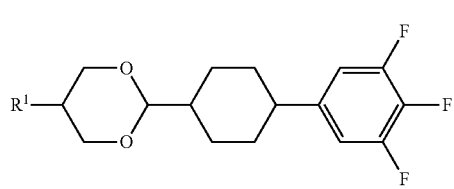
(1-8)
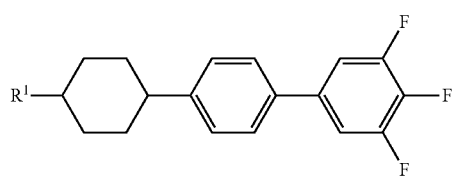
(1-9)
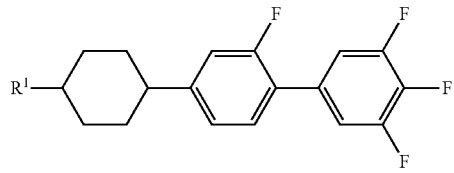
(1-10)
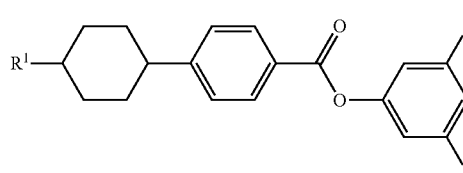
(1-11)
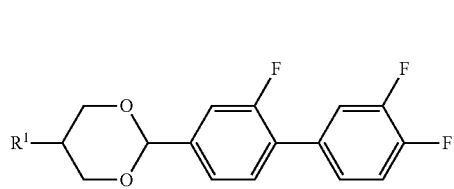
(1-12)
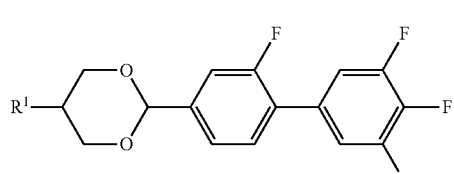
(1-13)
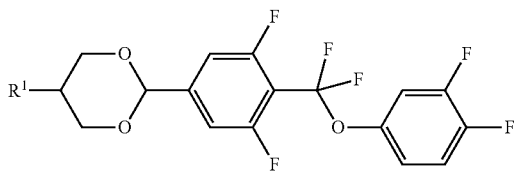
(1-14)
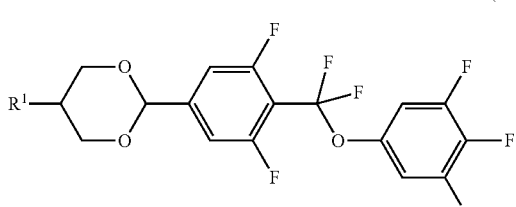
(1-15)
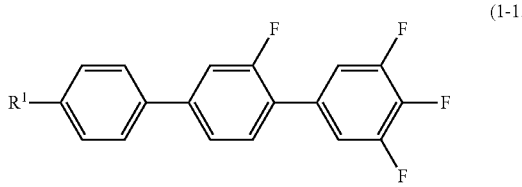
(1-16)
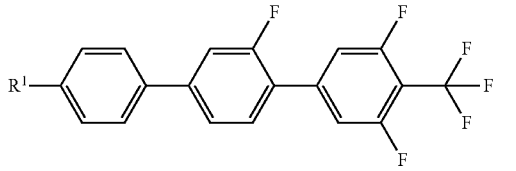
(1-17)
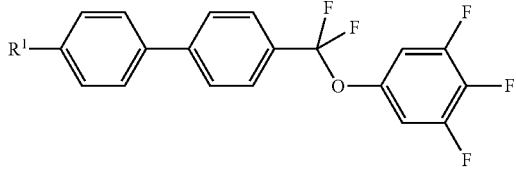
(1-18)
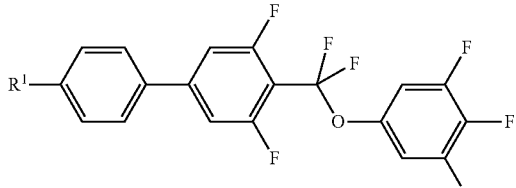
(1-19)

(1-20)
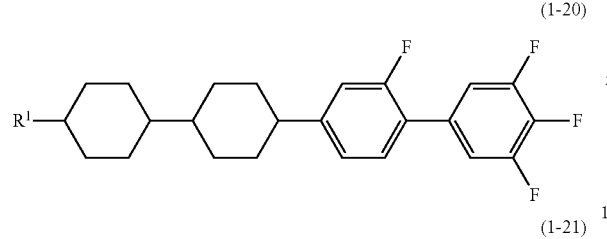
(1-21)
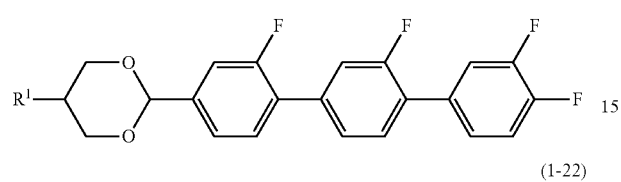
(1-22)
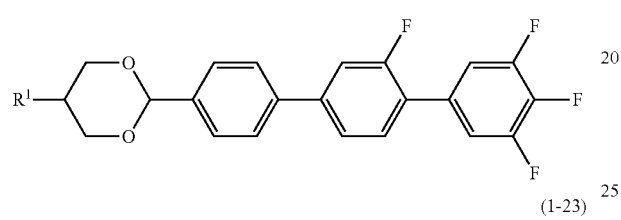
(1-23)
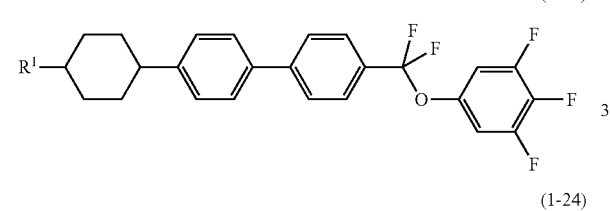
(1-24)
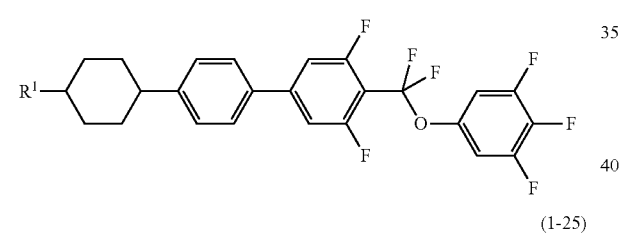
(1-25)
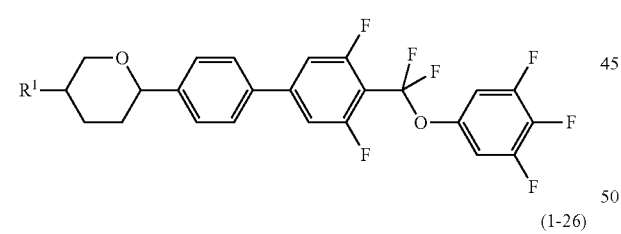
(1-26)
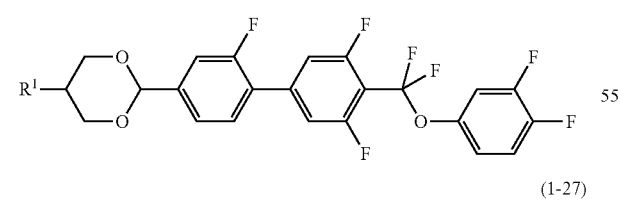
(1-27)
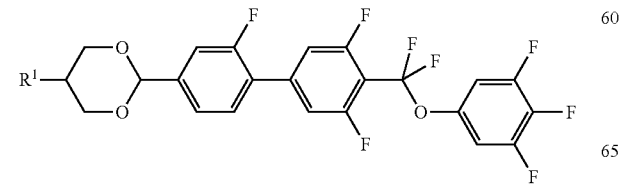
(1-28)
(1-29)
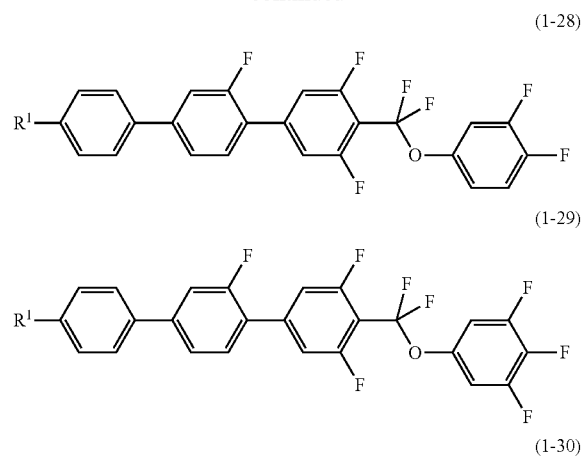
(1-30)
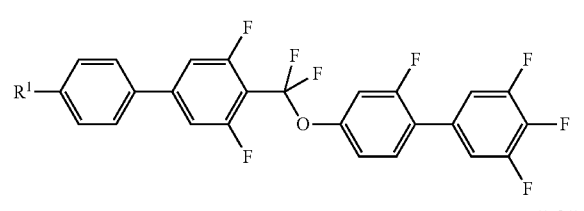
(1-31)
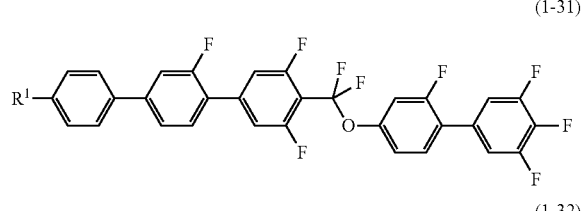
(1-32)
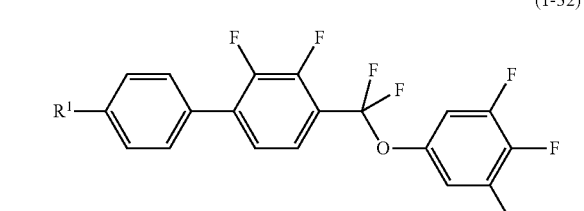
(1-33)
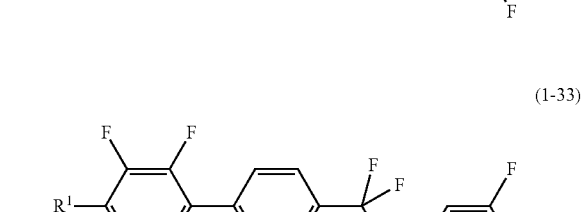
(1-34)
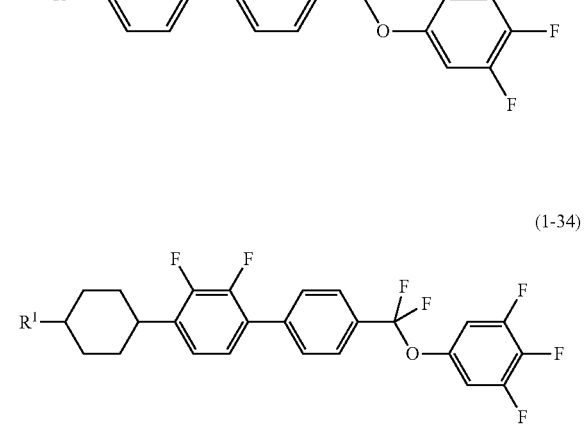

-continued (1-35)
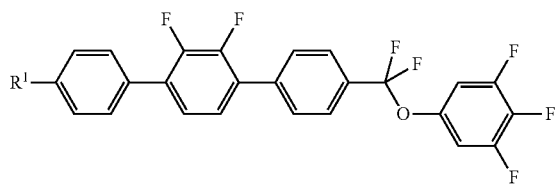

in formula (1-1) to formula (1-35), $R^1$ is alkyl having 1 to 12 carbons, alkoxy having 1 to 12 carbons or alkenyl having 2 to 12 carbons.

Item 3. The liquid crystal display device according to item 1 or 2, wherein the ratio of the first component is in the range of 10% by weight to 90% by weight based on the weight of the liquid crystal composition.

Item 4. The liquid crystal display device according to any one of items 1 to 3, wherein the liquid crystal composition includes at least one compound selected from the group of compounds represented by formula (2) as a second component:

(2)
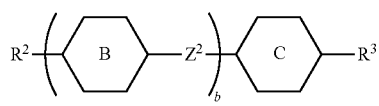

in formula (2), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine or alkenyl having 2 to 12 carbons in which at least one hydrogen has been replaced by fluorine or chlorine; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; and b is 1, 2 or 3.

Item 5. The liquid crystal display device according to item 4, wherein the second component is at least one compound selected from the group of compounds represented by formula (2-1) to formula (2-13):

(2-1)
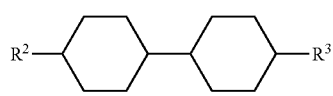

(2-2)
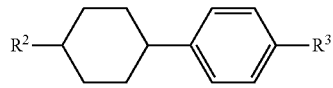

(2-3)
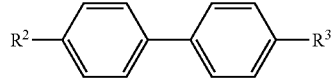

(2-4)
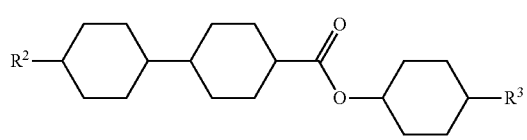

(2-5)

(2-6)

(2-7)
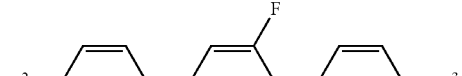

(2-8)

(2-9)
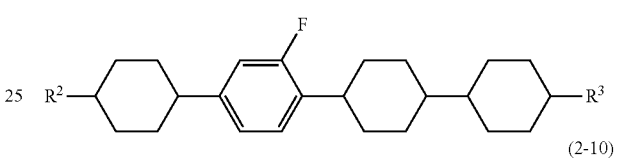

(2-10)
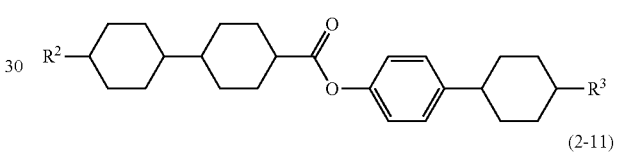

(2-11)
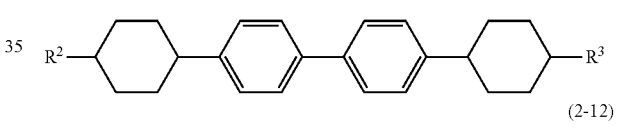

(2-12)
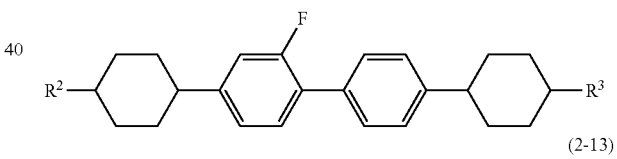

(2-13)
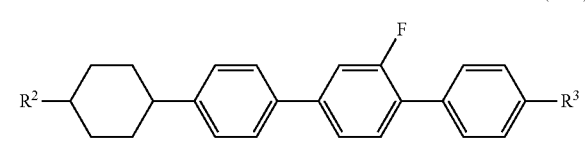

in formula (2-1) to formula (2-13), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine or alkenyl having 2 to 12 carbons in which at least one hydrogen has been replaced by fluorine or chlorine.

Item 6. The liquid crystal display device according to item 4 or 5, wherein the ratio of the second component is in the range of 10% by weight to 90% by weight based on the weight of the liquid crystal composition.

Item 7. The liquid crystal display device according to any one of items 1 to 6, wherein the liquid crystal composition includes at least one compound selected from the group of compounds represented by formula (3) as a third component:

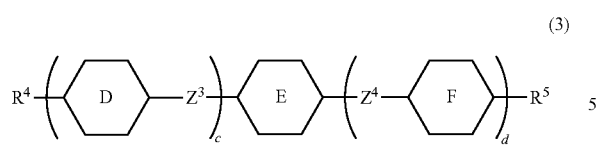 (3)

in formula (3), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine; ring D and ring F are independently 1,4-cyclohexylene, 1,4-cyclohexylene, 1,4-phenylene, 1,4-phenylene in which at least one hydrogen has been replaced by fluorine or chlorine or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, d is 0 or 1; and the sum of c and d is 3 or less.

Item 8. The liquid crystal display device according to item 7, wherein the third component is at least one compound selected from the group of compounds represented by formula (3-1) to formula (3-21):

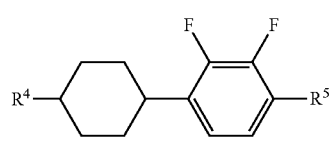 (3-1)

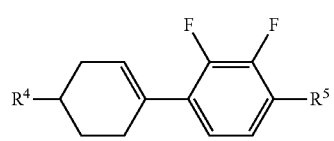 (3-2)

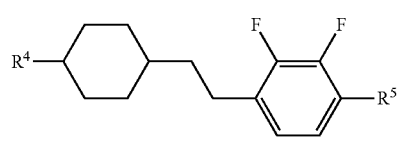 (3-3)

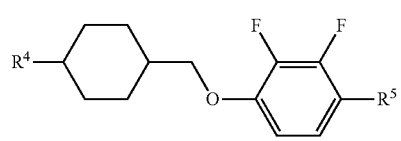 (3-4)

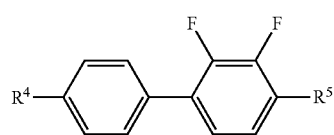 (3-5)

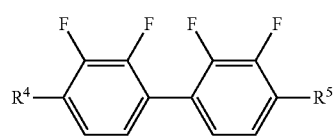 (3-6)

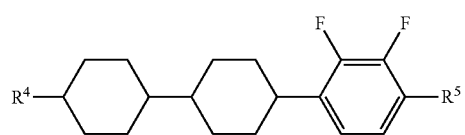 (3-7)

-continued

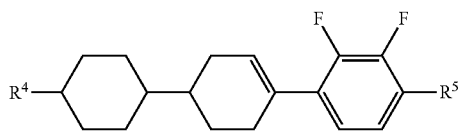 (3-8)

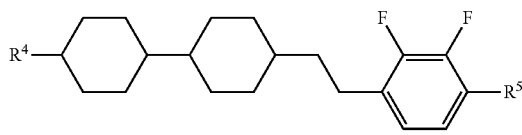 (3-9)

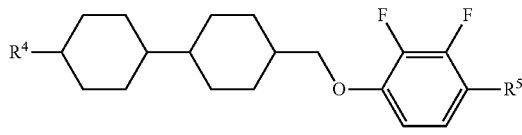 (3-10)

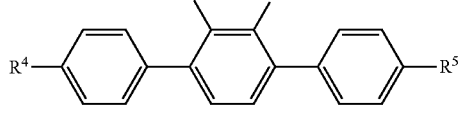 (3-11)

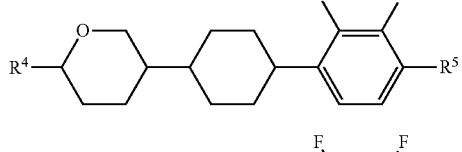 (3-12)

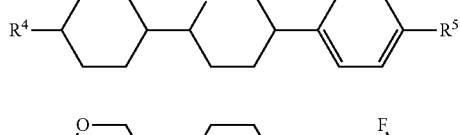 (3-13)

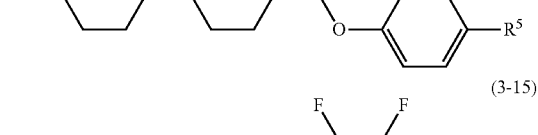 (3-14)

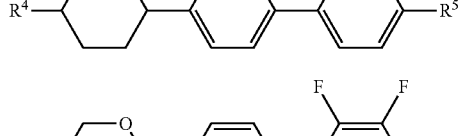 (3-15)

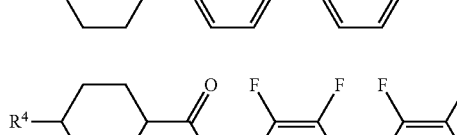 (3-16)

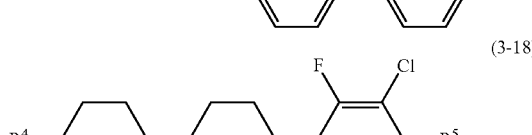 (3-17)

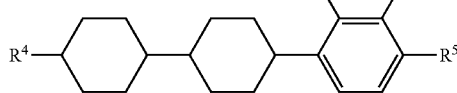 (3-18)

-continued

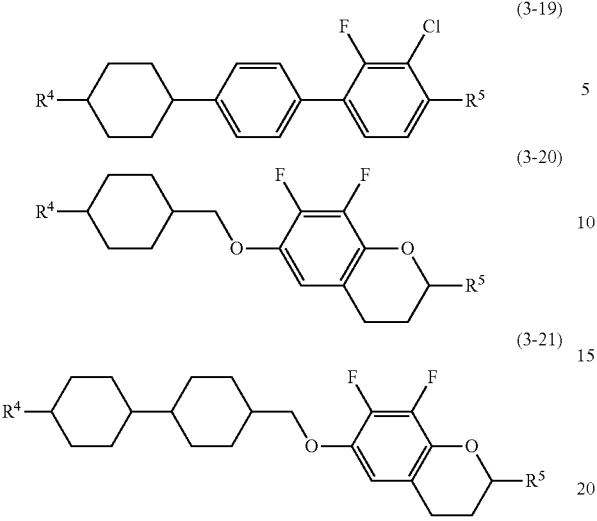

(3-19)
(3-20)
(3-21)

in formula (3-1) to formula (3-21), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine.

Item 9. The liquid crystal display device according to item 7 or 8, wherein the ratio of the third component is in the range of 3% by weight to 30% by weight based on the weight of the liquid crystal composition.

Item 10. The liquid crystal display device according to any one of items 1 to 9, wherein the liquid crystal alignment film includes a polymer derived from a polyamic acid having at least one photodegradable group selected from the group of groups represented by formula (XI-1) to formula (XI-16):

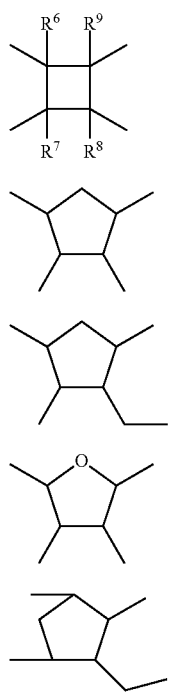

(XI-1)
(XI-2)
(XI-3)
(XI-4)
(XI-5)

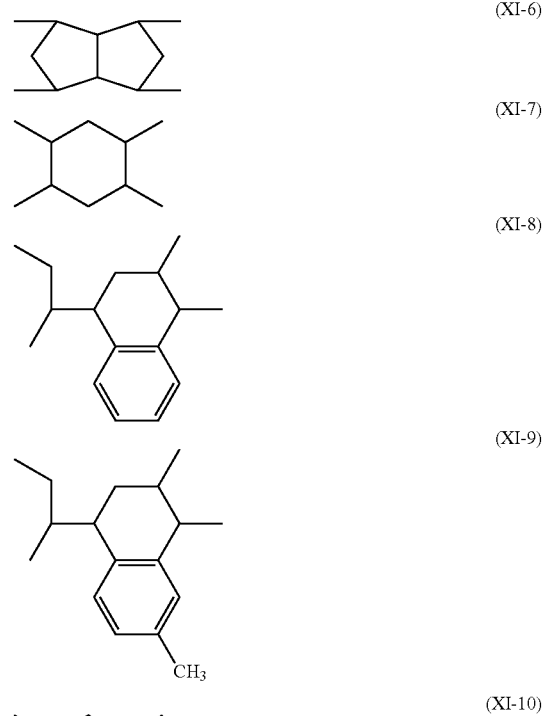

(XI-6)
(XI-7)
(XI-8)
(XI-9)
(XI-10)
(XI-11)
(XI-12)
(XI-13)
(XI-14)
(XI-15)
(XI-16)

in formula (XI-1) to formula (XI-16), $R^6$, $R^7$, $R^8$ and $R^9$ are independently hydrogen, halogen, alkyl having 1 to 6 carbons, alkenyl having 2 to 6 carbons, alkynyl having 2 to 6 carbons or phenyl; $R^{10}$ is hydrogen, alkyl having 1 to 10 carbons or cycloalkyl having 3 to 10 carbons; $n_1$ is an integer from 1 to 4; when $n_1$ is 1, $Z^5$ is —$SCH_2$—, and when $n_1$ is 2, 3 or 4, $Z^5$ is a single bond, —$SCH_2$— or —$CH_2S$—, with the proviso that at least one of $Z^5$ is —$SCH_2$— or —$CH_2S$—; and $Z^6$ is a group including an aromatic ring.

Item 11. The liquid crystal display device according to any one of items 1 to 9, wherein the liquid crystal alignment film includes a polymer derived from a compound represented by formula (XI-1-1) to formula (XI-1-5), formula (XI-2-1), formula (XI-3-1), formula (XI-6-1), formula (XI-7-1) or formula (XI-10-1):

(XI-1-1)
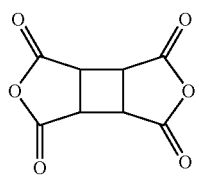

(XI-1-2)
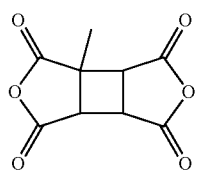

(XI-1-3)
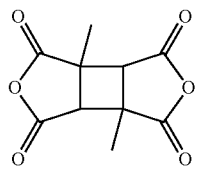

(XI-1-4)
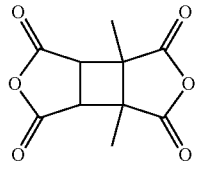

(XI-1-5)
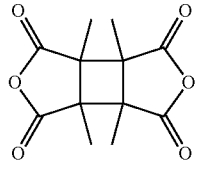

(XI-2-1)
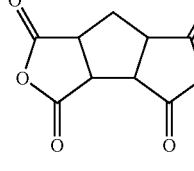

(XI-3-1)
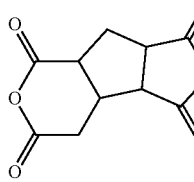

(XI-6-1)
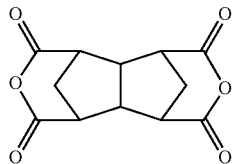

(XI-7-1)
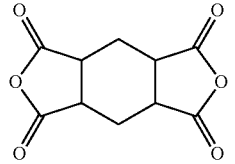

(XI-10-1)
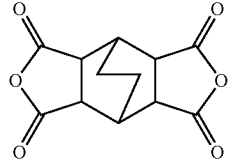

Item 12. The liquid crystal display device according to item 10 or 11, wherein the liquid crystal alignment film includes a polymer derived by further using at least one compound selected from the group of compounds represented by formula (DI-1) to formula (DI-15):

(DI-1)
$$H_2N\text{—}(CH_2)_k\text{—}NH_2$$

(DI-2)
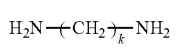

(DI-3)
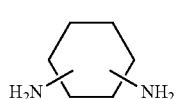

(DI-4)
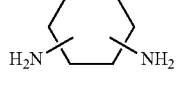

(DI-5)
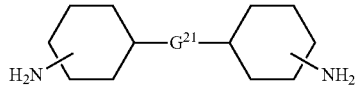

(DI-6)

(DI-7)
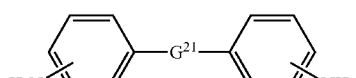

in formula (DI-1) to formula (DI-7), k is an integer from 1 to 12; $G^{21}$ is a single bond, —NH—, —O—, —S—, —S—S—, —$SO_2$—, —CO—, —CONH—, —CON($CH_3$)—, —NHCO—, —C($CH_3$)$_2$—, —C($CF_3$)$_2$—, —($CH_2$)$_m$—, —O—($CH_2$)$_m$—O—, —N($CH_3$)—($CH_2$)$_m$—N($CH_3$)—, —COO—, —COS— or —S—($CH_2$)$_m$—S—; m is an integer from 1 to 12; n is an integer from 1 to 5; $G^{22}$ is a single bond, —O—, —S—, —CO—, —C(CH$_3$)$_2$—, —C(CF$_3$)$_2$— or alkylene having 1 to 10 carbons; at least one hydrogen on the cyclohexane ring or the benzene ring may be replaced by fluorine, —CH$_3$, —OH, —CF$_3$, —CO$_2$H, —CONH$_2$ or benzyl, and in formula (DI-4), at least one hydrogen on the benzene ring may be replaced by the following monovalent group represented by formula (DI-4-a) to formula (DI-4-d);

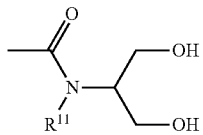
(DI-4-a)

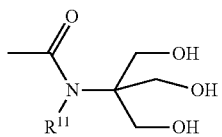
(DI-4-b)

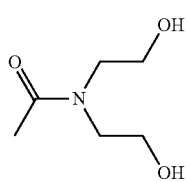
(DI-4-c)

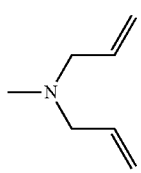
(DI-4-d)

$R^{11}$ is hydrogen or —CH$_3$; and a group can be bonded to any one of carbon atoms constituting a ring when the bonding position of the group is not fixed to any one of the carbon atoms, and —NH$_2$ is bonded to any one of the bonding positions on a cyclohexane ring or a benzene ring excluding the bonding position of $G^{21}$ or $G^{22}$; and

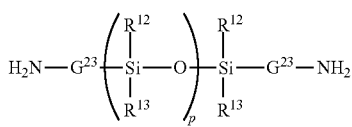
(DI-8)

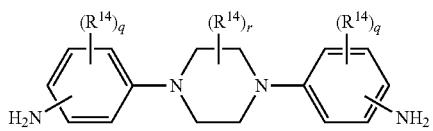
(DI-9)

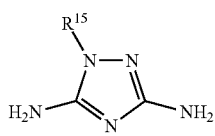
(DI-10)

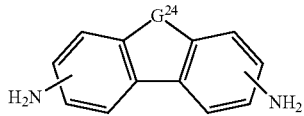
(DI-11)

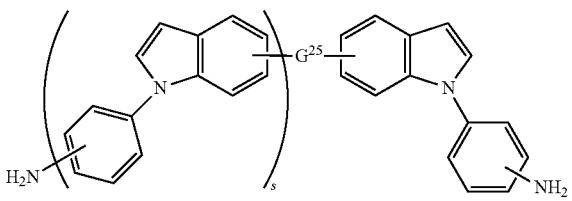
(DI-12)

in formula (DI-8) to formula (DI-12), $R^{12}$ and $R^{13}$ are independently alkyl having 1 to 3 carbons or phenyl; $G^{23}$ is alkylene having 1 to 6 carbons, phenylene or phenylene in which at least one hydrogen has been replaced by alkyl; p is an integer from 1 to 10; $R^{14}$ is alkyl having 1 to 5 carbons, alkoxy having 1 to 5 carbons or chlorine; q is an integer from 0 to 3; r is an integer from 0 to 4; $R^{15}$ is hydrogen, alkyl having 1 to 4 carbons, phenyl or benzyl; $G^{24}$ is —CH$_2$— or —NH—; $G^{25}$ is a single bond, alkylene having 2 to 6 carbons or 1,4-phenylene; s is 0 or 1; a group can be bonded to any one of carbon atoms constituting a ring when the bonding position of the group is not fixed to any one of the carbon atoms; and —NH$_2$ is bonded to any one of the bonding positions on a benzene ring; and

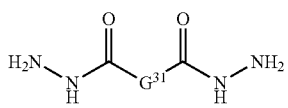
(DI-13)

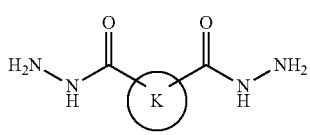
(DI-14)

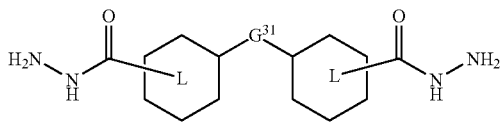
(DI-15)

in formula (DI-13) to formula (DI-15), $G^{31}$ is a single bond, alkylene having 1 to 20 carbons, —CO—, —O—, —S—, —SO$_2$—, —C(CH$_3$)$_2$— or —C(CF$_3$)$_2$—; ring K is a cyclohexane ring, a benzene ring or a naphthalene ring, and in these groups at least one hydrogen may be replaced by methyl, ethyl or phenyl; and ring L is a cyclohexane ring or a benzene ring, and in these groups at least one hydrogen may be replaced by methyl, ethyl or phenyl.

Item 13. The liquid crystal display device according to item 10 or 11, wherein the liquid crystal alignment film includes a polymer derived by further using a compound selected from the group of compounds represented by formula (DI-1-3), formula (DI-4-1), formula (DI-5-1), formula (DI-5-5), formula (DI-5-9), formula (DI-5-12), formula (DI-5-22), formula (DI-5-28), formula (DI-5-30), formula (DI-5-31), formula (DI-7-3), formula (DI-9-1), formula (DI-13-1), formula (DI-13-2), formula (DI-14-1) and formula (DI-14-2):

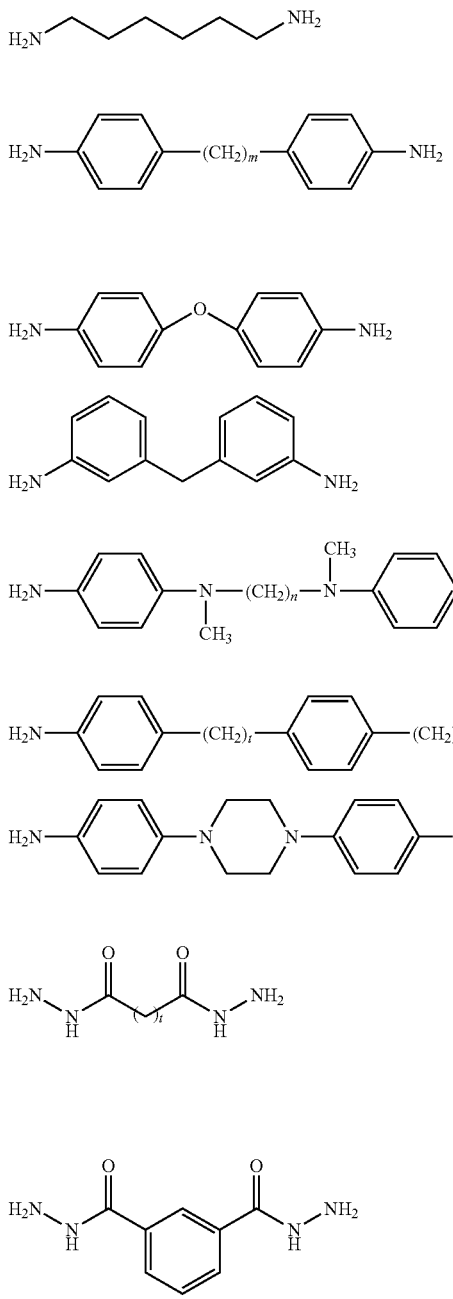
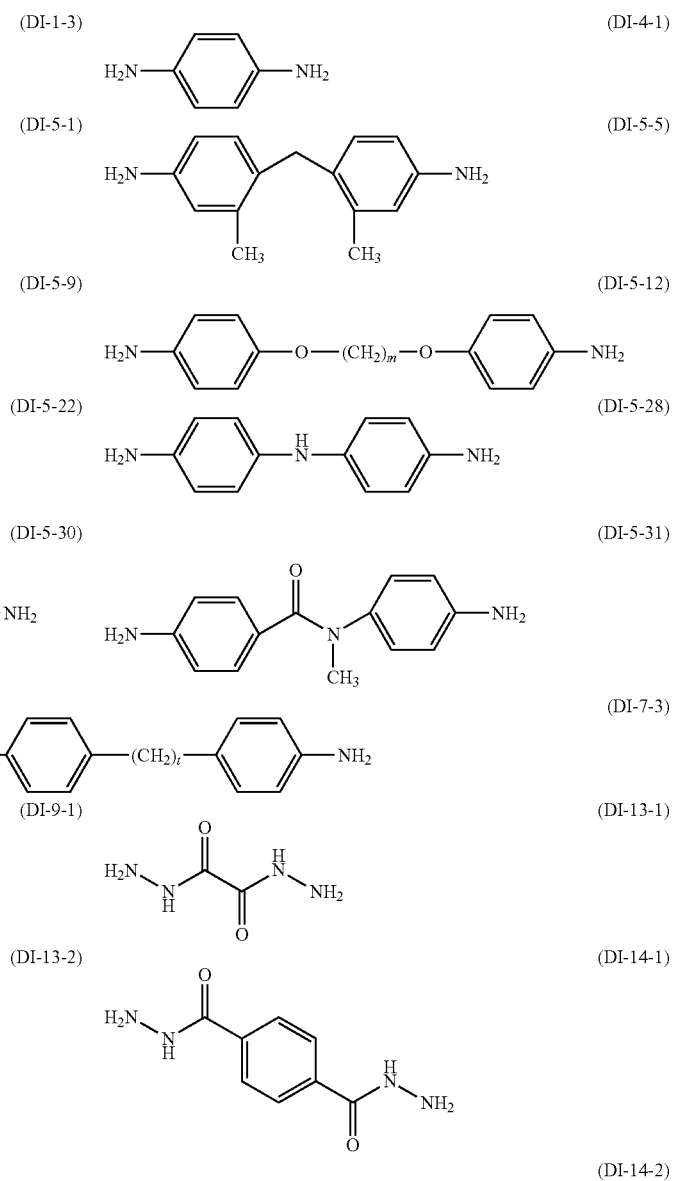

in formula (DI-1-3), formula (DI-4-1), formula (DI-5-1), formula (DI-5-5), formula (DI-5-9), formula (DI-5-12), formula (DI-5-22), formula (DI-5-28), formula (DI-5-30), formula (DI-5-31), formula (DI-7-3), formula (DI-9-1), formula (DI-13-1), formula (DI-13-2), formula (DI-14-1) and formula (DI-14-2), m is an integer from 1 to 12; n is an integer from 1 to 5; and t is 1 or 2.

Item 14. The liquid crystal display device according to any one of items 1 to 13, wherein the operating mode of the liquid crystal display device is a TN mode, an ECB mode, an OCB mode, an IPS mode, an FFS mode, a PSA mode, or an FPA mode, and the driving mode of the liquid crystal display device is an active matrix mode.

Item 15. The liquid crystal display device according to any one of items 1 to 14, wherein the operating mode of the liquid crystal display device is an IPS mode or an FFS mode, and the driving mode of the liquid crystal display device is an active matrix mode.

Item 16. A liquid crystal composition used for the liquid crystal display device according to any one of items 1 to 9.

Item 17. The liquid crystal composition according to item 16, wherein at 25° C., the elastic constant (K) is 13 pN or more and the ratio of the elastic constant (K) to the viscosity ($\eta$) is 0.8 nN/Pa·s (nm$^2$/s) or more.

Item 18. A liquid crystal display device, wherein the device includes the liquid crystal composition according to item 17, and the flicker rate at 25° C. is in the range of 0% to 1%.

Item 19. A liquid crystal alignment film used for the liquid crystal display device according to any one of items 10 to 13.
Item 20. The liquid crystal alignment film according to item 19, wherein the volume resistivity (p) at 25° C. is $1.0\times10^{14}$ Ωcm or more.
Item 21. The liquid crystal alignment film according to item 19, wherein the dielectric constant (c) at 25° C. is in the range of 3 to 5.

The invention further includes the following items. (a) The composition described above, further including at least one of additives such as an optically active compound, an antioxidant, an ultraviolet light absorber, a coloring matter, an antifoaming agent, a polymerizable compound, a polymerization initiator and a polymerization inhibitor. (b) The AM device including the composition described above. (c) The composition described above, further including a polymerizable compound and an AM device with a polymer sustained alignment (PSA) type, including this composition. (d) An AM device with a polymer sustained alignment (PSA) type, wherein the AM device includes the composition described above and a polymerizable compound in this composition is polymerized. (e) A device including the composition described above and having a mode of PC, TN, STN, ECB, OCB, IPS, VA, FFS or FPA. (f) A transmission-type device including the composition described above. (g) Use of the composition described above, as a composition having a nematic phase. (h) Use of the composition prepared by the addition of an optically active compound to the composition described above, as an optically active composition.

A liquid crystal composition in the liquid crystal display device of the invention will be explained in the following order. First, the constitution of component compounds in the composition will be explained. Second, the main characteristics of the component compounds and the main effects of these compounds on the composition will be explained. Third, a combination of the components in the composition, a desirable ratio of the components and its basis will be explained. Fourth, a desirable embodiment of the component compounds will be explained. Fifth, desirable component compounds will be shown. Sixth, additives that may be added to the composition will be explained. Seventh, methods for synthesizing the component compounds will be explained. Eighth, the use of the composition will be explained. The liquid crystal alignment film will be explained in the following order. Ninth, a polyamic acid having a photodegradable group or its derivatives will be explained. Tenth, any other tetracarboxylic acid dianhydride will be explained. Eleventh, any other diamine will be explained. Twelfth, a liquid crystal aligning agent will be explained. Thirteenth, a liquid crystal alignment film will be explained.

First, the constitution of component compounds in the composition will be explained. The compositions of the invention are classified into composition A and composition B. Composition A may further include any other liquid crystal compound, an additive and so forth, in addition to liquid crystal compounds selected from compound (1), compound (2) and compound (3). "Any other liquid crystal compound" is a liquid crystal compound that is different from compound (1), compound (2) and compound (3). Such a compound is mixed with the composition for the purpose of further adjusting the characteristics. The additive includes an optically active compound, an antioxidant, an ultraviolet light absorber, a coloring matter, an antifoaming agent, a polymerizable compound, a polymerization initiator and a polymerization inhibitor.

Composition B consists essentially of liquid crystal compounds selected from compound (1), compound (2) and compound (3). The term "essentially" means that the composition may include an additive, but does not include any other liquid crystal compound. Composition B has a smaller number of components than composition A. Composition B is preferable to composition A in view of cost reduction. Composition A is preferable to composition B in view of the fact that characteristics can be further adjusted by mixing with any other liquid crystal compound.

Second, the main characteristics of the component compounds and the main effects of these compounds on the characteristics of the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S mean a classification based on a qualitative comparison among the component compounds, and 0 (zero) means that the value is close to zero.

TABLE 2

| Compounds | Characteristics of Compounds | | |
|---|---|---|---|
| | Compound (1) | Compound (2) | Compound (3) |
| Maximum Temperature | S-L | S-L | S-M |
| Viscosity | M-L | S-M | M |
| Optical Anisotropy | M-L | M-L | M-L |
| Dielectric Anisotropy | S-L[1)] | 0 | M-L[2)] |
| Specific Resistance | L | L | L |

[1)]The value of the dielectric anisotropy is positive.
[2)]The value of the dielectric anisotropy is negative, and the symbol expresses the magnitude of the absolute value.

The main effects of the component compounds on the characteristics of the composition upon mixing the component compounds with the composition are as follows. Compound (1) increases the dielectric anisotropy. Compound (2) decreases the viscosity or increases the maximum temperature. Compound (3) increases the permittivity in the minor axis direction.

Third, a combination of the components in the composition, a desirable ratio of the components and its basis will be explained. A desirable combination of the components in the composition is the first and second components, the first and third components or the first, second and third components. A more desirable combination is the first and second components or the first, second and third components.

A desirable ratio of the first component is approximately 10% by weight or more for increasing the dielectric anisotropy and approximately 90% by weight or less for decreasing the minimum temperature or for decreasing the viscosity. A more desirable ratio is in the range of approximately 15% by weight to approximately 75% by weight. An especially desirable ratio is in the range of approximately 20% by weight to approximately 65% by weight.

A desirable ratio of the second component is approximately 10% by weight or more for increasing the maximum temperature or for decreasing the viscosity and approximately 90% by weight or less for increasing the dielectric anisotropy. A more desirable ratio is in the range of approximately 20% by weight to approximately 85% by weight. An especially desirable ratio is in the range of approximately 30% by weight to approximately 80% by weight.

A desirable ratio of the third component is approximately 3% by weight or more for increasing the dielectric anisotropy and approximately 30% by weight or less for decreasing the minimum temperature. A more desirable ratio is in the range of approximately 3% by weight to approximately 25% by weight. An especially desirable ratio is in the range of approximately 5% by weight to approximately 20% by weight.

Fourth, a desirable embodiment of the component compounds will be explained. In formula (1) to formula (3), $R^1$ is alkyl having 1 to 12 carbons, alkoxy having 1 to 12 carbons or alkenyl having 2 to 12 carbons. Desirable $R^1$ is alkyl having 1 to 12 carbons for increasing the stability to ultraviolet light or heat. $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine or alkenyl having 2 to 12 carbons in which at least one hydrogen has been replaced by fluorine or chlorine. Desirable $R^2$ or $R^3$ is alkenyl having 2 to 12 carbons for decreasing the viscosity and alkyl having 1 to 12 carbons for increasing the stability. $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine. Desirable $R^4$ or $R^5$ is alkyl having 1 to 12 carbons for increasing the stability and alkoxy having 1 to 12 carbons for increasing the dielectric anisotropy. Alkyl is straight-chain or branched-chain, and does not include cycloalkyl. Straight-chain alkyl is preferable to branched-chain alkyl. The same rule applies to a terminal group such as alkoxy and alkenyl.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity. Cis is preferable in the alkenyl such as 2-butenyl, 2-pentenyl and 2-hexenyl.

Desirable alkenyloxy is vinyloxy, allyloxy, 3-butenyloxy, 3-pentenyloxy or 4-pentenyloxy. More desirable alkenyloxy is allyloxy or 3-butenyloxy for decreasing the viscosity.

Desirable examples of alkyl in which at least one hydrogen has been replaced by fluorine or chlorine are fluoromethyl, 2-fluoroethyl, 3-fluoropropyl, 4-fluorobutyl, 5-fluoropentyl, 6-fluorohexyl, 7-fluoroheptyl or 8-fluorooctyl. More desirable examples are 2-fluoroethyl, 3-fluoropropyl, 4-fluorobutyl or 5-fluoropentyl for increasing the dielectric anisotropy.

Desirable examples of alkenyl in which at least one hydrogen has been replaced by fluorine or chlorine are 2,2-difluorovinyl, 3,3-difluoro-2-propenyl, 4,4-difluoro-3-butenyl, 5,5-difluoro-4-pentenyl or 6,6-difluoro-5-hexenyl. More desirable examples are 2,2-difluorovinyl or 4,4-difluoro-3-butenyl for decreasing the viscosity.

Desirable examples of alkenyloxy in which at least one hydrogen has been replaced by fluorine or chlorine are 2,2-difluorovinyloxy, 3,3-difluoro-2-propenyloxy, 4,4-difluoro-3-butenyloxy, 5,5-difluoro-4-pentenyloxy or 6,6-difluoro-5-hexenylosy. More desirable examples are 2,2-difluorovinyloxy or 4,4-difluoro-3-butenyloxy for decreasing the viscosity.

Ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Desirable ring A is 1,4-phenylene or 2-fluoro-1,4-phenylene for increasing the optical anisotropy. Desirable ring B and ring C are independently 1,4-cyclohexylene, 1,4-phenylene, 2-fluoro-1,4-phenylene or 2,5-difluoro-1,4-phenylene. Desirable ring B or ring C is 1,4-cyclohexylene for decreasing the viscosity and 1,4-phenylene for increasing the optical anisotropy. Ring D and ring F are independently 1,4-cyclohexylene, 1,4-cyclohexylene, 1,4-phenylene, 1,4-phenylene in which at least one hydrogen has been replaced by fluorine or chlorine or tetrahydropyran-2,5-diyl. Desirable ring D or ring F is 1,4-cyclohexylene for decreasing the viscosity and tetrahydropyran-2,5-diyl for increasing the dielectric anisotropy, and 1,4-phenylene for increasing the optical anisotropy. Ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Desirable ring E is 2,3-difluoro-1,4-phenylene for increasing the dielectric anisotropy. With regard to the configuration of 1,4-cyclohexylene, trans is preferable to cis for increasing the maximum temperature. Tetrahydropyran-2,5-diyl is

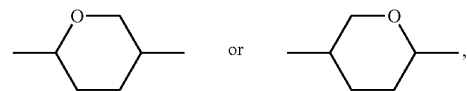

and is preferably

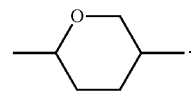

$Z^1$ is a single bond, ethylene, carbonyloxy or difluoromethyleneoxy. Desirable $Z^1$ is a single bond for decreasing the viscosity and difluoromethyleneoxy for increasing the dielectric anisotropy. $Z^2$ is a single bond, ethylene or carbonyloxy. Desirable $Z^2$ is a single bond for decreasing the viscosity. $Z^3$ and $Z^4$ are independently a single bond, ethylene, carbonyloxy or methyleneoxy. Desirable $Z^3$ or $Z^4$ is a single bond for decreasing the viscosity and methyleneoxy for increasing the dielectric anisotropy.

$X^1$ and $X^2$ are independently hydrogen or fluorine. Desirable $X^1$ or $X^2$ is fluorine for increasing the dielectric anisotropy.

$Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine or alkenyloxy having 2 to 12 carbons in which at least one hydrogen has been replaced by fluorine or chlorine. Desirable $Y^1$ is fluorine for decreasing the minimum temperature.

An example of alkyl in which at least one hydrogen has been replaced by fluorine or chlorine is trifluoromethyl. An example of alkoxyl in which at least one hydrogen has been replaced by fluorine or chlorine is trifluoromethoxy. An example of alkenyloxy in which at least one hydrogen has been replaced by fluorine or chlorine is trifluorovinyloxy.

a is 1, 2, 3 or 4. Desirable a is 2 for decreasing the minimum temperature and is 3 for increasing the dielectric anisotropy. b is 1, 2 or 3. Desirable b is 1 for decreasing the viscosity and is 2 or 3 for increasing the maximum temperature. c is 1, 2 or 3, d is 0 or 1, and the sum of c and d is 3 or less. Desirable c is 1 for decreasing the viscosity and is 2 or 3 for increasing the maximum temperature. Desirable d is 0 for decreasing the viscosity and is 1 for decreasing the minimum temperature.

Fifth, desirable component compounds will be shown. The first component is compound (1) having a large positive dielectric anisotropy. Desirable compound (1) is compound (1-1) to compound (1-35) described in item 2. Desirable compounds in view of a decrease in the flicker rate of a device are as follows. A compound having a single bond or difluoromethyleneoxy is preferable to a compound having ethylene or carbonyloxy. A compound having 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyrimidine-2,5-diyl, 1,3-dioxane-2,5-diyl, tetrahydropyran-2,5-diyl or naphthalene-2,6-diyl is preferable to a compound having 1,4-cyclohexylene. In these compound, it is desirable that at least one of the first component should be compound (1-12), compound (1-14), compound (1-15), compound (1-17), compound (1-18), compound (1-23), compound (1-27), compound (1-29) or compound (1-30). It is desirable that at least two of the first component should be a combination of compound (1-12) and compound (1-15), compound (1-14) and compound (1-27), compound (1-18) and compound (1-24), compound (1-18) and compound (1-29), compound (1-24) and compound (1-29) or compound (1-29) and compound (1-30).

The second component is compound (2) where the dielectric anisotropy is close to zero. Desirable compound (2) is compound (2-1) to compound (2-13) described in item 5. In these compound, it is desirable that at least one of the second component should be compound (2-1), compound (2-3), compound (2-5), compound (2-6) or compound (2-7). It is desirable that at least two of the second component should be a combination of compound (2-1) and compound (2-3) or compound (2-1) and compound (2-5).

The third component is compound (3) having a large negative dielectric anisotropy. Desirable compound (3) is compound (3-1) to compound (3-21) described in item 8. In these compounds, it is desirable that at least one of the third component should be compound (3-1), compound (3-4), compound (3-5), compound (3-7), compound (3-10) or compound (3-15). It is desirable that at least two of the third component should be a combination of compound (3-1) and compound (3-7), compound (3-1) and compound (3-15), compound (3-4) and compound (3-7), compound (3-4) and compound (3-15), compound (3-5) and compound (3-7) or compound (3-5) and compound (3-10).

Sixth, additives that may be added to the composition will be explained. Such additives include an optically active compound, an antioxidant, an ultraviolet light absorber, a coloring matter, an antifoaming agent, a polymerizable compound, a polymerization initiator and a polymerization inhibitor. The optically active compound is added to the composition for the purpose of inducing the helical structure of liquid crystal molecules and giving a twist angle. Examples of such compounds include compound (4-1) to compound (4-5). A desirable ratio of the optically active compound is approximately 5% by weight or less, and a more desirable ratio is in the range of approximately 0.01% by weight to approximately 2% by weight.

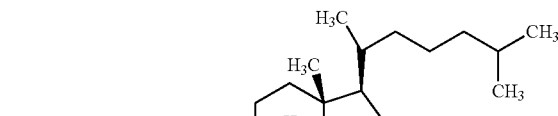

(4-1)

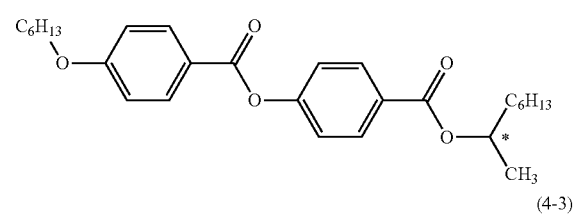

(4-2)

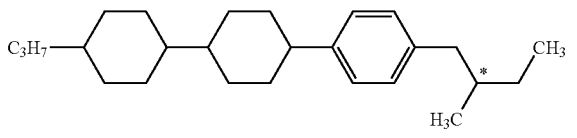

(4-3)

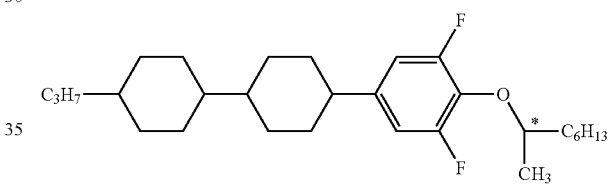

(4-4)

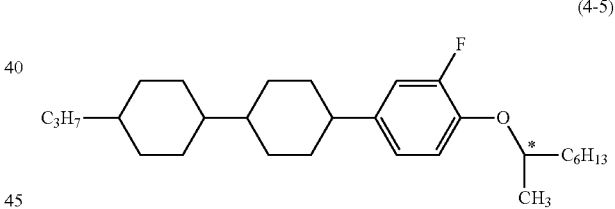

(4-5)

The antioxidant is added to the composition in order to maintain a large voltage holding ratio at a temperature close to the maximum temperature as well as at room temperature, after the device has been used for a long time. A desirable example of the antioxidant is compound (5) where z is an integer from 1 to 9, for instance.

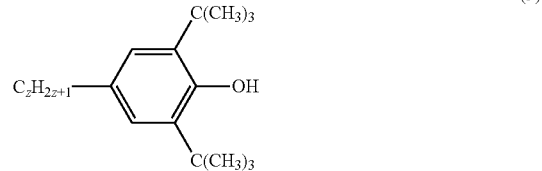

(5)

In compound (5), desirable z is 1, 3, 5, 7 or 9. More desirable z is 7. Compound (5) where z is 7 is effective in maintaining a large voltage holding ratio at a temperature close to the maximum temperature as well as at room temperature, after the device has been used for a long time, since it has a small volatility. A desirable ratio of the antioxidant is approximately 50 ppm or more for achieving its effect and is approximately 600 ppm or less for avoiding a decrease in the maximum temperature or avoiding an increase in the minimum temperature. A more desirable ratio is in the range of approximately 100 ppm to approximately 300 ppm.

Desirable examples of the ultraviolet light absorber include benzophenone derivatives, benzoate derivatives and triazole derivatives. A light stabilizer such as an amine having steric hindrance is also desirable. A desirable ratio of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable ratio is in the range of approximately 100 ppm to approximately 10,000 ppm.

A dichroic dye such as an azo dye or an anthraquinone dye is added to the composition for adjusting to a device having a guest host (GH) mode. A desirable ratio of the coloring matter is in the range of approximately 0.01% by weight to approximately 10% by weight. The antifoaming agent such as dimethyl silicone oil or methyl phenyl silicone oil is added to the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

The polymerizable compound is added to the composition for adjusting to a device with a PSA (polymer sustained alignment) type. Desirable examples of the polymerizable compound include compounds such as acrylates, methacrylates, vinyl compounds, vinyloxy compounds, propenyl ethers, epoxy compounds (oxiranes, oxetanes) and vinyl ketones. More desirable examples are acrylate derivatives or methacrylate derivatives. A desirable ratio of the polymerizable compound is approximately 0.05% by weight or more for achieving the effect and approximately 10% by weight or less for preventing display defects. A more desirable ratio is in the range of approximately 0.1% by weight to approximately 2% by weight. A polymerizable compound is polymerized on irradiation with ultraviolet light. It may be polymerized in the presence of an initiator such as a photopolymerization initiator. Suitable conditions for polymerization, and a suitable type and amount of the initiator are known to a person skilled in the art and are described in the literature. For example, Irgacure 651 (registered trademark; BASF), Irgacure 184 (registered trademark; BASF) or Darocure 1173 (registered trademark; BASF), each of which is a photoinitiator, is suitable for radical polymerization. A desirable ratio of the photopolymerization initiator is in the range of approximately 0.1% by weight to approximately 5% by weight based on the weight of the polymerizable compound. A more desirable ratio is in the range of approximately 1% by weight to approximately 3% by weight.

The polymerization inhibitor may be added in order to prevent the polymerization when a polymerizable compound is kept in storage. The polymerizable compound is usually added to the composition without removing the polymerization inhibitor. Examples of the polymerization inhibitor include hydroquinone derivatives such as hydroquinone and methylhydroquinone, 4-tert-butylcatechol, 4-methoxyphenol and phenothiazine.

Seventh, methods for synthesizing the component compounds will be explained. These compounds can be synthesized by known methods. The synthetic methods will be exemplified as follows. Compound (1-2) and compound (1-8) are prepared by the method described in JP H02-233626 A (1990). Compound (2-1) is prepared by the method described in JP S59-176221 A (1984). Compound (3-1) and compound (3-7) are prepared by the method described in JP H02-503441 A (1990). A compound of formula (5) where z is 1 is available from Sigma-Aldrich Corporation. Compound (5) where z is 7, for instance, is synthesized according to the method described in U.S. Pat. No. 3,660,505.

Compounds whose synthetic methods are not described can be prepared according to the methods described in books such as "Organic Syntheses" (John Wiley & Sons, Inc.), "Organic Reactions" (John Wiley & Sons, Inc.), "Comprehensive Organic Synthesis" (Pergamon Press), and "Shin-Jikken Kagaku Kouza" (New experimental Chemistry Course, in English; Maruzen Co., Ltd., Japan). The composition is prepared according to known methods using the compounds thus obtained. For example, the component compounds are mixed and dissolved in each other by heating.

Eighth, the use of the composition will be explained. This composition mainly has a minimum temperature of approximately −10° C. or lower, a maximum temperature of approximately 70° C. or higher, and an optical anisotropy in the range of approximately 0.07 to approximately 0.20. A composition having an optical anisotropy in the range of approximately 0.08 to approximately 0.25 may be prepared by adjusting the ratio of the component compounds or by mixing with any other liquid crystal compound. A composition having an optical anisotropy in the range of approximately 0.10 to approximately 0.30 may be prepared by this method. A device including this composition has a large voltage holding ratio. This composition is suitable for an AM device. This composition is suitable especially for an AM device having a transmission type. The composition can be used as a composition having a nematic phase and as an optically active composition by adding an optically active compound.

The composition can be used for an AM device. It can also be used for a PM device. The composition can also be used for the AM or PM device having a mode such as PC, TN, STN, ECB, OCB, TS, FFS, VA or FPA. It is especially desirable to use the composition for the AM device having a mode of TN, OCB, IPS or FFS. In the AM device having the IPS or FFS mode, the orientation of liquid crystal molecules may be parallel or perpendicular to a glass substrate, when no voltage is applied. These devices may be of a reflection type, a transmission type or a semi-transmission type. It is desirable to use the composition for a device having the transmission type. The composition can be used for an amorphous silicon-TFT device or a polycrystal silicon-TFT device. The composition is also usable for an NCAP (nematic curvilinear aligned phase) device prepared by microcapsulating the composition, and for a PD (polymer dispersed) device in which a three-dimensional network-polymer is formed in the composition.

Ninth, a polyamic acid having a photodegradable group or its derivatives will be explained. A desirable liquid crystal alignment film is prepared from a liquid crystal aligning agent including a polymer having a photodegradable group. The polymer is prepared from a polyamic acid formed by the reaction of a tetracarboxylic acid dianhydride having a photodegradable group with a diamine. The polymer is also prepared from a polyamic acid formed by the reaction of a tetracarboxylic acid dianhydride with a diamine having a photodegradable group. The derivative of the polyamic acid includes soluble polyimides, polyamic acid esters, polyhydrazide acids, polyamic acid amides and polyhydrazide acid-amide acids. A polymer having a photodegradable group can also be prepared from the derivative of the polyamic acid in the same manner. A liquid crystal alignment film prepared from such a polymer has anisotropy. The anisotropy is caused by the anisotropic degradation of a molecular chain by the action of polarized ultraviolet light (see paragraph 0008 of WO 2014-054785 A). The photodegradable group makes it possible to cause such degradation.

A Polyamic acid, polyimide and polyamic acid ester, having a photodegradable group, can suitably be used for a liquid crystal alignment film included in the liquid crystal display device of the invention. The polyamic acid is a polymer of the following formula (P-1) where $R^{16}$ is hydrogen. The polyimide is a polymer represented by the following formula (P-2). The polyamic acid ester is a polymer of the following formula (P-1) where $R^{16}$ is alkyl having 1 to 5 carbons.

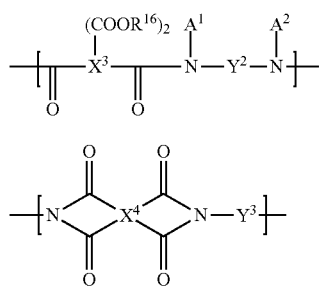

(P-1)

(P-2)

In formula (P-1), $X^3$ is a tetravalent organic group, $Y^2$ is a divalent organic group, $R^{16}$ is hydrogen or alkyl having 1 to 5 carbons, $A^1$ and $A^2$ are independently hydrogen, alkyl having 1 to 10 carbons, alkenyl having 2 to 10 carbons or alkynyl having 2 to 10 carbons, those of which may have a substituent. In formula (P-2), $X^4$ is a tetravalent organic group, and $Y^3$ is a divalent organic group.

The polyamic acid having a photodegradable group or its derivatives has at least one photoreactive group selected from the group of groups represented by the following formula (XI-1) to formula (XI-16), for instance. Such a polyamic acid or its derivatives are prepared by using at least one tetracarboxylic acid dianhydride having a tetravalent group represented by formula (XI-1) to formula (XI-10) and formula (XI-12) to formula (XI-15) as a starting material. Such a polyamic acid or its derivatives are also prepared by using a diamine having a group represented by formula (XI-11). A polyamic acid represented by formula (XI-16) or its derivatives are photodegradable.

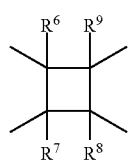

(XI-1)

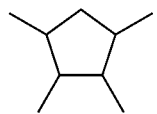

(XI-2)

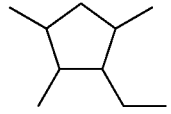

(XI-3)

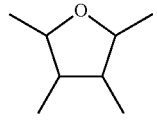

(XI-4)

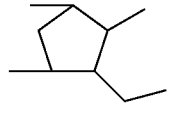

(XI-5)

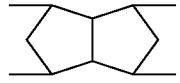

(XI-6)

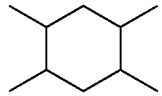

(XI-7)

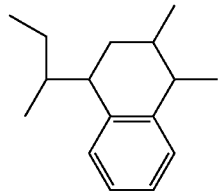

(XI-8)

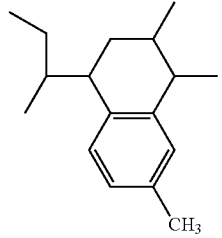

(XI-9)

(XI-10)

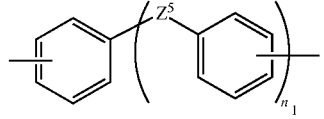

(XI-11)

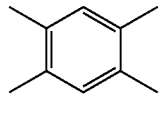

(XI-12)

(XI-13)

(XI-14)

(XI-15)
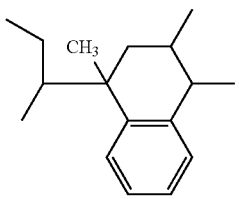

(XI-16)
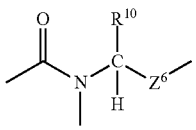

In formula (XI-1) to formula (XI-16), $R^6$, $R^7$, $R^8$ and $R^9$ are independently hydrogen, halogen, alkyl having 1 to 6 carbons, alkenyl having 2 to 6 carbons, alkynyl having 2 to 6 carbons or phenyl; $R^{10}$ is hydrogen, alkyl having 1 to 10 carbons or cycloalkyl having 3 to 10 carbons; $n_1$ is an integer from 1 to 4; when $n_1$ is 1, $Z^5$ is —SCH$_2$—, and when $n_1$ is 2, 3 or 4, $Z^6$ is a single bond, —SCH$_2$— or —CH$_2$S—, with the proviso that at least one of $Z^5$ is —SCH$_2$— or —CH$_2$S—; and $Z^6$ is a divalent group including an aromatic ring.

Examples of the divalent group including an aromatic ring, $Z^6$, include a group represented by the following formula (a), and a group formed by the combination of this group and at least one group selected from the group of —COO—, —NH—, —O— and —S—. An example of the combination is -Ph-COO—, where Ph means phenylene.

(a)
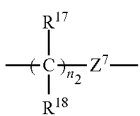

In (a), $R^{17}$ and $R^{18}$ are independently hydrogen, alkyl having 1 to 10 carbons or cycloalkyl having 3 to 10 carbons; and $n_2$ is an integer from 0 to 5, and when $n_2$ is 2 or more, a plurality of $R^{17}$ (or $R^{18}$) may be the same or different, and $Z^7$ is a divalent group derived by excluding two hydrogens from an aromatic hydrocarbon having 6 to 20 carbons.

Desirable examples of the tetracarboxylic acid dianhydride having a photodegradable group include compounds represented by the following formula (XI-1-1) to formula (XI-1-7), formula (XI-2-1), formula (XI-3-1), formula (XI-6-1), formula (XI-7-1), formula (XI-8-1), formula (XI-9-1), formula (XI-10-1), formula (XI-10-2), formula (XI-12-1), formula (XI-13-1), formula (XI-13-2), formula (XI-14-1) and formula (XI-15-1).

(XI-1-1)
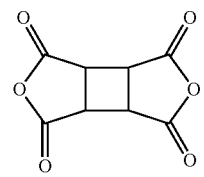

(XI-1-2)
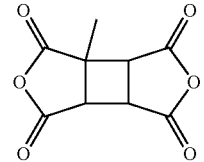

(XI-1-3)
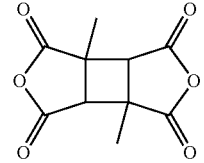

(XI-1-4)
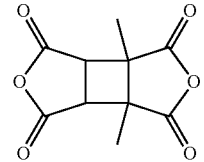

(XI-1-5)
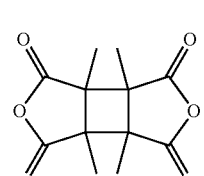

(XI-1-6)
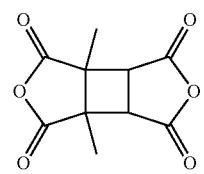

(XI-1-6)
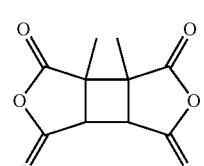

(XI-1-7)
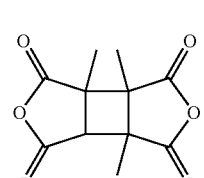

(XI-2-1)
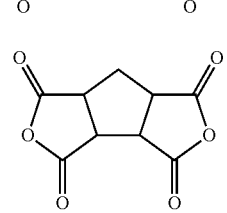

(XI-3-1)
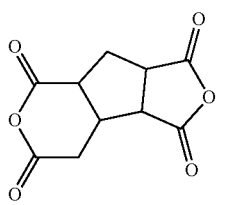

(XI-6-1)
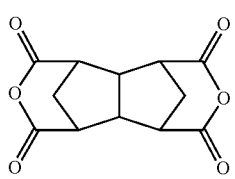

(XI-7-1)
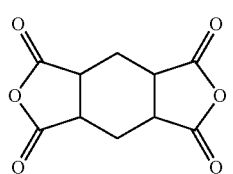

(XI-8-1)
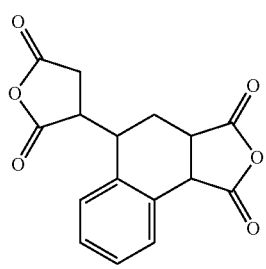

(XI-9-1)
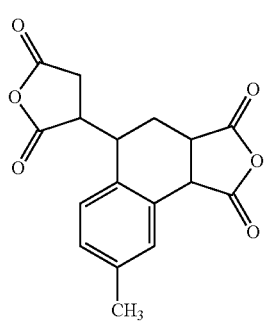

(XI-10-1)
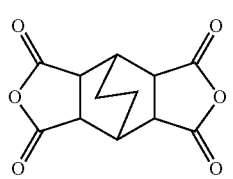

(XI-10-2)
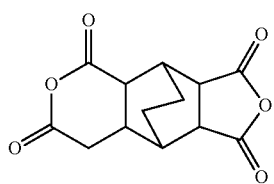

(XI-12-1)
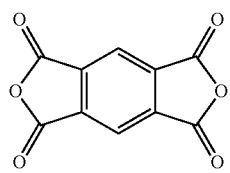

(XI-13-1)
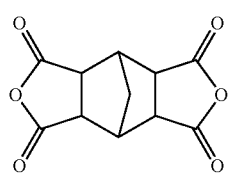

(XI-13-2)
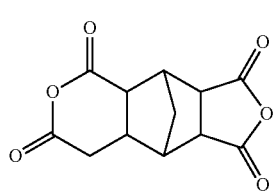

(XI-14-1)
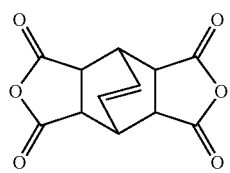

(XI-15-1)
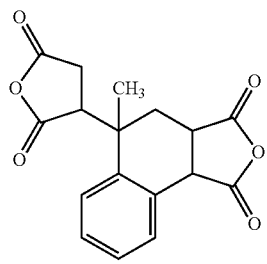

More desirable examples of the tetracarboxylic acid dianhydride having a photodegradable group include compounds represented by the preceding formula (XI-1-1) to formula (XI-1-5), formula (XI-2-1), formula (XI-3-1), formula (XI-6-1), formula (XI-7-1) and formula (XI-10-1).

Examples of a compound having a photodegradable group include the following tetracarboxylic acid dialkyl esters.

(b)
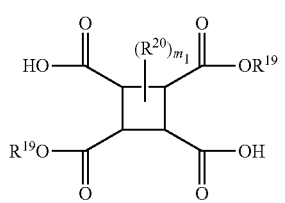

-continued

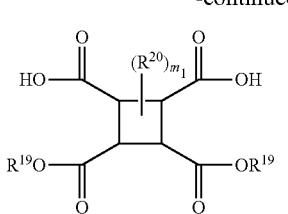

Examples of a compound having a photodegradable group include the following tetracarboxylic acid dichlorides.

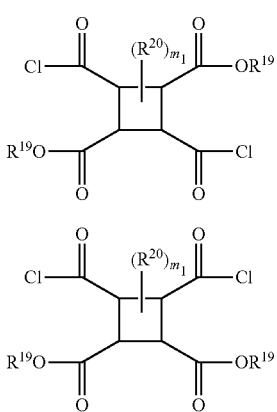

In formula (b), formula (c), formula (d) and formula (e), $R^{19}$ and $R^{20}$ are independently alkyl having 1 to 5 carbons, and $m_1$ is an integer from 1 to 4. Specific examples of $R^{19}$ include methyl, ethyl, propyl, isopropyl, butyl, s-butyl, isobutyl, t-butyl and pentyl. Incidentally, $R^{19}$ is preferably a group having a small number of carbons and being easily eliminated, and more preferably methyl, when a polyamic acid ester is prepared from tetracarboxylic acid dialkyl esters (b) and (C), and then it is derived to a polyimide by imidation. Specific examples of $R^{20}$ include methyl, ethyl, propyl, isopropyl, butyl, s-butyl, isobutyl, t-butyl and pentyl. Desirable $m_1$ is 2.

Tenth, any other tetracarboxylic acid dianhydride will be explained. When the polyamic acid or its derivatives are prepared, a tetracarboxylic acid dianhydride excluding the tetracarboxylic acid dianhydride having a photodegradable group can further be used, and can be selected from known tetracarboxylic acid dianhydrides without restriction. Such a tetracarboxylic acid dianhydride may belong to the group of aromatic systems (including heteroaromatic ring systems) in which —CO—O—CO— is bonded directly to the aromatic ring and aliphatic systems (including heteroatom ring systems) in which —CO—O—CO— is not bonded directly to the aromatic ring.

Examples of such a tetracarboxylic acid dianhydride include tetracarboxylic acid dianhydrides represented by formulas (AN-I) to (AN-VII) in view of easy availability of starting materials, the ease of the polymerization, and electrical characteristics of the film.

(AN-I)

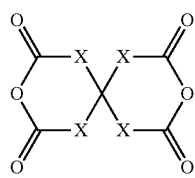

(AN-II)

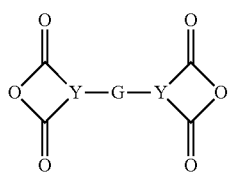

(AN-III)

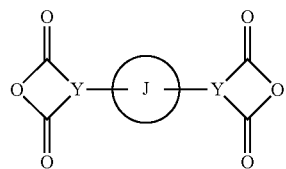

(AN-IV)

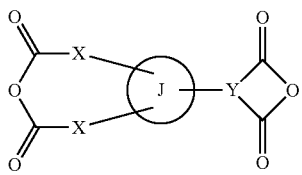

(AN-V)

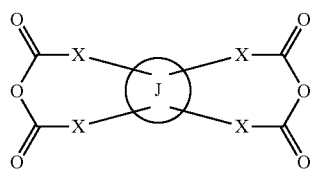

(AN-VI)

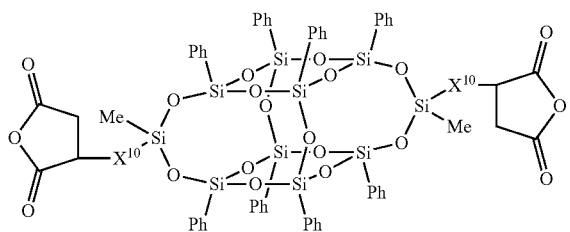

-continued (AN-VII)

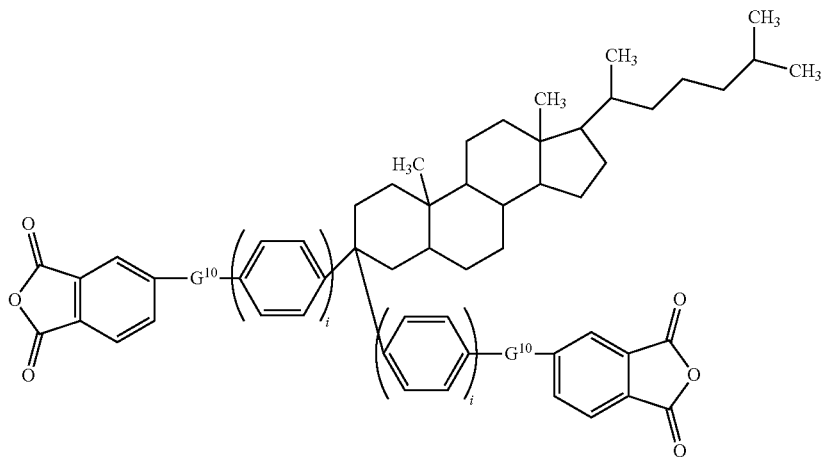

In formula (AN-I) to formula (AN-VII), X is a single bond or —CH$_2$—; G is a single bond, alkylene having 1 to 20 carbons, —CO—, —O—, —S—, —SO$_2$—, —C(CH$_3$)$_2$— or —C(CF$_3$)$_2$—; and Y is one selected from the group of the following trivalent groups:

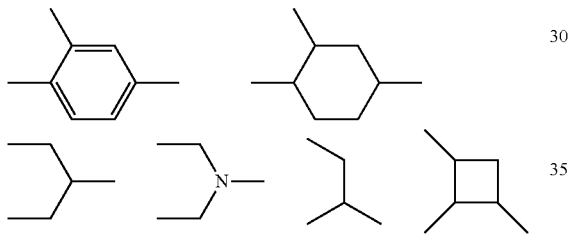

In these groups, at least one hydrogen may be replaced by methyl, ethyl or phenyl; ring J is a monocyclic hydrocarbon group having 3 to 10 carbons or a polycyclic condensed hydrocarbon group having 6 to 30 carbons, and in these groups at least one hydrogen may be replaced by methyl, ethyl or phenyl, and a bonding line crossing a ring is bonded to any one of carbons constituting the ring, where two bonding lines may be bonded to the same carbon; X$^{10}$ is alkylene having 2 to 6 carbons; Me is methyl; Ph is phenyl; G$^{10}$ is —O—, —COO— or —OCO—; and i is 0 or 1.

Further details include tetracarboxylic acid dianhydrides represented by the following formula (AN-1).

(AN-1)

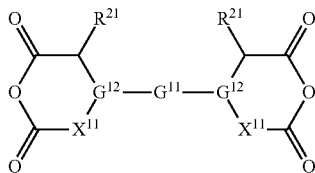

In formula (AN-1), R$^{21}$ is hydrogen or —CH$_3$. G$^{11}$ is a single bond, alkylene having 1 to 12 carbons, 1,4-phenylene or 1,4-cyclohexylene. X$^{11}$ is a single bond or —CH$_2$—. G$^{12}$ is any one of the trivalent groups described below.

$$\diagup_{CH-} \quad \diagup_{N-}$$

When G$^{12}$ is CH, hydrogen of CH may be replaced by —CH$_3$. When G$^{12}$ is N, G$^{11}$ is not a single bond or —CH$_2$—, and X$^{11}$ is not a single bond. Examples of a tetracarboxylic acid dianhydride represented by formula (AN-1) include compounds represented by the formulas described below.

(AN-1-1)

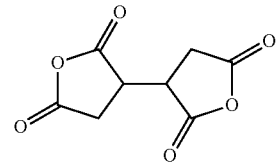

(AN-1-2)

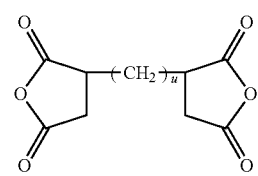

(AN-1-3)

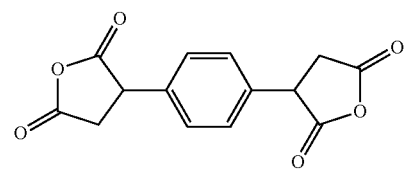

(AN-1-4)

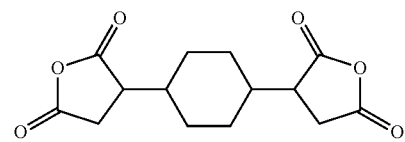

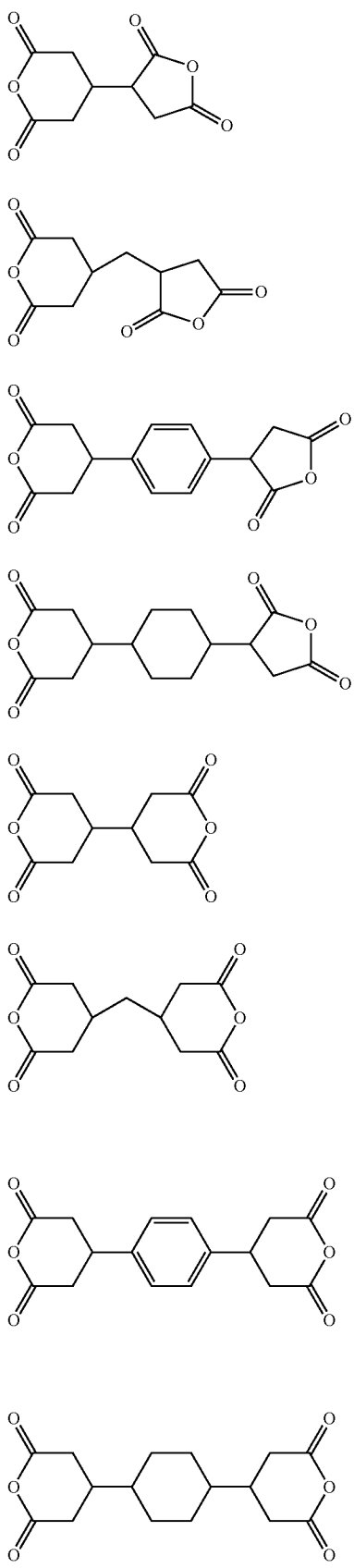

(AN-1-5)
(AN-1-6)
(AN-1-7)
(AN-1-8)
(AN-1-9)
(AN-1-10)
(AN-1-11)
(AN-1-12)

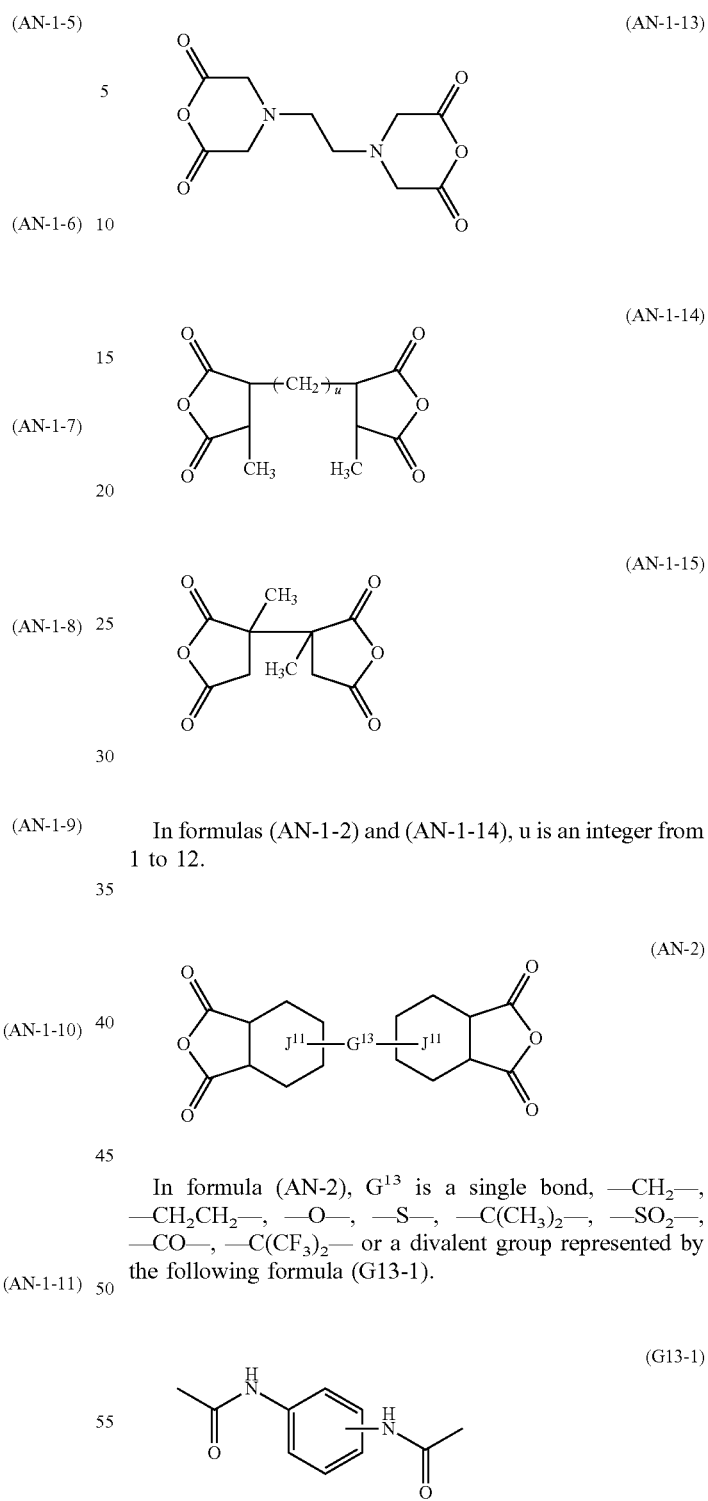

(AN-1-13)
(AN-1-14)
(AN-1-15)

In formulas (AN-1-2) and (AN-1-14), u is an integer from 1 to 12.

(AN-2)

In formula (AN-2), $G^{13}$ is a single bond, —$CH_2$—, —$CH_2CH_2$—, —O—, —S—, —$C(CH_3)_2$—, —$SO_2$—, —CO—, —$C(CF_3)_2$— or a divalent group represented by the following formula (G13-1).

(G13-1)

In formula (G13-1), desirable phenylene is 1,4-phenylene or 1,3-phenylene.

Ring $J^{11}$ is a cyclohexane ring or a benzene ring. $G^{13}$ may be bonded to any one of positions in ring $J^{11}$. Examples of the tetracarboxylic acid dianhydride represented by formula (AN-2) include compounds represented by the following formulas.

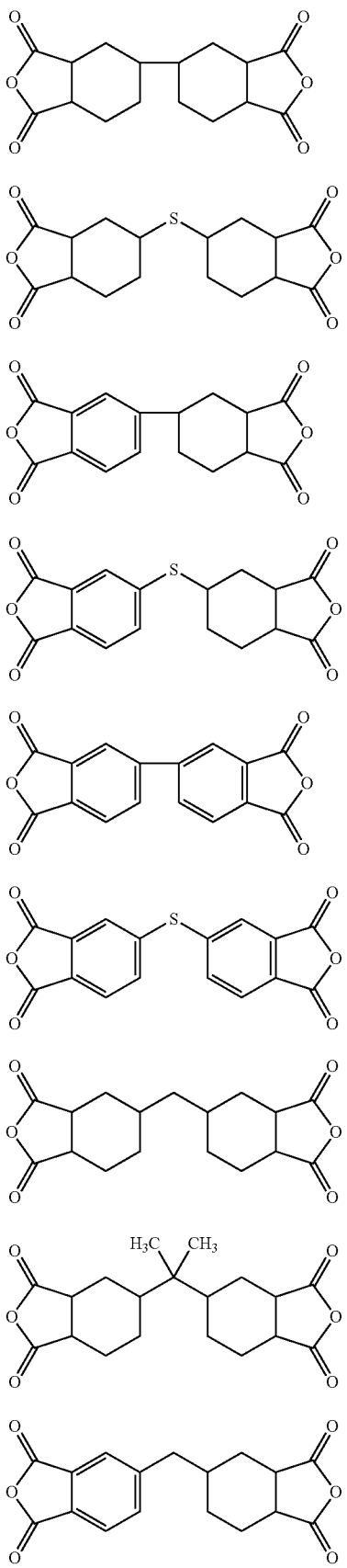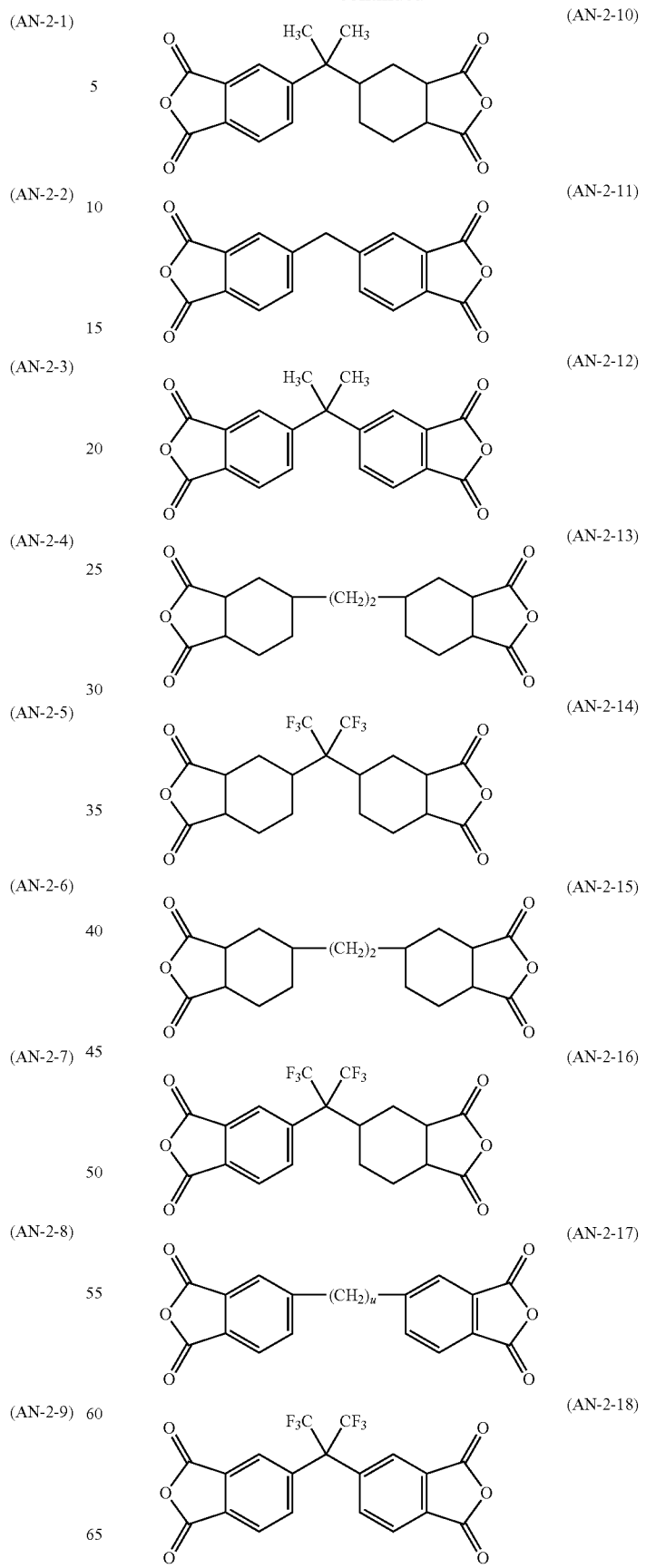

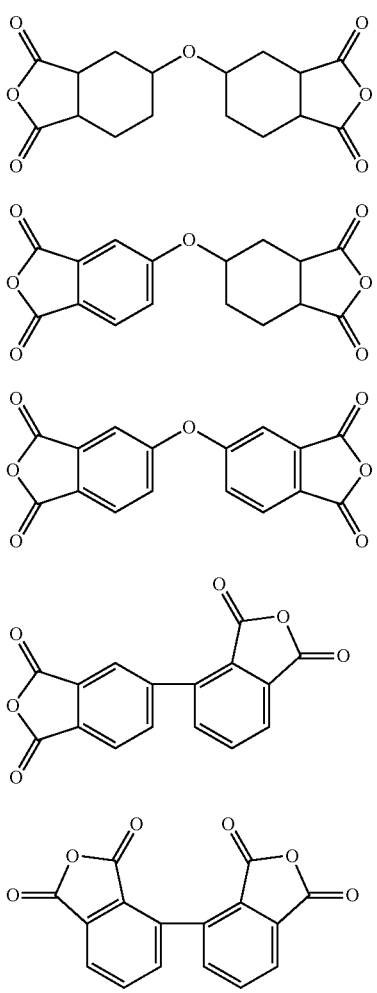
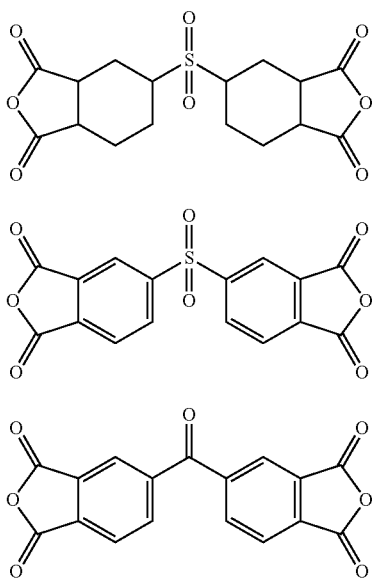
In formula (AN-2-17), u is an integer from 1 to 12.
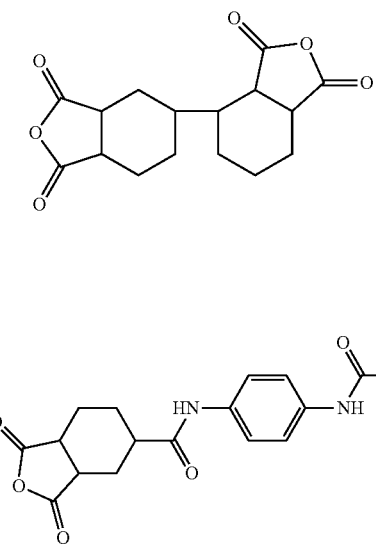
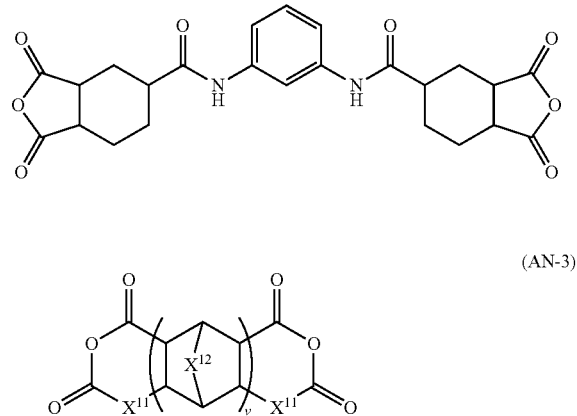
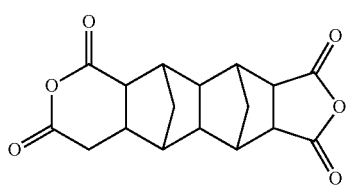
In formula (AN-3), $X^{11}$ is a single bond or —$CH_2$—. $X^{12}$ is —$CH_2$—, —$CH_2CH_2$— or —CH=CH—. v is 2. Examples of the tetracarboxylic acid dianhydride represented by formula (AN-3) include compounds represented by the following formulas.
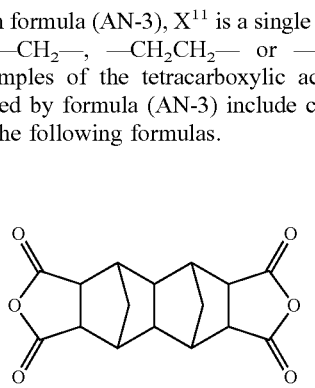

-continued

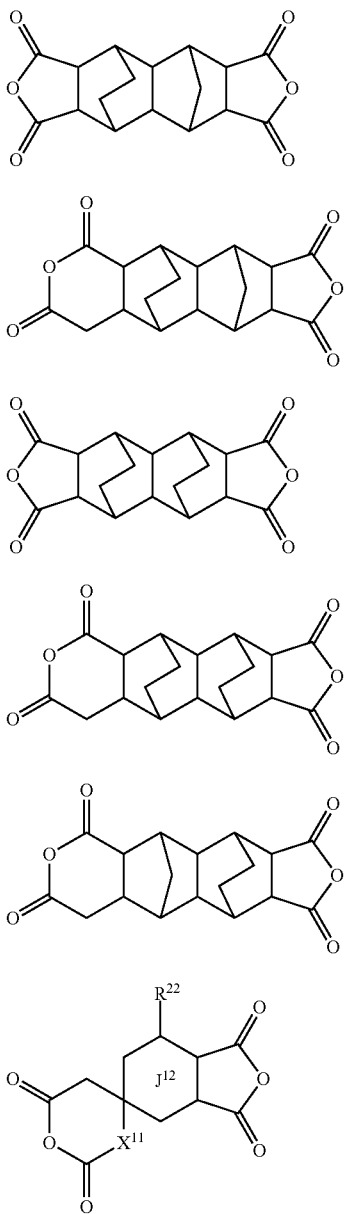

In formula (AN-4), $X^{11}$ is a single bond or —CH$_2$—. $R^{22}$ is hydrogen, —CH$_3$, —CH$_2$CH$_3$ or phenyl, and ring $J^{12}$ is a cyclohexane ring or a cyclohexene ring. Examples of the tetracarboxylic acid dianhydride represented by formula (AN-4) include compounds represented by the following formulas.

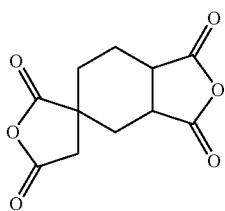

-continued

In formula (AN-5), w is 0 or 1. Examples of the tetracarboxylic acid dianhydride represented by formula (AN-5) include compounds represented by the following formulas.

In formula (AN-6), ring $J^{11}$ is a cyclohexane ring or a benzene ring. Examples of the tetracarboxylic acid dianhydride represented by formula (AN-6) include compounds represented by the following formulas.

(AN-6-1)
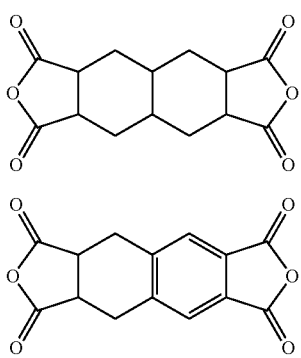

(AN-7-2)
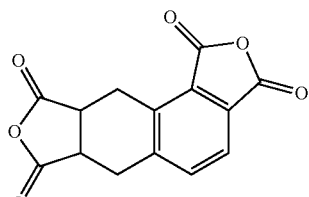

(AN-6-2)

(AN-6-3)
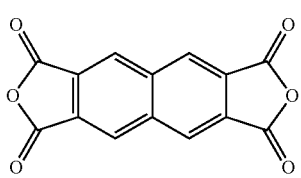

(AN-7-3)
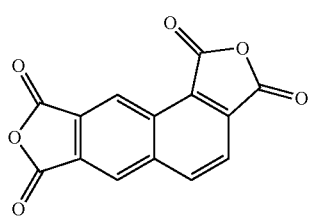

(AN-7)
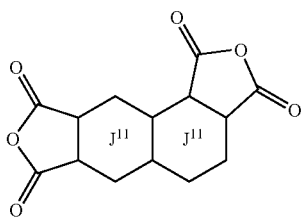

In formula (AN-7), ring $J^{11}$ is a cyclohexane ring or a benzene ring. Examples of the tetracarboxylic acid dianhydride represented by formula (AN-7) include compounds represented by the following formulas.

(AN-8)
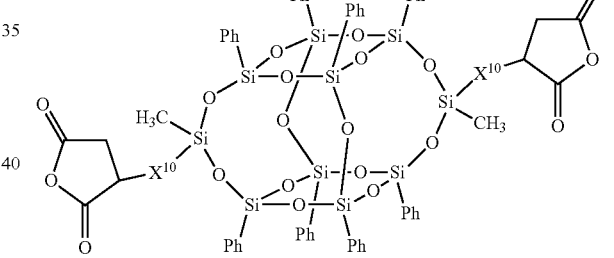

In formula (AN-8), $X^{10}$ is alkylene having 2 to 6 carbons, and Ph is phenyl. Examples of the tetracarboxylic acid dianhydride represented by formula (AN-8) include compounds represented by the following formulas. In the following formula, Ph is phenyl.

(AN-7-1)
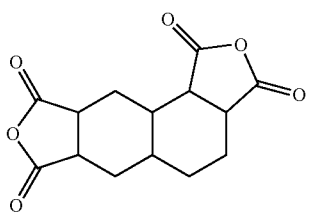

(AN-8-1)
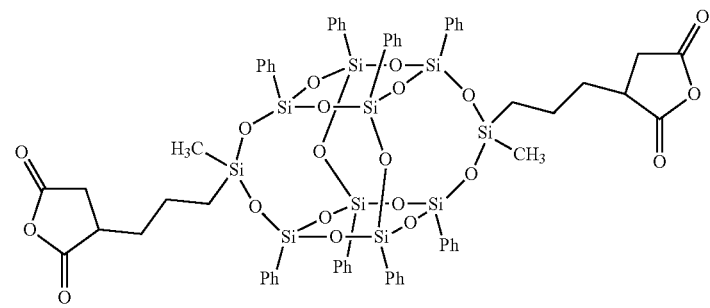

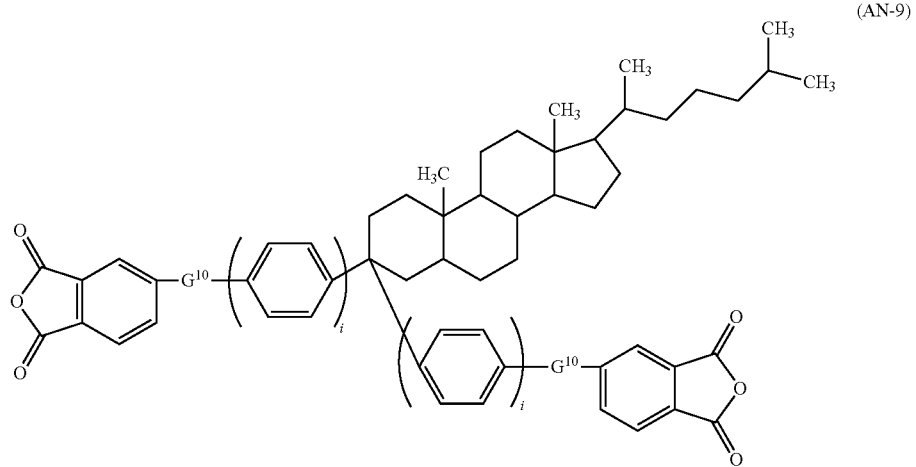
(AN-9)
In formula (AN-9), two of $G^{10}$ are independently —O—, —COO— or —OCO—, and i is 0 or 1. Examples of the tetracarboxylic acid dianhydride represented by formula (AN-9) include compounds represented by the following formulas.
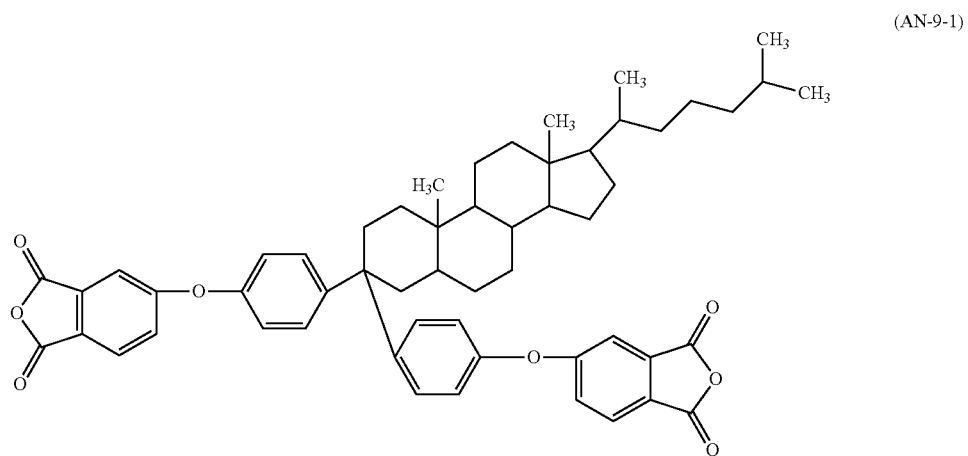
(AN-9-1)
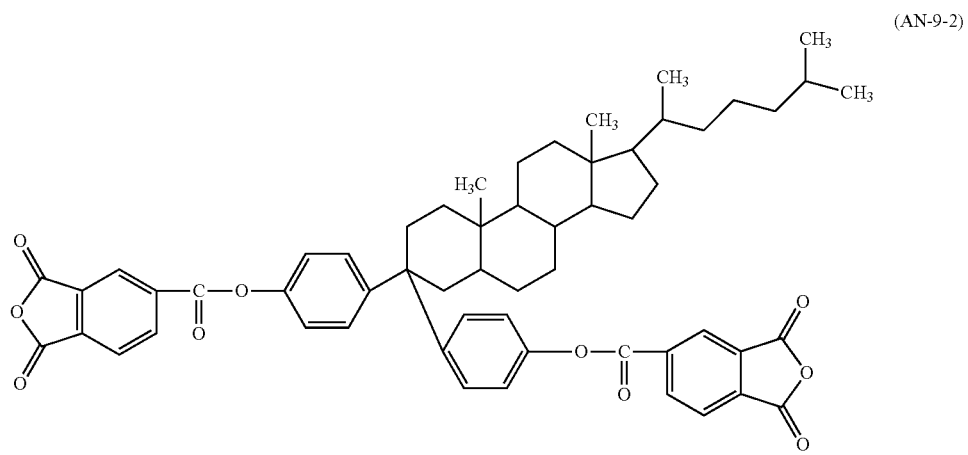
(AN-9-2)

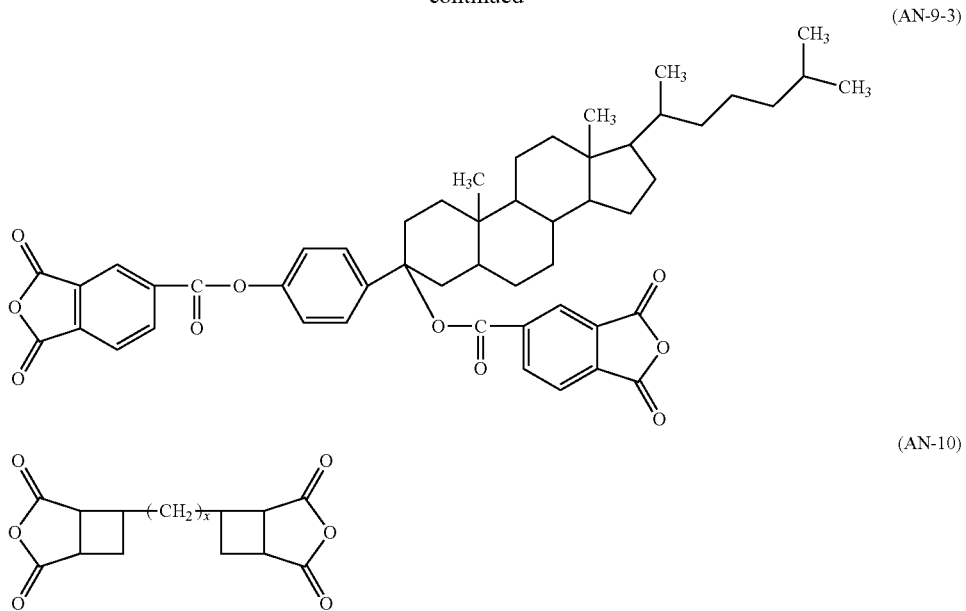
(AN-9-3)
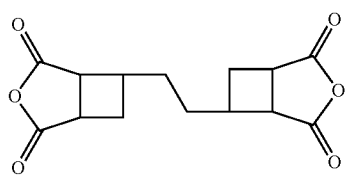
(AN-10)
In formula (AN-10), x is an integer from 1 to 10. Examples of the tetracarboxylic acid dianhydride represented by formula (AN-10) include compounds represented by the following formulas.
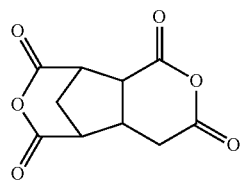
(AN-11-1)
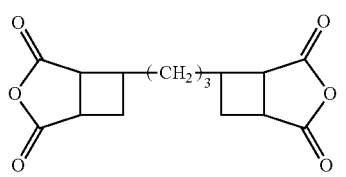
(AN-10-1)
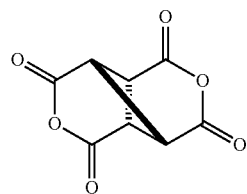
(AN-11-2)
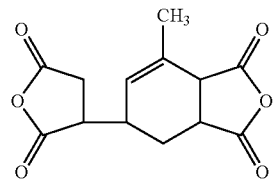
(AN-11-3)
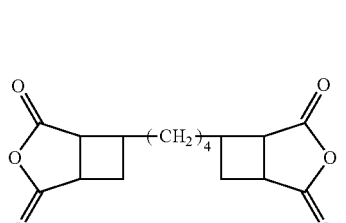
(AN-10-2)
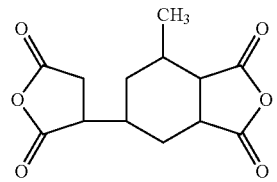
(AN-11-4)
(AN-10-3)
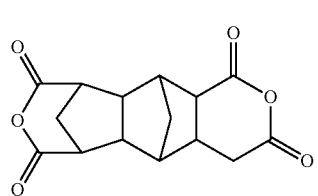
(AN-11-5)
Examples of a tetracarboxylic acid dianhydride that is not described above include the following compounds.

(AN-11-6) 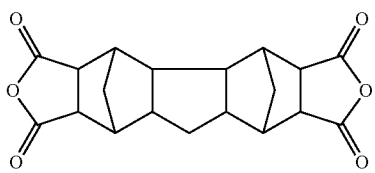

(AN-11-7) 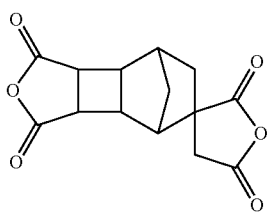

(AN-11-8) 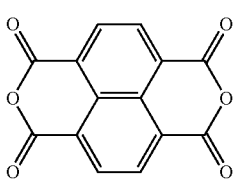

(AN-11-9) 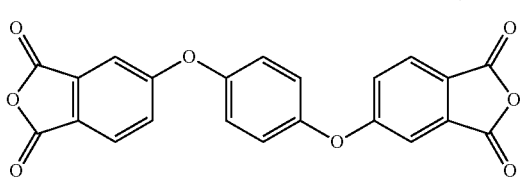

(AN-11-10) 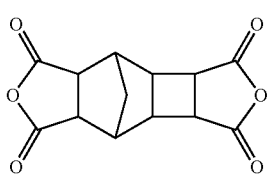

(AN-11-11) 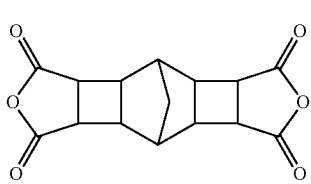

(AN-11-12) 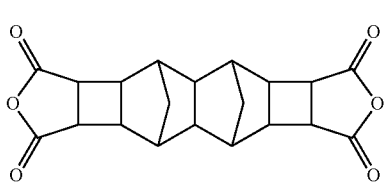

(AN-11-13) 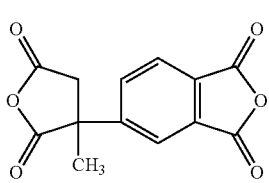

(AN-11-14) 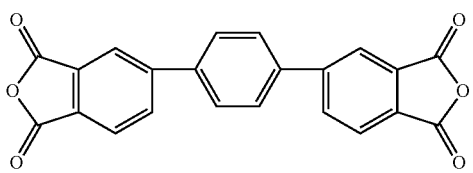

In the acid dianhydrides described above, a compound represented by formula (AN-1-1), (AN-1-13), (AN-2-17), (AN-2-28) or (AN-2-29) is especially desirable in consideration that an improvement of the orientation in a liquid crystal display device is important.

In the acid dianhydrides described above, a compound represented by formula (AN-1-1), (AN-1-13), (AN-2-28) or (AN-2-29) is especially desirable in consideration that an improvement of the transmittance in a liquid crystal display device is important.

In the acid dianhydrides described above, a compound represented by formula (AN-2-5), (AN-2-17), (AN-2-21) or (AN-6-3) is especially desirable in consideration that an improvement of the electric characteristics in a liquid crystal display device is important.

Eleventh, any other diamine will be explained. In the preparation of the polyamic acid or its derivatives of the invention, diamines excluding the diamine having a photo-degradable group can further be used, and can be selected from known diamines without restriction.

The diamine is classified into two types based on its structure. That is to say, a diamine having a group branched from the main chain (namely a diamine having a side chain group) and a diamine having no side chain groups, when the skeleton connecting two amino groups is regarded as a main chain. This side chain group has an effect of increasing a pretilt angle. The side chain group should be a group having 3 or more carbons for achieving its effect. Specific examples include alkyl having 3 or more carbons, alkoxy having 3 or more carbons, alkoxyalkyl having 3 or more carbons or a group having a steroid skeleton. In a group having one or more ring, the group is effective as a side chain group when the terminal ring has any one of alkyl having 1 or more carbons, alkoxy having 1 or more carbons and alkoxyalkyl having 2 or more carbons as a substituent. Hereinafter, a diamine that has such a side chain group is sometimes abbreviated to "a diamine having a side chain." A diamine that does not have such a side chain group is sometimes abbreviated to "a diamine having no side chains."

The pretilt angle required can be achieved by a suitable selection of the diamine having no side chains and the diamine having a side chain. The diamine having no side chains or the diamine having a side chain can be used in order to improve characteristics such as homeotropic orientation, a voltage holding ratio, image burn-in and orientation. It is desirable that the diamine having a side chain should be used in an amount such that the characteristics of the invention are not spoiled.

The diamine having no side chains will be explained. A known diamine having no side chains includes diamines of formulas (DI-1) to (DI-12) or hydrazides of formulas (DI-13) to (DI-15) described below. The diamine includes hydrazides herein.

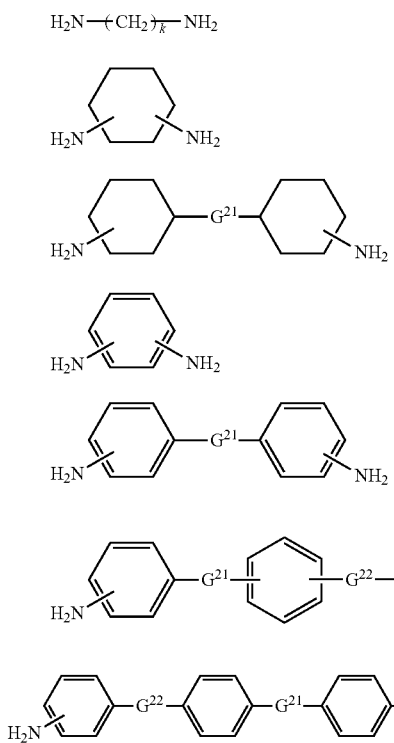
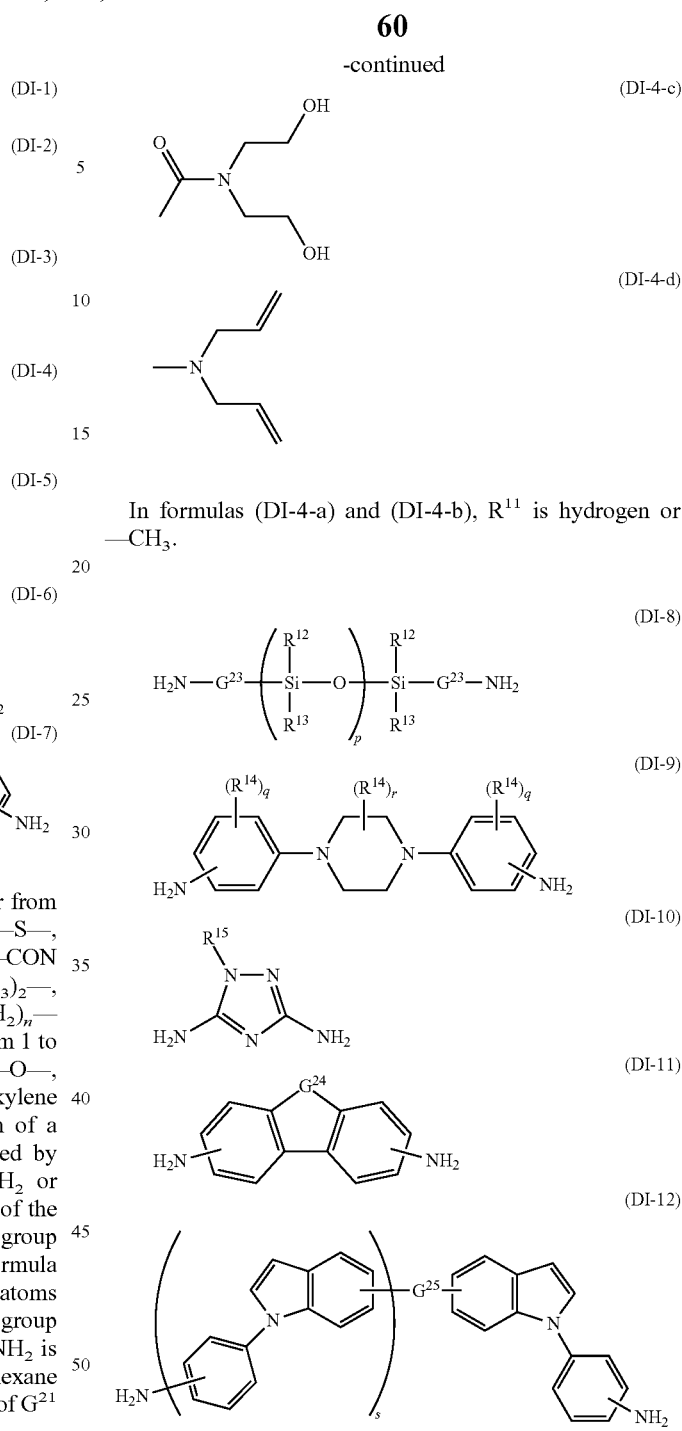
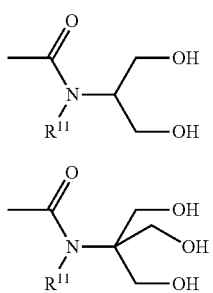

In formula (DI-1) to formula (DI-7), k is an integer from 1 to 12; $G^{21}$ is a single bond, —NH—, —O—, —S—, —S—S—, —SO$_2$—, —CO—, —CONH—, —CON(CH$_3$)—, —NHCO—, —C(CH$_3$)$_2$—C(CF$_3$)$_2$—, —(CH$_2$)$_m$—, —O—(CH$_2$)$_m$—O—, —N(CH$_3$)—(CH$_2$)$_n$—N(CH$_3$)— or —S—(CH$_2$)$_m$—S—; m is an integer from 1 to 12; n is an integer from 1 to 5; $G^{22}$ is a single bond, —O—, —S—, —CO—, —C(CH$_3$)$_2$—, —C(CF$_3$)$_2$— or alkylene having 1 to 10 carbons; and at least one hydrogen of a cyclohexane ring or a benzene ring may be replaced by fluorine, —CH$_3$, —OH, —CF$_3$, —CO$_2$H, —CONH$_2$ or benzyl, and in formula (DI-4), at least one hydrogen of the benzene ring may be replaced by an monovalent group represented by the following formula (DI-4-a) to formula (DI-4-d). A group can be bonded to any one of carbon atoms constituting a ring when the bonding position of the group is not fixed to any one of the carbon atoms. And —NH$_2$ is bonded to any one of the bonding positions on a cyclohexane ring or a benzene ring excluding the bonding position of $G^{21}$ or $G^{22}$.

In formulas (DI-4-a) and (DI-4-b), $R^{11}$ is hydrogen or —CH$_3$.

In formula (DI-8) to formula (DI-12), $R^{12}$ and $R^{13}$ are independently alkyl having 1 to 3 carbons or phenyl; $G^{23}$ is alkylene having 1 to 6 carbons, phenylene or alkyl substituted-phenylene; p is an integer from 1 to 10; $R^{14}$ is alkyl having 1 to 5 carbons, alkoxy having 1 to 5 carbons or chlorine; q is an integer from 0 to 3; r is an integer from 0 to 4; $R^{15}$ is hydrogen, alkyl having 1 to 4 carbons, phenyl or benzyl; $G^{24}$ is —CH$_2$— or —NH—; $G^{25}$ is a single bond, alkylene having 2 to 6 carbons or 1,4-phenylene; s is 0 or 1; a group can be bonded to any one of carbon atoms constituting a ring when the bonding position of the group is not fixed to any one of the carbon atoms; and —NH$_2$ is bonded to any one of the bonding positions on a benzene ring.

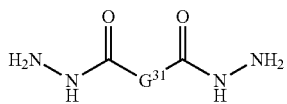
(DI-13)

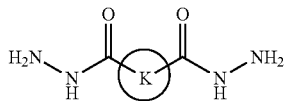
(DI-14)

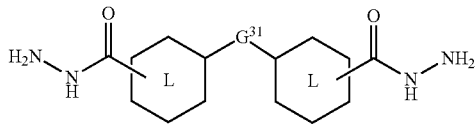
(DI-15)

In formula (DI-13) to formula (DI-15), $G^{31}$ is a single bond, alkylene having 1 to 20 carbons, —CO—, —O—, —S—, —SO$_2$—, —C(CH$_3$)$_2$— or —C(CF$_3$)$_2$—; ring K is a cyclohexane ring, a benzene ring or a naphthalene ring, and in these groups at least one hydrogen may be replaced by methyl, ethyl or phenyl; and ring L is a cyclohexane ring or a benzene ring, and in these groups at least one hydrogen may be replaced by methyl, ethyl or phenyl.

Specific examples of the diamine having no side chains, of formulas (DI-1) to (DI-15) described above include diamines of formulas (DI-1-1) to (DI-15-6).

Examples of diamines represented by formulas (DI-1) to (DI-3) are shown below.

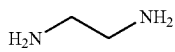
(DI-1-1)

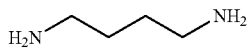
(DI-1-2)

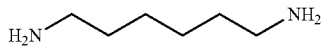
(DI-1-3)

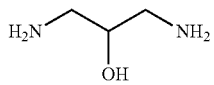
(DI-1-4)

(DI-2-1)

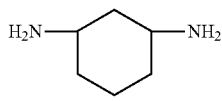
(DI-2-2)

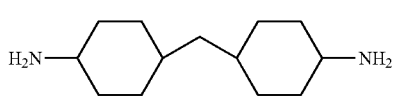
(DI-3-1)

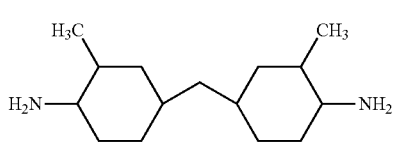
(DI-3-2)

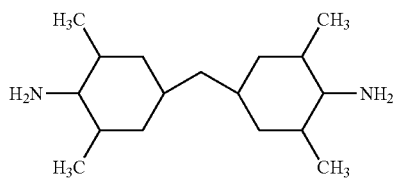
(DI-3-3)

Examples of a diamine represented by formula (DI-4) are shown below.

(DI-4-1)

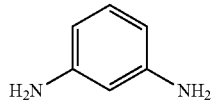
(DI-4-2)

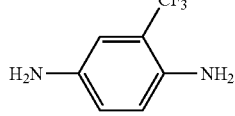
(DI-4-3)

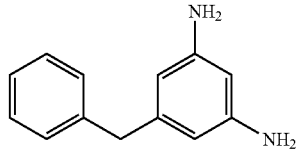
(DI-4-4)

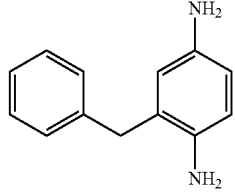
(DI-4-5)

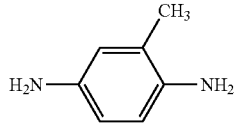
(DI-4-6)

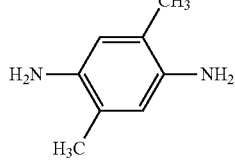
(DI-4-7)

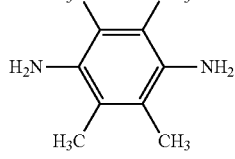
(DI-4-8)

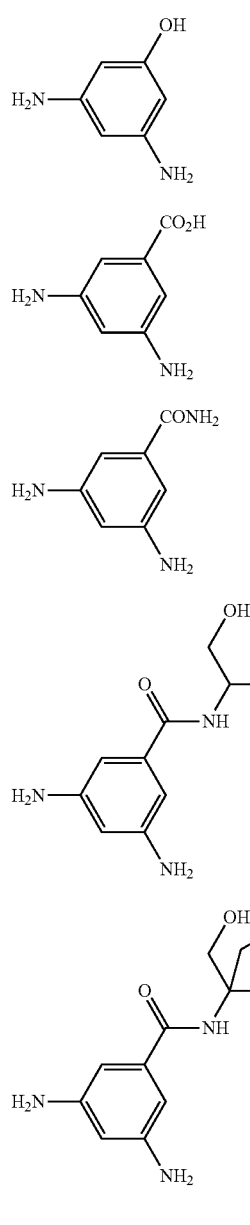
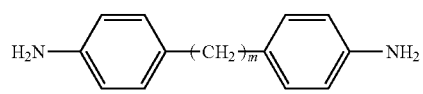
Examples of a diamine represented by formula (DI-5) are shown below.
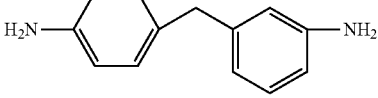
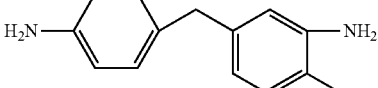
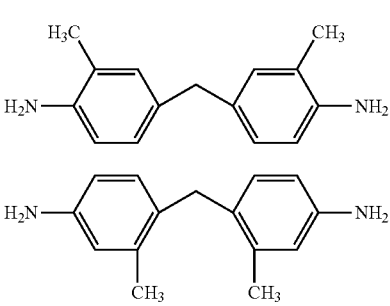
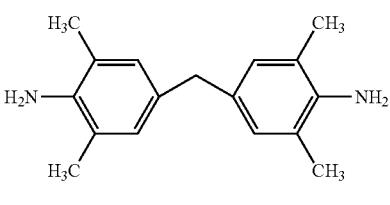
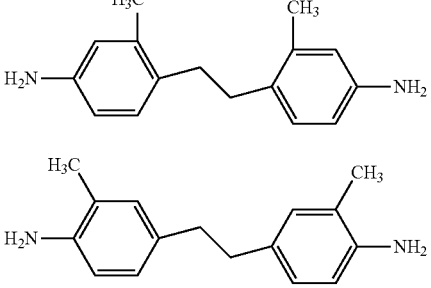
In formula (DI-5-1), m is an integer from 1 to 12.
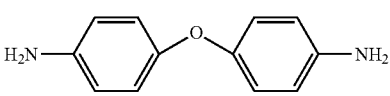
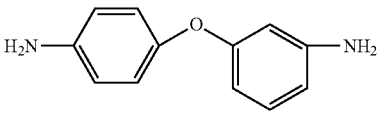
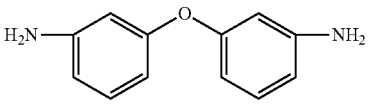
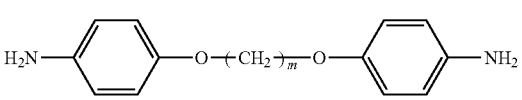

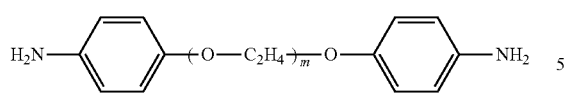
(DI-5-13)
In formula (DI-5-12) and formula (DI-5-13), m is an integer from 1 to 12.
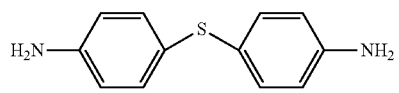
(DI-5-14)
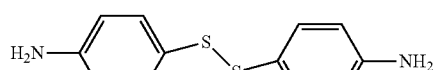
(DI-5-15)
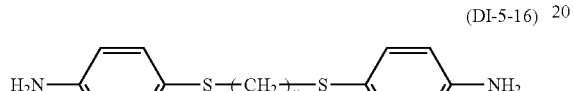
(DI-5-16)
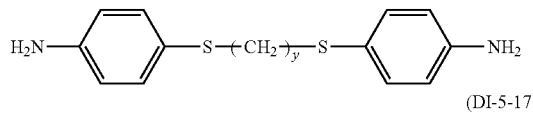
(DI-5-17)
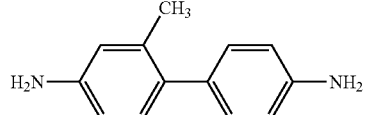
(DI-5-18)
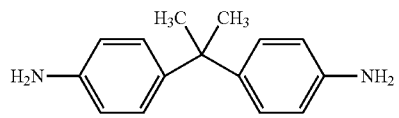
(DI-5-19)
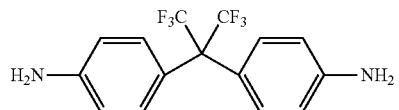
(DI-5-20)
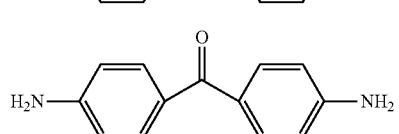
(DI-5-21)
In formula (DI-5-16), y is an integer from 1 to 6.
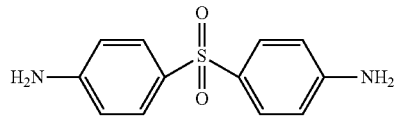
(DI-5-22)
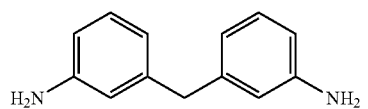
(DI-5-23)
(DI-5-24)
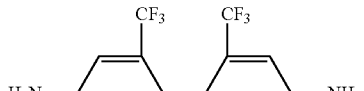
(DI-5-25)
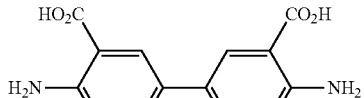
(DI-5-26)
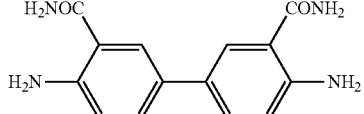
(DI-5-27)
(DI-5-28)
(DI-5-29)
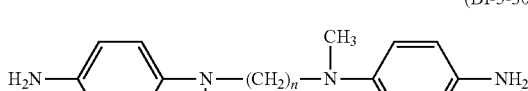
(DI-5-30)
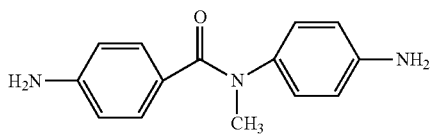
(DI-5-31)
In formula (DI-5-30), n is an integer from 1 to 5.
Examples of a diamine represented by formula (DI-6) are shown below.
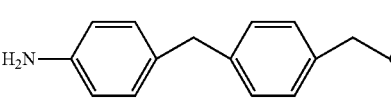
(DI-6-1)
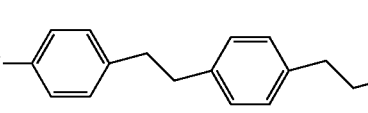
(DI-6-2)
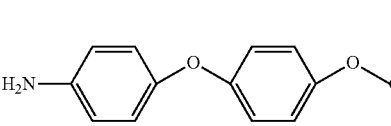
(DI-6-3)

(DI-6-4)
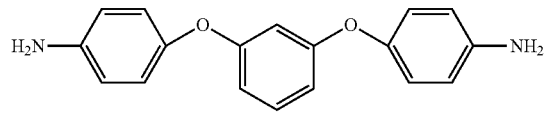
(DI-6-5)
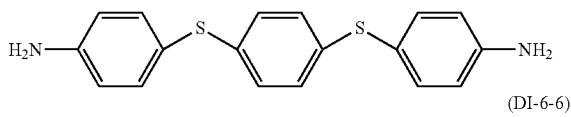
(DI-6-6)
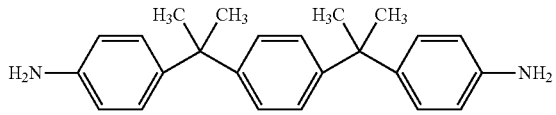
(DI-6-7)
Examples of a diamine represented by formula (DI-7) are shown below.
(DI-7-1)
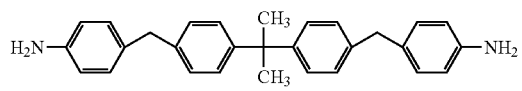
(DI-7-3)
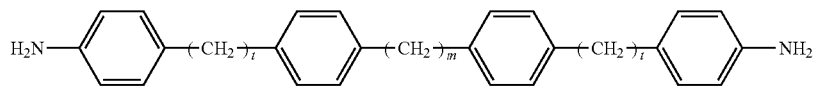
(DI-7-4)
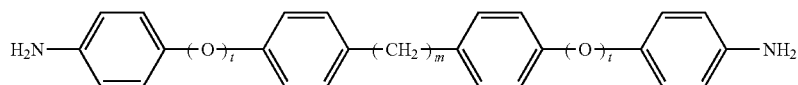
(DI-7-5)
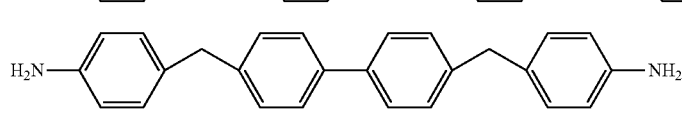
In formulas (DI-7-3) and (DI-7-4), m is an integer from 1 to 12, and t is 1 or 2.
(DI-7-6)
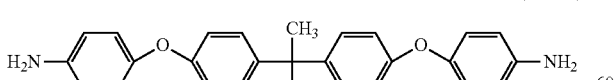
(DI-7-7)
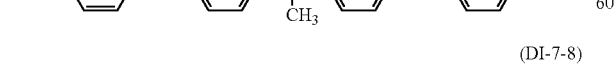
(DI-7-8)
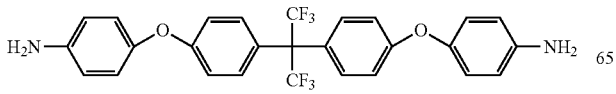
(DI-7-9)
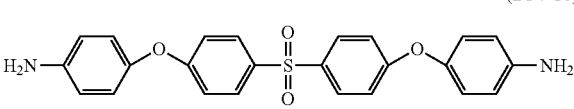
(DI-7-10)
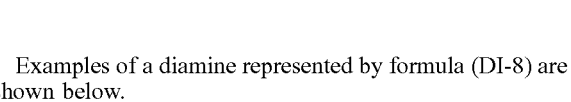
Examples of a diamine represented by formula (DI-8) are shown below.
(DI-8-1)
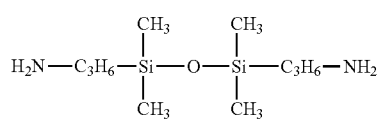
Examples of a diamine represented by formula (DI-9) are shown below.
(DI-9-1)
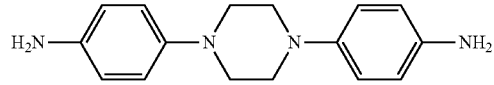
(DI-9-2)
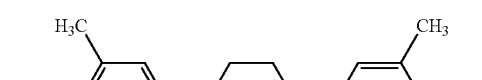
(DI-9-3)
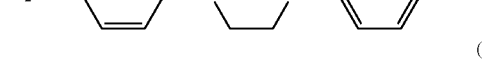
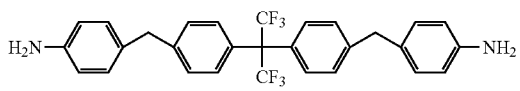
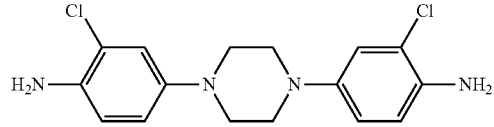

-continued

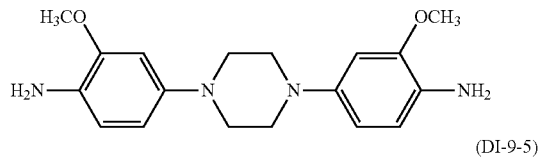
(DI-9-4)

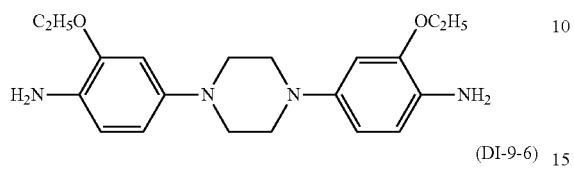
(DI-9-5)

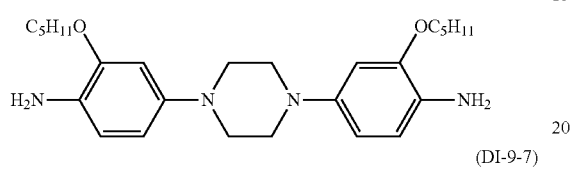
(DI-9-6)

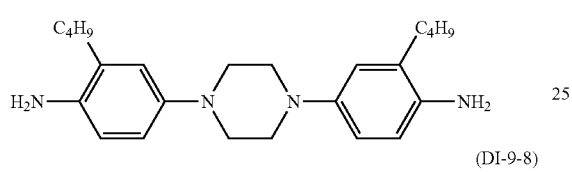
(DI-9-7)

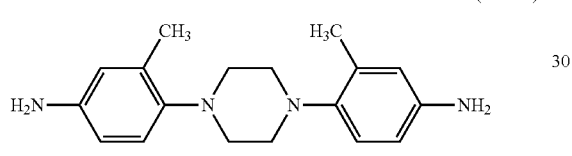
(DI-9-8)

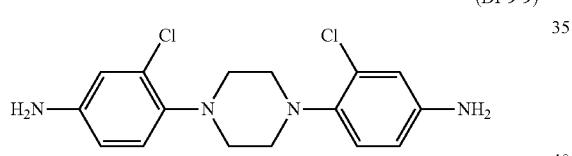
(DI-9-9)

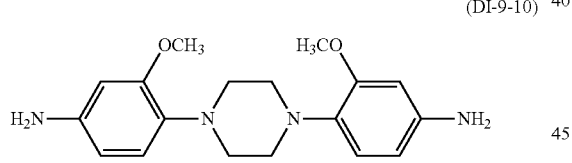
(DI-9-10)

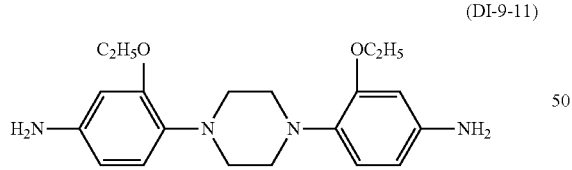
(DI-9-11)

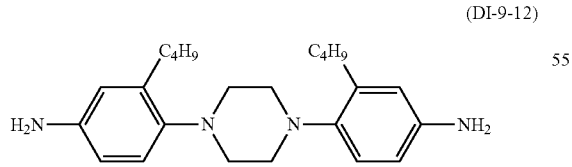
(DI-9-12)

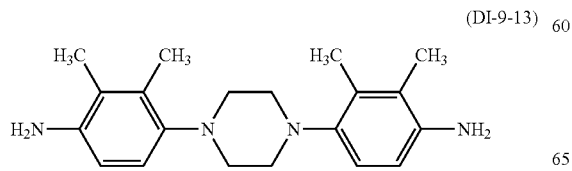
(DI-9-13)

Examples of a diamine represented by formula (DI-10) are shown below.

(DI-10-1)

(DI-10-2)

(DI-10-3)

Examples of a diamine represented by formula (DI-11) are shown below.

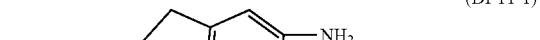
(DI-11-1)

(DI-11-2)

Examples of a diamine represented by formula (DI-12) are shown below.

(DI-12-1)

Examples of a diamine represented by formula (DI-13) are shown below.

(DI-13-1)

(DI-13-2)

In formula (DI-13-2), t is an integer from 1 to 12.

Examples of a diamine represented by formula (DI-14) are shown below.

(DI-14-1)
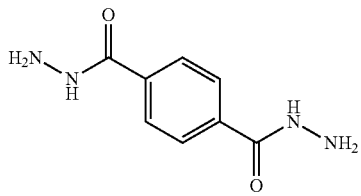

(DI-14-2)
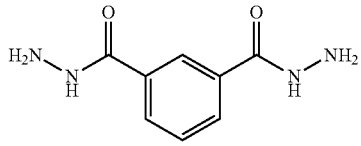

(DI-14-3)
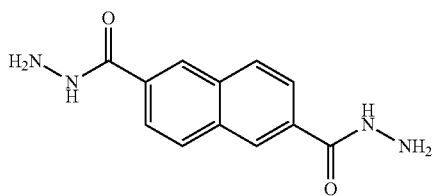

Examples of a diamine represented by formula (DI-15) are shown below.

(DI-15-1)
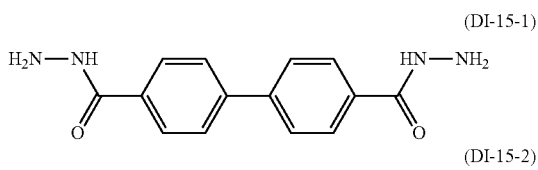

(DI-15-2)
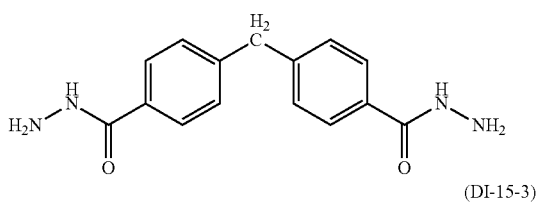

(DI-15-3)
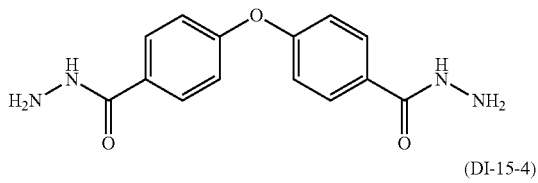

(DI-15-4)
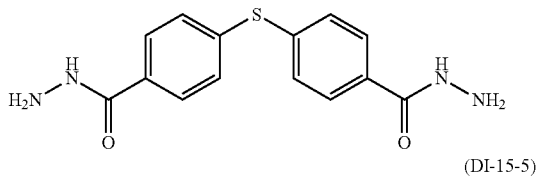

(DI-15-5)
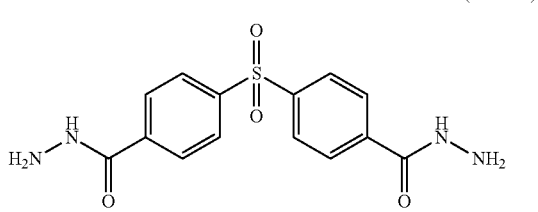

(DI-15-6)
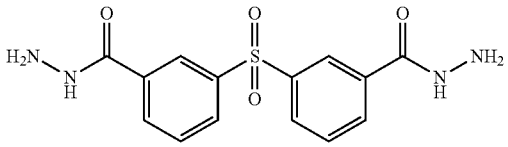

The diamine having a side chain will be explained. The side chain group of the diamine having a side chain includes groups described below.

First, the side chain group includes alkyl, alkyloxy, alkyloxyalkyl, alkylcarbonyl, alkylcarbonyloxy, alkyloxycarbonyl, alkylaminocarbonyl, alkenyl, alkenyloxy, alkenylcarbonyl, alkenylcarbonyloxy, alkenyloxycarbonyl, alkenylaminocarbonyl, alkynyl, alkynyloxy, alkynyl carbonyl, alkynylcarbonyloxy, alkynyloxycarbonyl or alkynylaminocarbonyl. These groups may be straight-chain or branched-chain. In these groups, alkyl, alkenyl and alkynyl have 3 or more carbons, with the proviso that 3 or more carbons in a whole group may be sufficient for alkyloxyalkyl.

Next, the side chain group includes a group having a ring structure such as phenyl, phenylalkyl, phenylalkyloxy, phenyloxy, phenylcarbonyl, phenylcarbonyloxy, phenyloxycarbonyl, phenylaminocarbonyl, phenylcyclohexyloxy, cycloalkyl having 3 or more carbons, cyclohexylalkyl, cyclohexyloxy, cyclohexyloxycarbonyl, cyclohexylphenyl, cyclohexylphenylalkyl, cyclohexylphenyloxy, bis(cyclohexyl)oxy, bis(cyclohexyl)alkyl, bis(cyclohexyl)phenyl, bis(cyclohexyl)phenylalkyl, bis(cyclohexyl)oxycarbonyl, bis(cyclohexyl)phenyloxycarbonyl or cyclohexylbis(phenyl)oxycarbonyl, with the proviso that the terminal ring has alkyl having one or more carbons, alkoxy having one or more carbons or alkoxyalkyl having two or more carbons as a substituent.

The side chain group further includes a ring assembly group that is a group having two or more benzene rings, a group having two or more cyclohexane rings or a group having two or more of rings including a benzene ring and a cyclohexane ring, where the bonding group is independently a single bond, —O—, —COO—, —OCO—, —CONH— or alkylene having 1 to 3 carbons and the terminal ring has alkyl having 1 or more carbons, fluorine-substituted alkyl having 1 or more carbons, alkoxy having 1 or more carbons or alkoxyalkyl having 2 or more carbons as a substituent. A group having a steroid skeleton is effective as a side chain group.

The diamine having a side chain includes compounds represented by formulas (DI-16) to (DI-20) described below.

(DI-16)
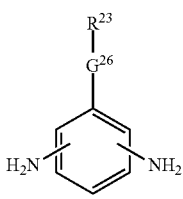

In formula (DI-16), $G^{26}$ is a single bond, —O—, —COO—, —OCO—, —CO—, —CONH—, —CH$_2$O—, —OCH$_2$—, —CF$_2$O—, —OCF$_2$— or —(CH$_2$)$_A$—, and A is an integer from 1 to 12. A desirable example of $G^{26}$ is a single bond, —O—, —COO—, —OCO—, —CH$_2$O— or alkylene having 1 to 3 carbons. An especially desirable example is a single bond, —O—, —COO—, —OCO—, —CH$_2$O—, —CH$_2$— or —CH$_2$CH$_2$—. R$^{23}$ is alkyl having 3 to 30 carbons, phenyl, a group having a steroid skeleton, or a group represented by formula (DI-16-a) described below. In the alkyl, at least one hydrogen may be replaced by fluorine, and at least one —CH$_2$— may be replaced by —O—, —CH=CH— or —C≡C—. In the phenyl, hydrogen may be replaced by fluorine, —CH$_3$, —OCH$_3$, —OCH$_2$F, —OCHF$_2$, —OCF$_3$, alkyl having 3 to 30 carbons or alkoxy having 3 to 30 carbons. —NH$_2$ is bonded to any one of the bonding positions on a benzene ring. A desirable bonding position is meta or para. That is to say, it is desirable that two bonding positions should be 3- and 5-positions or 2- and 5-positions when the bonding position of group "R$^{23}$-G$^{26}$-" is 1-position.

(DI-16-a)

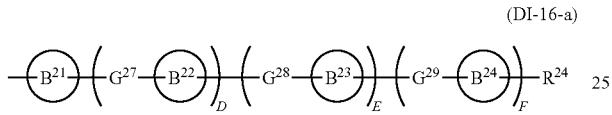

In formula (DI-16-a), G$^{27}$, G$^{28}$ and G$^{29}$ are bonding groups, and these are independently a single bond or alkylene having 1 to 12 carbons, and in the alkylene at least one —CH$_2$— may be replaced by —O—, —COO—, —OCO—, —CONH— or —CH=CH—. Ring B$^{21}$, ring B$^{22}$, ring B$^{23}$ and ring B$^{24}$ are independently 1,4-phenylene, 1,4-cyclohexylene, 1,3-dioxane-2,5-diyl, pyrimidine-2,5-diyl, pyridine-2,5-diyl, naphthalene-1,5-diyl, naphthalene-2,7-diyl or anthracene-9,10-diyl. In ring B$^{21}$, ring B$^{22}$, ring B$^{23}$ and ring B$^{24}$, at least one hydrogen may be replaced by fluorine or —CH$_3$. D, E and F are independently an integer from 0 to 2, and the sum of these is 1 to 5. When D, E or F is 2, two bonding groups in each parentheses may be the same or different, and two rings may be the same or different. R$^{24}$ is fluorine, —OH, alkyl having 1 to 30 carbons, fluorine-substituted alkyl having 1 to 30 carbons, alkoxy having 1 to 30 carbons, —CN, —OCH$_2$F, —OCHF$_2$ or —OCF$_3$, and in the alkyl having 1 to 30 carbons at least one —CH$_2$— may be replaced by a divalent group represented by the following formula (DI-16-b).

(DI-16-b)

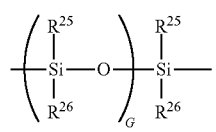

In formula (DI-16-b), R$^{25}$ and R$^{26}$ are independently alkyl having 1 to 3 carbons, and G is an integer from 1 to 6. Desirable examples of R$^{24}$ are alkyl having 1 to 30 carbons and alkoxy having 1 to 30 carbons.

(DI-17)

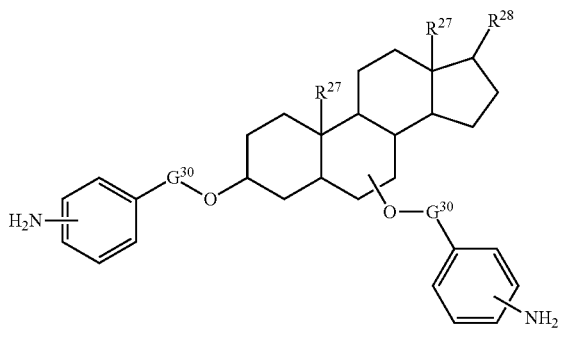

(DI-18)

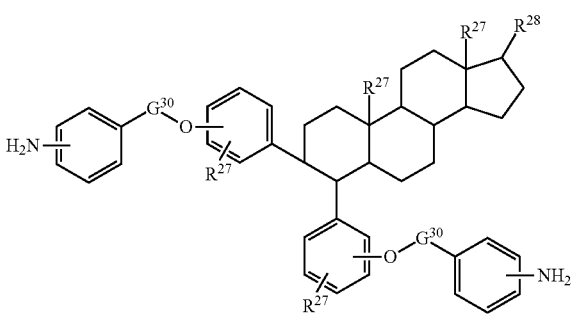

In formula (DI-17) and formula (DI-18), G$^{30}$ is a single bond, —CO— or —CH$_2$—, R$^{27}$ is hydrogen or —CH$_3$, and R$^{28}$ is hydrogen, alkyl having 1 to 20 carbons or alkenyl having 2 to 20 carbons. In formula (DI-18), one hydrogen of the benzene ring may be replaced by alkyl having 1 to 20 carbons or phenyl. A group can be bonded to any one of carbon atoms constituting a ring when the bonding position of the group is not fixed to any one of the carbon atoms. It is desirable that in formula (DI-17), one of two "-phenylene-G$^{30}$—O—" groups should be bonded to 3-position of the steroid nuclei, and the other should be bonded to 6-position of the steroid nuclei. It is desirable that in formula (DI-18), the bonding positions of two "-phenylene-G$^{30}$—O—" groups to the benzene ring should be meta or para to the bonding position of the steroid nuclei. In formula (DI-17) and formula (DI-18), —NH$_2$ is bonded to any one of the bonding positions on a benzene ring.

(DI-19)

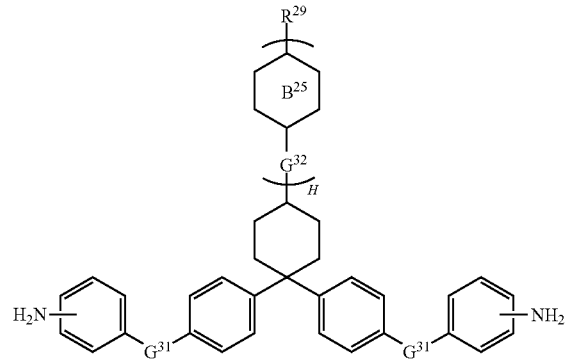

(DI-20)

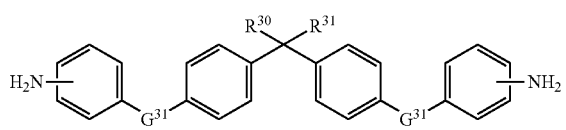

In formula (DI-19) and formula (DI-20), $G^{31}$ is independently —O— or alkylene having 1 to 6 carbons, and $G^{32}$ is a single bond or alkylene having 1 to 3 carbons. $R^{29}$ is hydrogen or alkyl having 1 to 20 carbons, and in the alkyl at least one —$CH_2$— may be replaced by —O—, —CH=CH— or —C≡C—. $R^{30}$ is alkyl having 6 to 22 carbons, and $R^{31}$ is hydrogen or alkyl having 1 to 22 carbons. Ring $B^{25}$ is 1,4-phenylene or 1,4-cyclohexylene, and H is 0 or 1. —$NH_2$ is bonded to any one of the bonding positions on a benzene ring. It is desirable that each —$NH_2$ should be located in a meta-position or a para-position to the bonding position of $G^{31}$.

Specific examples of the diamine having a side chain will be shown below. The diamine having a side chain represented by formulas (DI-16) to (DI-20) described above includes compounds represented by formulas (DI-16-1) to (DI-20-3) described below.

Examples of a compound represented by formula (DI-16) are shown below.

(DI-16-1)

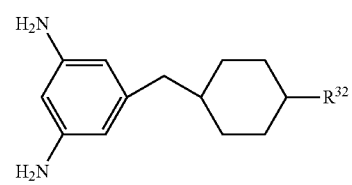

(DI-16-2)

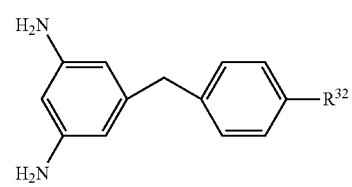

(DI-16-3)

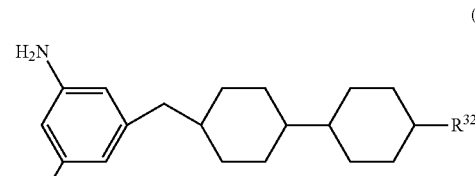

(DI-16-4)

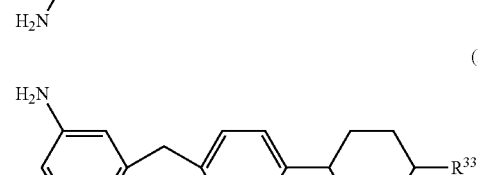

(DI-16-5)

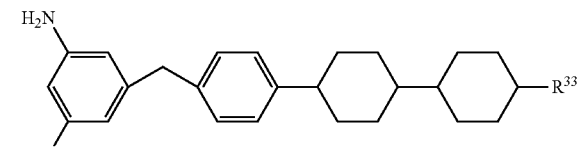

(DI-16-6)

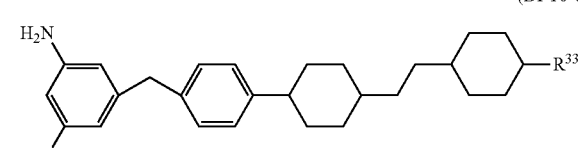

(DI-16-7)

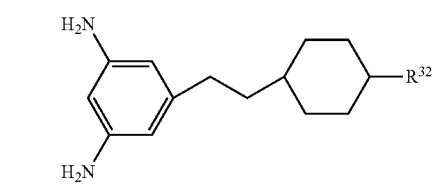

(DI-16-8)

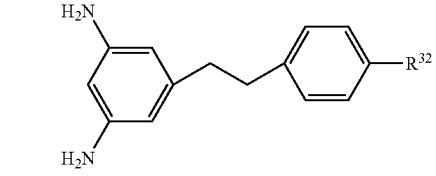

(DI-16-9)

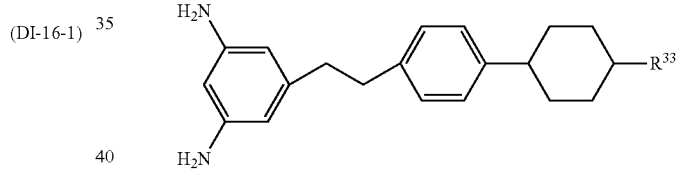

(DI-16-10)

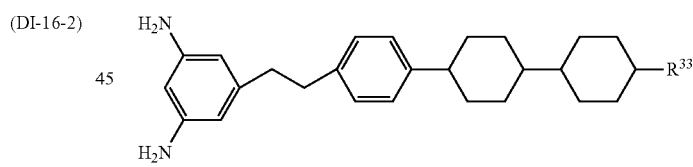

(DI-16-11)

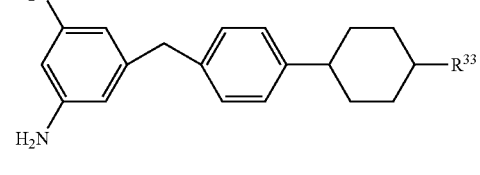

In formulas (DI-16-1) to (DI-16-11), $R^{32}$ is alkyl having 1 to 30 carbons or alkoxy having 1 to 30 carbons, and preferably alkyl having 5 to 25 carbons or alkoxy having 5 to 25 carbons. $R^{33}$ is alkyl having 1 to 30 carbons or alkoxy having 1 to 30 carbons, and preferably alkyl having 3 to 25 carbons or alkoxy having 3 to 25 carbons.

(DI-16-12) 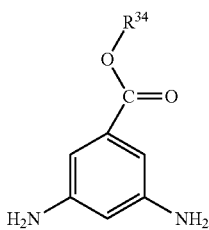
(DI-16-13) 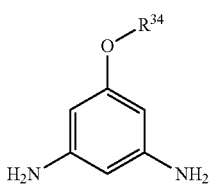
(DI-16-14) 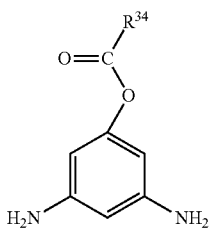
(DI-16-15) 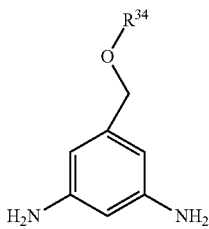
(DI-16-16) 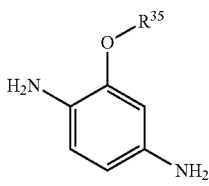
(DI-16-17) 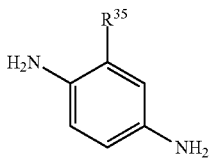
In formulas (DI-16-12) to (DI-16-17), $R^{34}$ is alkyl having 4 to 30 carbons, and preferably alkyl having 6 to 25 carbons. $R^{35}$ is alkyl having 6 to 30 carbons, and preferably alkyl having 8 to 25 carbons.
(DI-16-18) 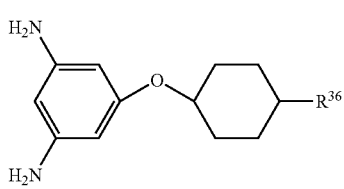
(DI-16-19) 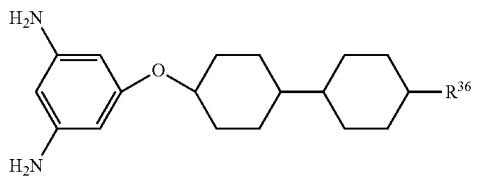
(DI-16-20) 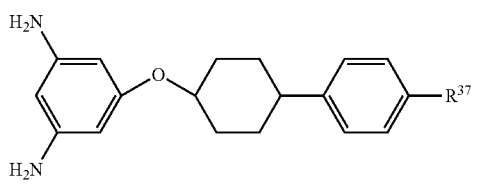
(DI-16-21) 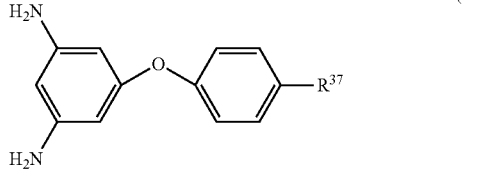
(DI-16-22) 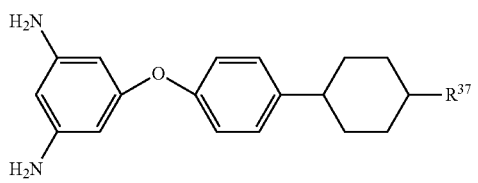
(DI-16-23) 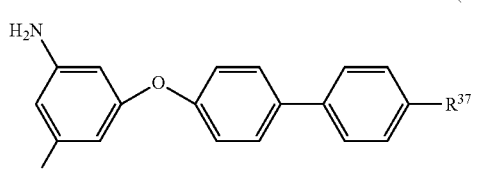
(DI-16-24) 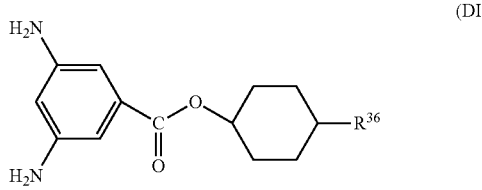
(DI-16-25) 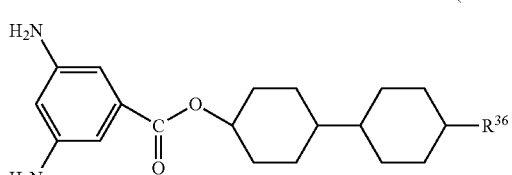
(DI-16-26) 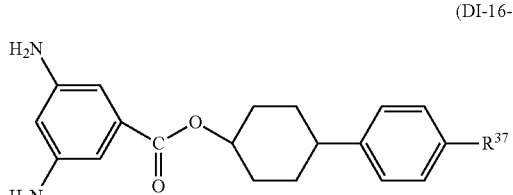

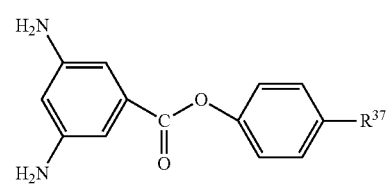 (DI-16-27)
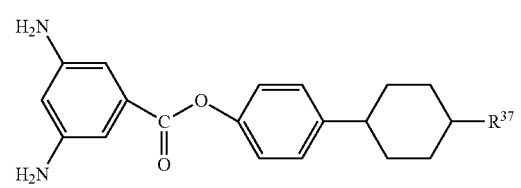 (DI-16-28)
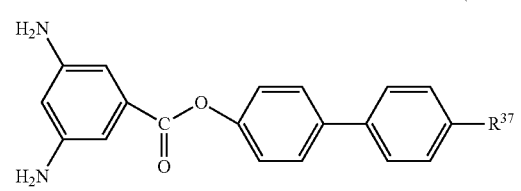 (DI-16-29)
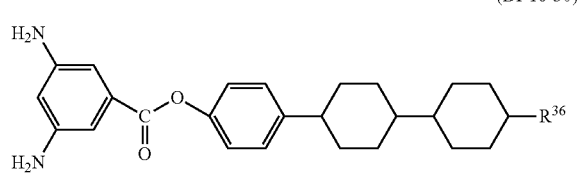 (DI-16-30)
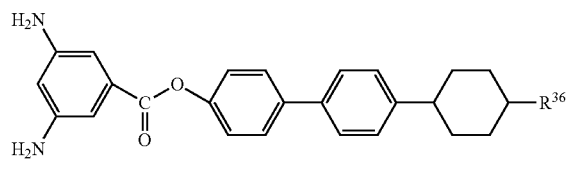 (DI-16-31)
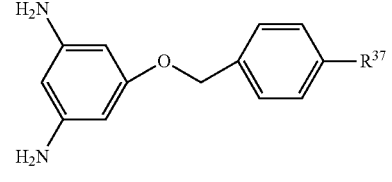 (DI-16-32)
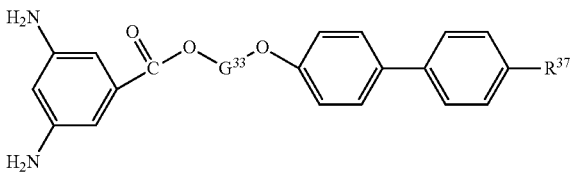 (DI-16-33)
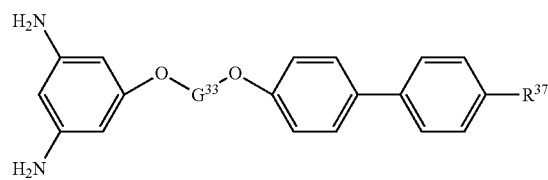 (DI-16-34)
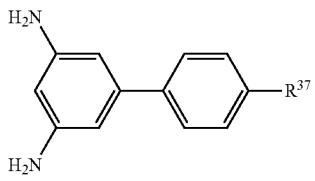 (DI-16-35)
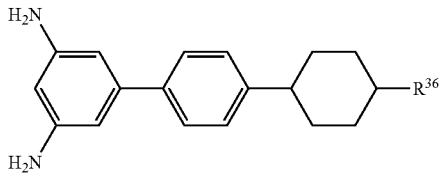 (DI-16-36)
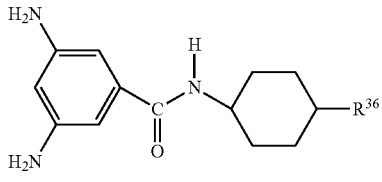 (DI-16-37)
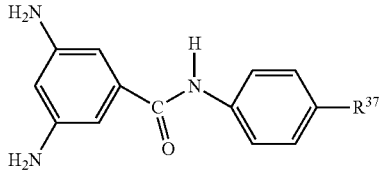 (DI-16-38)
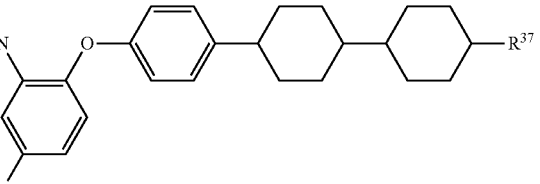 (DI-16-39)
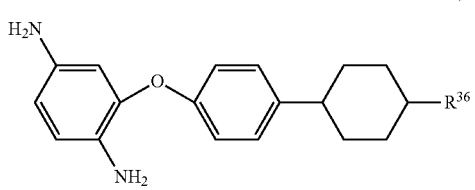 (DI-16-40)
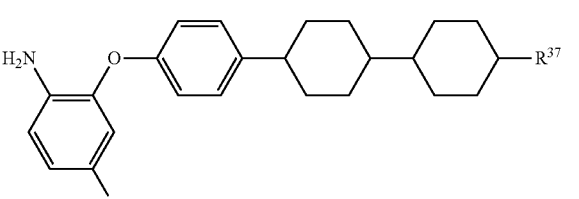 (DI-16-41)
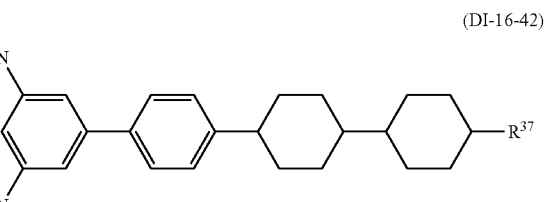 (DI-16-42)

(DI-16-43)

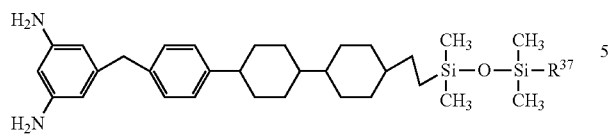

(DI-16-46)

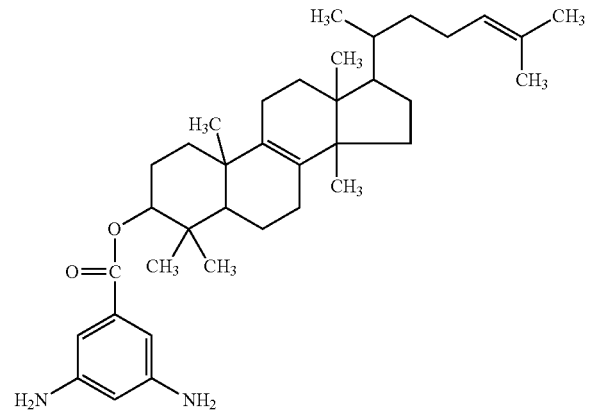

In formulas (DI-16-18) to (DI-16-43), $R^{36}$ is alkyl having 1 to 20 carbons or alkoxy having 1 to 20 carbons, and preferably alkyl having 3 to 20 carbons or alkoxy having 3 to 20 carbons. $R^{37}$ is hydrogen, fluorine, alkyl having 1 to 30 carbons, alkoxy having 1 to 30 carbons, —CN, —OCH$_2$F, —OCHF$_2$ or —OCF$_3$, and preferably alkyl having 3 to 25 carbons or alkoxy having 3 to 25 carbons. $G^{33}$ is alkylene having 1 to 20 carbons. Formulas (DI-16-44) to (DI-16-55) are examples of compounds having a steroid skeleton.

(DI-16-44)

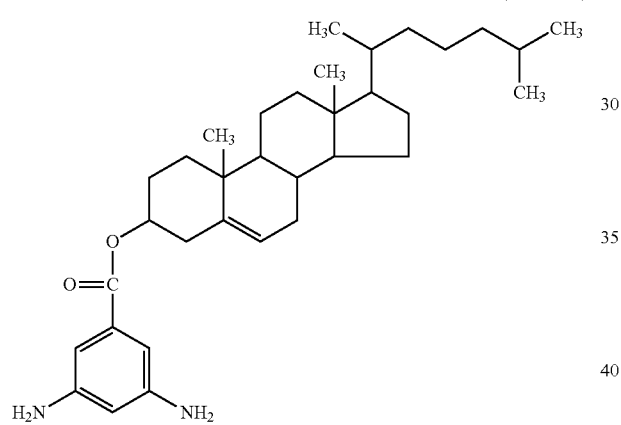

(DI-16-47)

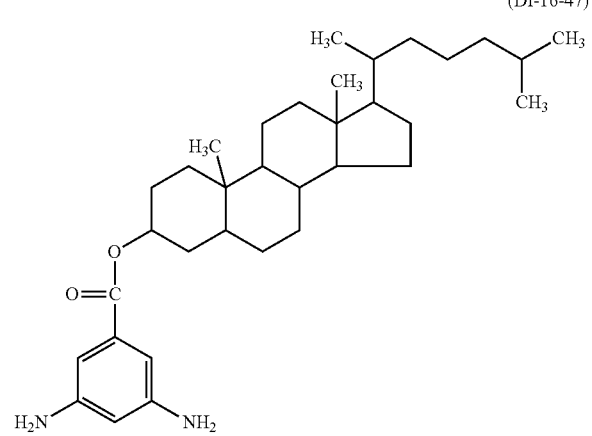

(DI-16-45)

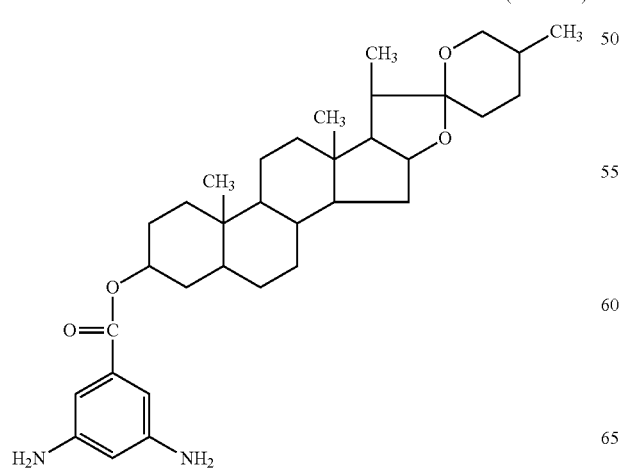

(DI-16-48)

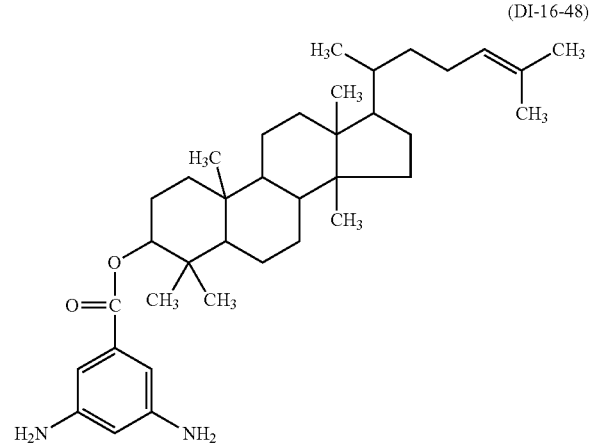

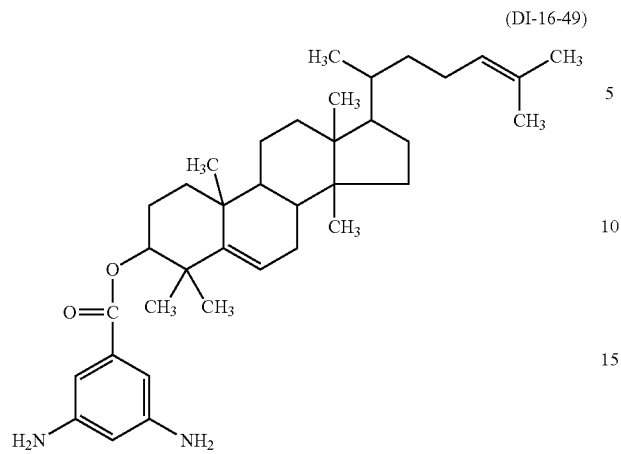
(DI-16-49)
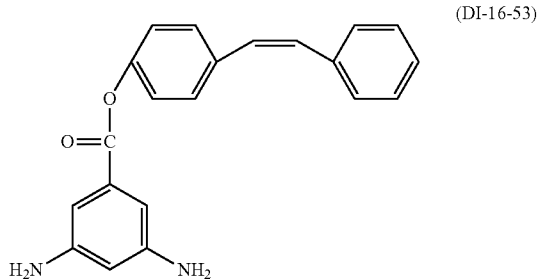
(DI-16-53)
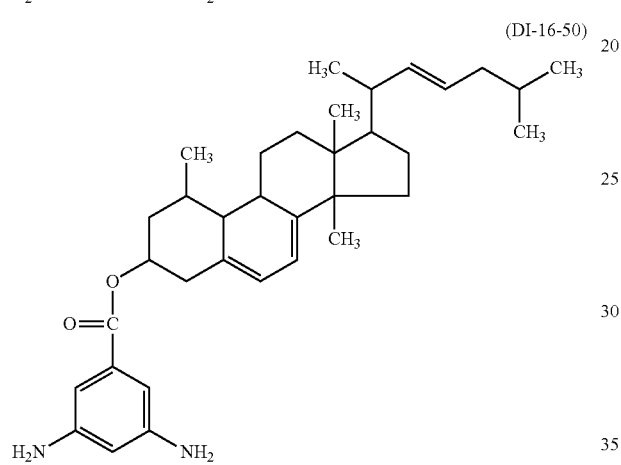
(DI-16-50)
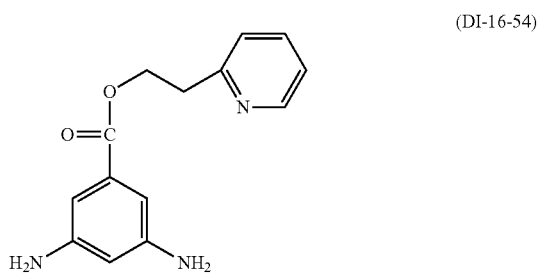
(DI-16-54)
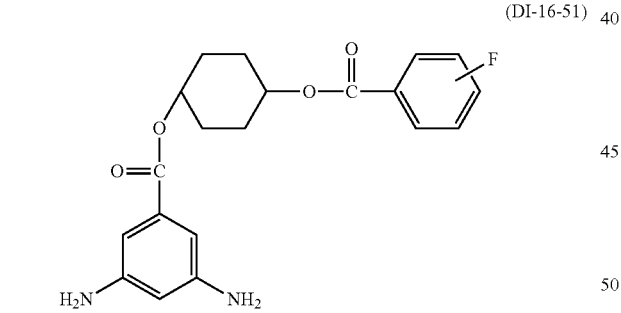
(DI-16-51)
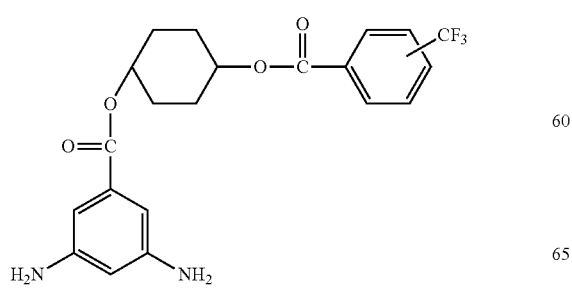
(DI-16-52)
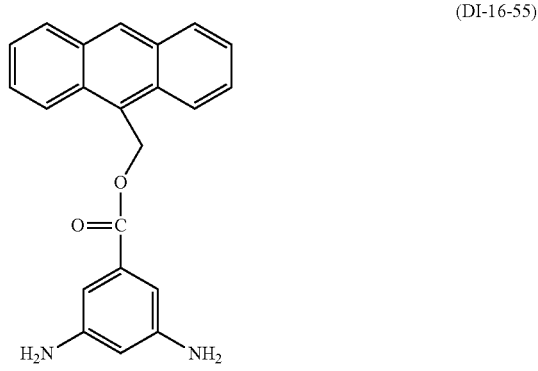
(DI-16-55)

Examples of a compound represented by formula (DI-17) are shown below.
(DI-17-1)
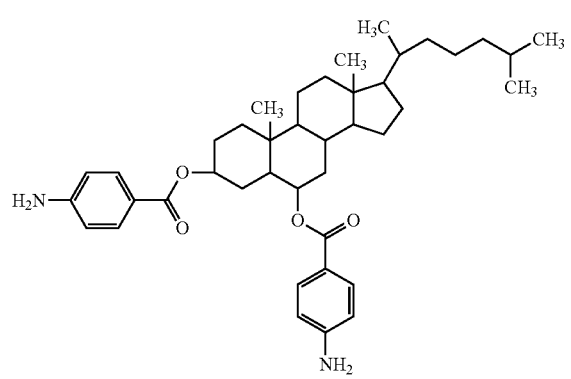
(DI-17-2)
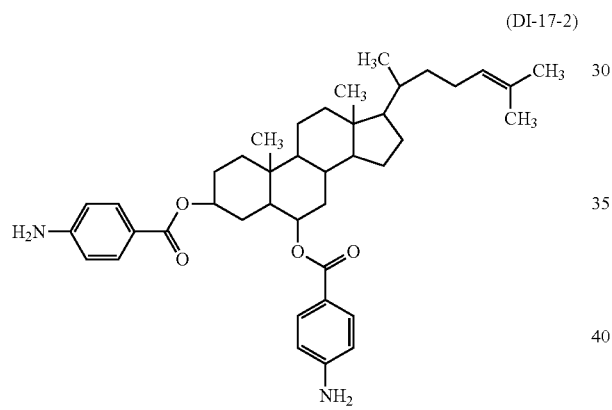
(DI-17-3)
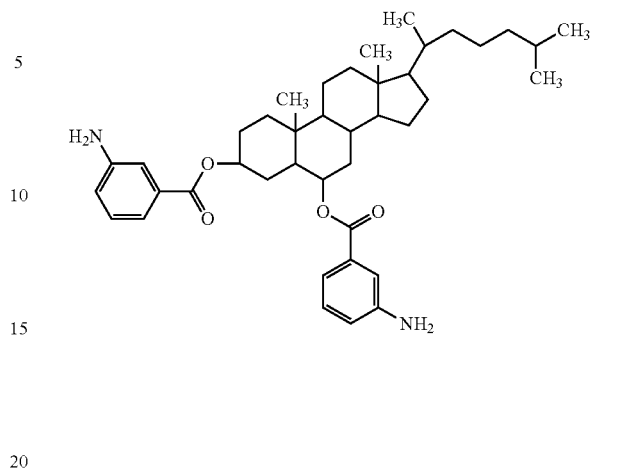
(DI-17-4)
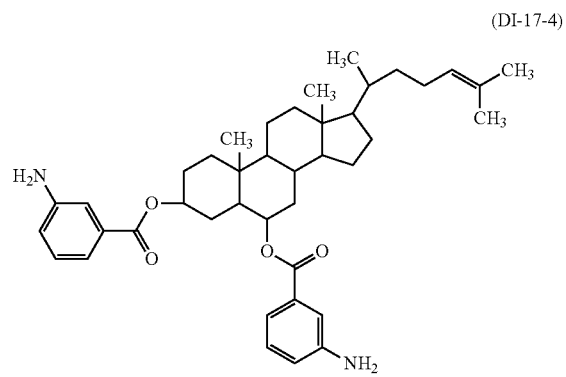
Examples of a compound represented by formula (DI-18) are shown below.
(DI-18-1)
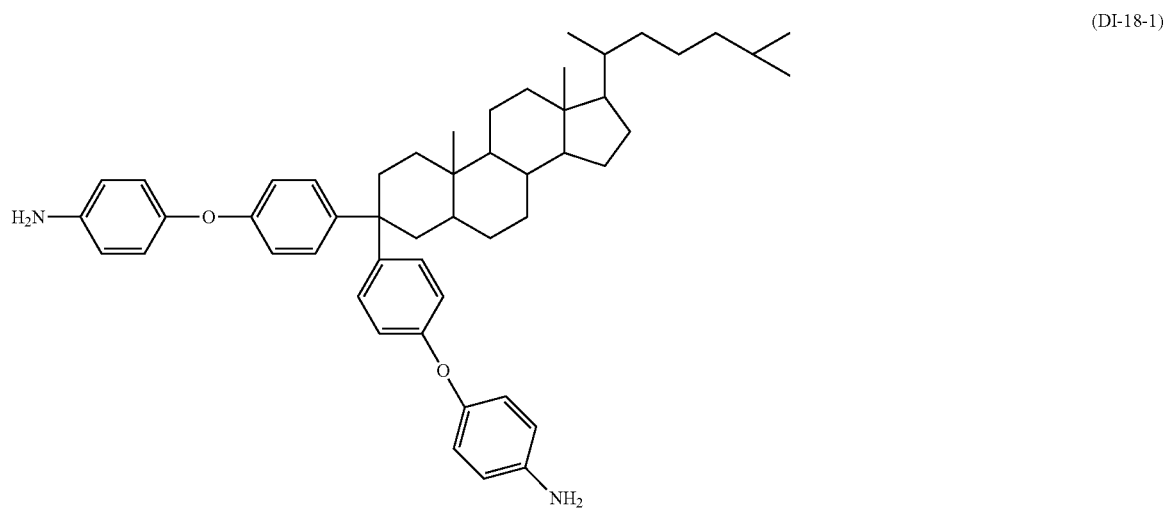

-continued
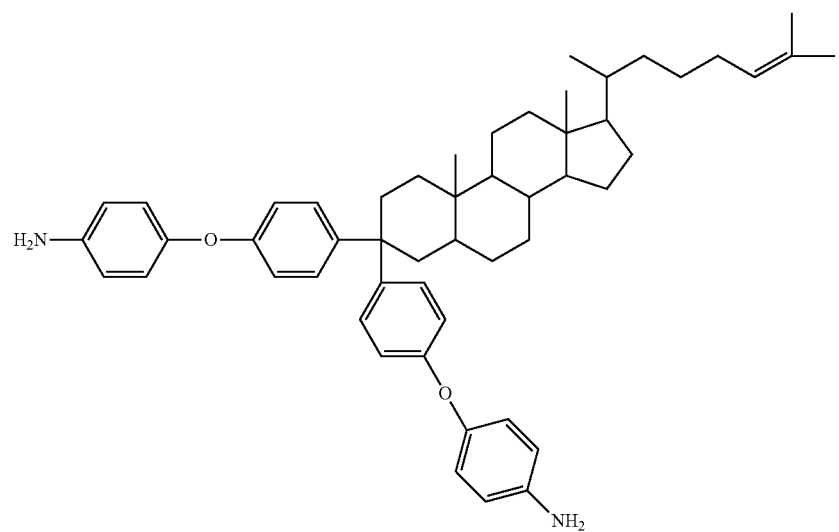
(DI-18-2)
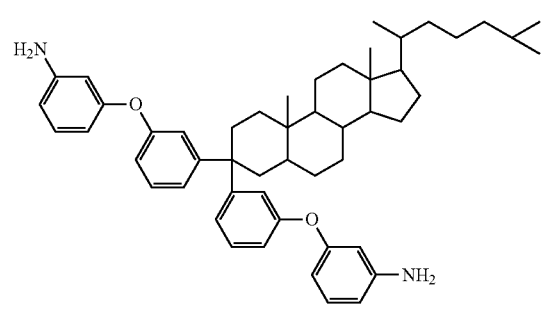
(DI-18-3)
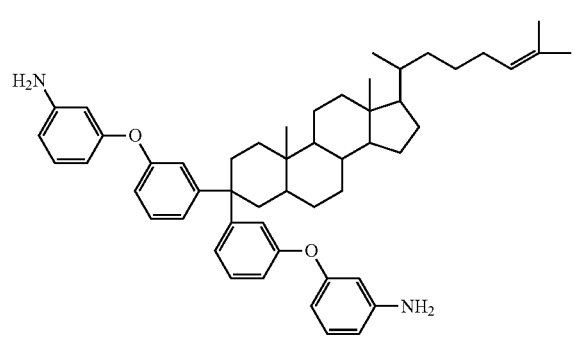
(DI-18-4)
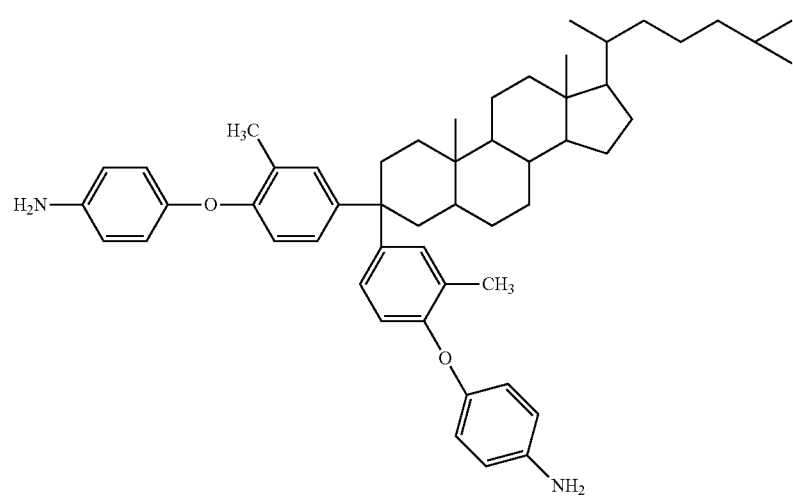
(DI-18-5)

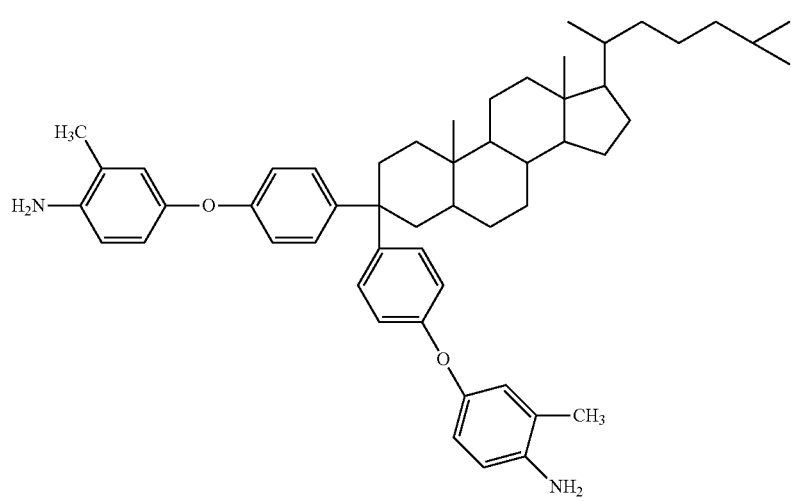
(DI-18-6)
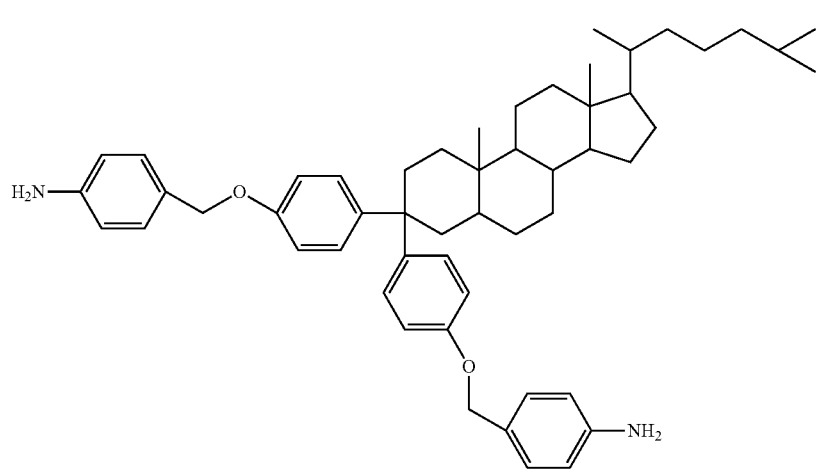
(DI-18-7)
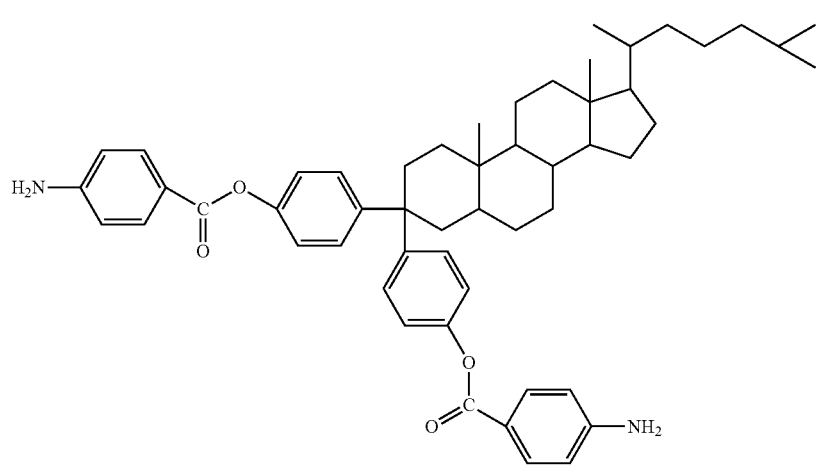
(DI-18-8)

Examples of a compound represented by formula (DI-19) are shown below.
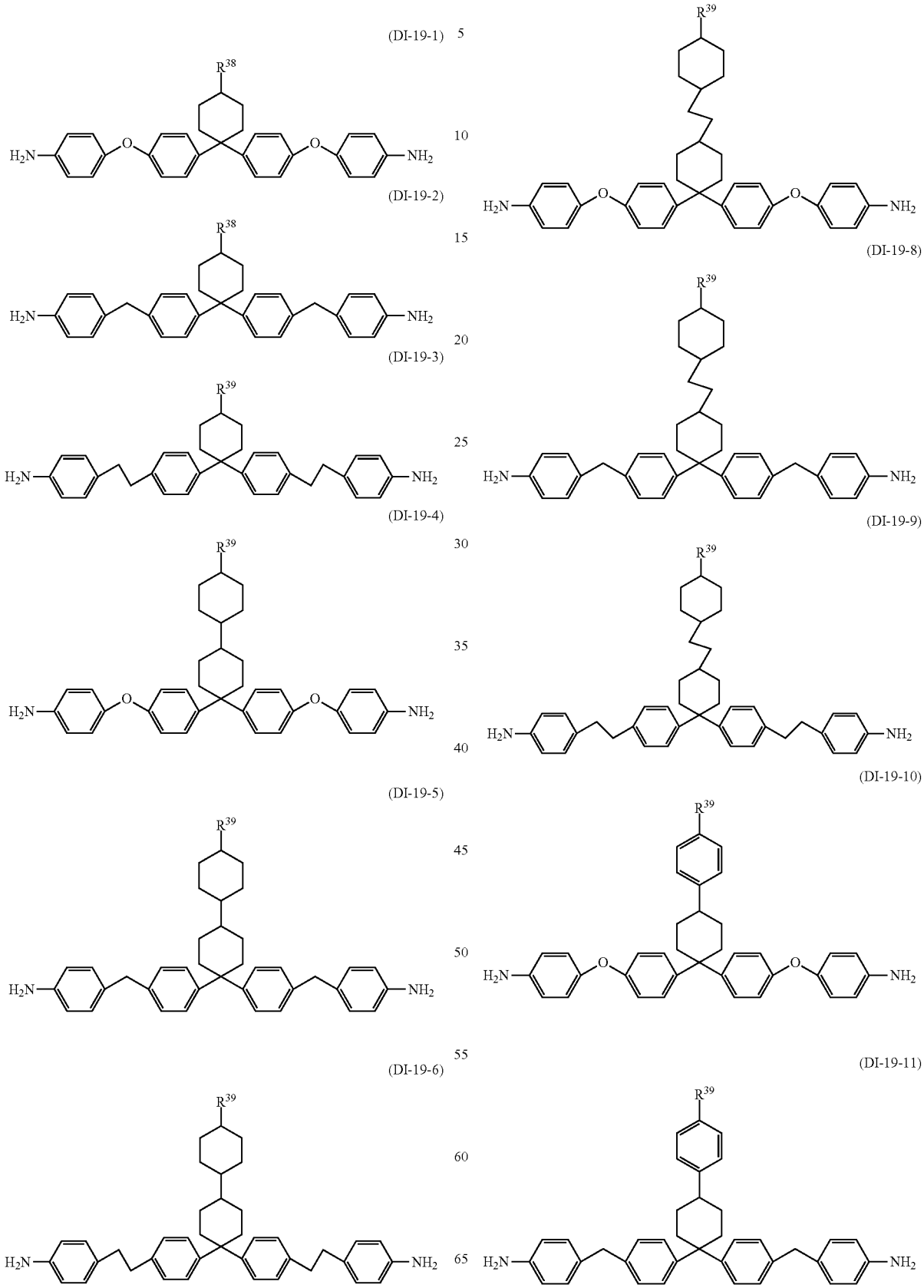

(DI-19-12)

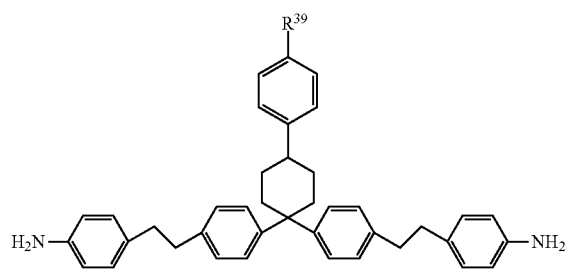

In formulas (DI-19-1) to (DI-19-12), $R^{38}$ is hydrogen or alkyl having 1 to 20 carbons, and preferably hydrogen or alkyl having 1 to 10 carbons, and $R^{39}$ is hydrogen or alkyl having 1 to 12 carbons.

Examples of a compound represented by formula (DI-20) are shown below.

(DI-20-1)

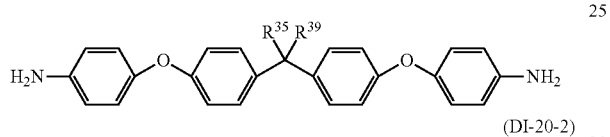

(DI-20-2)

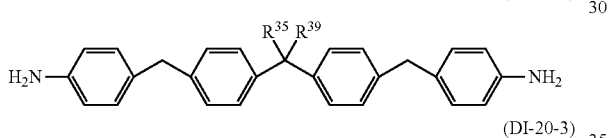

(DI-20-3)

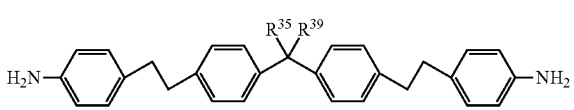

In formulas (DI-20-1) to (DI-20-3), $R^{35}$ is alkyl having 6 to 30 carbons, and $R^{39}$ is hydrogen or alkyl having 1 to 12 carbons.

Diamines excluding the photosensitive diamine represented by formula (XI-11) and the diamines represented by formulas (DI-1-1) to (DI-20-3), those of which are described above, can be used as the diamine of the invention. This kind of diamine includes the diamine having a side chain excluding the diamines of formulas (DI-16-1) to (DI-20-3).

Examples include compounds represented by the following formulas (DI-21-1) to (DI-21-8).

(DI-21-1)

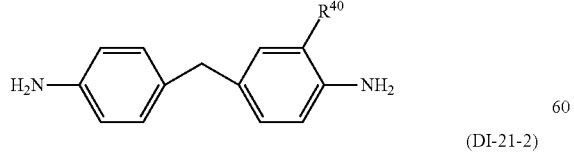

(DI-21-2)

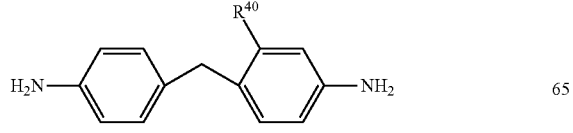

(DI-21-3)

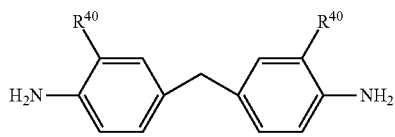

(DI-21-4)

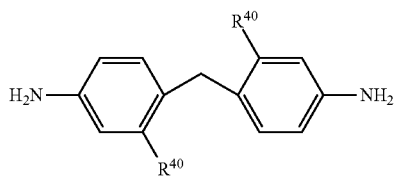

(DI-21-5)

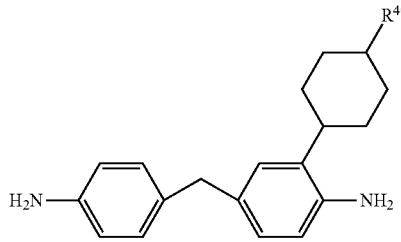

(DI-21-6)

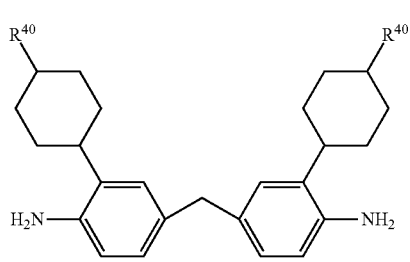

(DI-21-7)

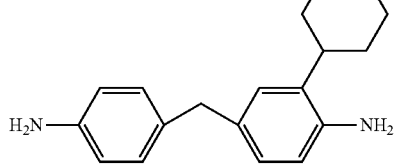

(DI-21-8)

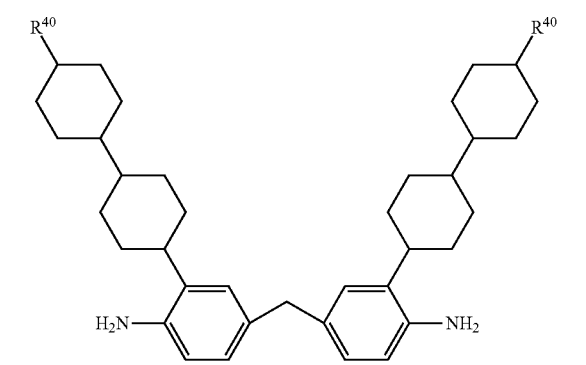

In formulas (DI-21-1) to (DI-21-8), $R^{40}$ is alkyl having 3 to 30 carbons.

In each diamine, a diamine may be partially replaced by a monoamine when the ratio of the monoamine to the diamine is in the range of 40 mole % or less. The progress of the polymerization can be retarded, since such a replacement causes the termination of polymerization that forms polyamic acids. The application characteristics of the liquid crystal aligning agent can be improved without spoiling the effect of the invention, since the molecular weight of the resulting polymer (polyamic acid or its derivatives) can be adjusted. The number of the monoamine may be one or two or more if the effect of the invention is not spoiled. The monoamine includes aniline, 4-hydroxyaniline, cyclohexylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine or eicosylamine.

When the polyamic acid or its derivatives are prepared, a monoisocyanate compound may be added to the starting materials. The terminal of the resulting polyamic acid or its derivatives is modified and their molecular weights are adjusted by the addition of the monoisocyanate compound to the starting materials. The application characteristics of the liquid crystal aligning agent can be improved without spoiling the effect of the invention by use of this terminal-modified type polyamic acid or its derivatives. It is desirable from the view described above that the content of the monoisocyanate compound in the starting materials should be 1 to 10 mol % based on the total amount of the diamines and the tetracarboxylic acid dianhydride. The monoisocyanate compound includes phenylisocyanate or naphthylisocyanate.

In specific examples described above, a diamine represented by formula (DI-1-3), (DI-5-1), (DI-5-12), (DI-7-3), (DI-13-2), (DI-14-1) or (DI-14-2) is desirable when further improvement of the orientation of liquid crystal molecules is important.

In specific examples described above, a diamine represented by formula (DI-1-4), (DI-4-1), (DI-5-1), (DI-5-12), (DI-5-28), (DI-5-30), (DI-9-1), (DI-13-1), (DI-13-2), (DI-14-1) or (DI-14-2) is desirable when further improvement of the reactivity and the photosensitivity is important.

In specific examples described above, a diamine represented by formula (DI-1-3), (DI-1-4), (DI-13-1), (DI-13-2), (DI-14-1) or (DI-14-2) is desirable when further improvement of the transmittance is important.

In specific examples described above, a diamine represented by formula (DI-4-1), (DI-5-5), (DI-5-9), (DI-5-22), (DI-5-28), (DI-5-30), (DI-5-31), (DI-9-1), (DI-14-1) or (DI-14-2) is desirable when further improvement of the electrical characteristics is important.

Twelfth, a liquid crystal aligning agent will be explained. A polyamic acid used for a liquid crystal aligning agent that is used for the preparation of an alignment film for use in the invention is formed by the reaction of an acid dianhydride with a diamine in a solvent. In this synthetic reaction, no specific conditions are necessary except the selection of starting materials. Conditions for a normal synthesis of polyamic acids can be applied without modification. Solvents used will be described below.

The liquid crystal aligning agent may be so-called a blend-type and may further include a polyamic acid or its derivatives, and may further include components other than the polyamic acid or its derivatives. The number of other component may be one or two or more.

The liquid crystal aligning agent may further include other polymer components such as acrylic acid polymers, acrylate polymers and polyamidoimides that are the reaction product of tetracarboxylic acid dianhydride, a dicarboxylic acid or its derivatives and a diamine, within the range where the effect of the invention is not spoiled (preferably in an amount of 20% by weight or less of the polyamic acid or its derivatives). Other examples include polysiloxanes, polyesters, polyamides, cellulose derivatives, polyacetals, polystyrenes, poly(polystyrene-phenylmaleimide), poly(meth)acrylates and products formed by the reaction of a polyfunctional carboxylic acid with a polyfunctional epoxy compound.

The polyamic acid or its derivatives can be prepared by a method similar to that for preparing known polyamic acid or its derivatives that is used for the formation of a polyimide film. It is desirable that the total molar amount of the tetracarboxylic acid dianhydrides for their reaction should be almost the same with the total molar amount of diamines (in the range of approximately 0.9 to approximately 1.1 in a molar ratio).

The weight-average molecular weight (Mw) of the polyamic acid or its derivatives is preferably 10,000 to 500,000, and more preferably 20,000 to 200,000 in terms of polystyrene equivalents. The molecular weight of the polyamic acid or its derivatives can be measured by means of gel permeation chromatography (GPC).

The presence of the polyamic acid or its derivatives can be confirmed by analyzing a solid content that is precipitated by the action of a large amount of a poor solvent, by IR and NMR. The starting materials used can be confirmed by decomposing the polyamic acid or its derivatives by the action of an aqueous solution of a strong alkali such as KOH or NaOH, and by extracting the decomposition products with an organic solvent, and then by analyzing by means of GC, HPLC or GC-MS.

An additive such as alkenyl-substituted nadimide compounds, compounds having a radical-polymerizable unsaturated double bond, oxazine compounds, oxazoline compounds, epoxy compounds and silane coupling agents may be added as requested. Such an additive is described in paragraphs 0120 to 0231 of JP 2013-242526 A.

The liquid crystal aligning agent may further include a solvent in view of the application properties of the liquid crystal aligning agent and the adjustment of the concentration of the polyamic acid or its derivatives. The solvent is usable without any restriction when it can dissolve high-molecular components. The solvent includes a solvent widely that is usually used for in the production process of high-molecular components such as polyamic acids and soluble polyimides, or for their application, and can properly be selected according to a purpose. The solvent may be used alone or in combination of two or more.

Other solvents include a solvent suitable for the polyamic acid or its derivatives and another solvent for the purpose of improving the application properties.

None-protic polar organic solvents that are suitable for the polyamic acid or its derivatives include N-methyl-2-pyrrolidone, dimethylimidazolidinone, N-methylcaprolactam, N-methylpropionamide, N,N-dimethylacetamide, dimethylsulfoxide, N,N-dimethylformamide, N,N-diethylformamide, diethylacetamide and lactones such as γ-butyrolactone.

Examples of other solvents for the purpose of improving the application properties and so forth include alkyl lactate, 3-methyl-3-methoxybutanol, tetraline, isophorone, ethylene glycol monoalkyl ethers such as ethylene glycol monobutyl ether, diethylene glycol monoalkyl ethers such as diethylene glycol monoethyl ether, ethylene glycol monoalkyl- or phenylacetate, triethylene glycol monoalkyl ether, propylene glycol monoalkyl ethers such as propylene glycol monomethyl ether and propylene glycol monobutyl ether, dialkyl malonates such as diethyl malonate, dipropylene glycol monoalkyl ethers such as dipropylene glycol monomethyl ether, and ester compounds of these acetates.

An especially desirable solvent among these is N-methyl-2-pyrrolidone, dimethylimidazolidinone, γ-butyrolactone, ethylene glycol monobutyl ether, diethylene glycol monoethyl ether, propylene glycol monobutyl ether, propylene glycol monomethyl ether or dipropylene glycol monomethyl ether.

It is desirable that the concentration of a polyamic acid in the liquid crystal aligning agent should be 0.1 to 40% by weight. When the aligning agent is applied to a substrate, the polyamic acid included is sometimes required to dilute for adjusting a film thickness in advance.

The solid content of the aligning agent is not restricted and an optimum value may be selected to adjust for a variety of application methods described below. Usually, the solid content is preferably 0.1 to 30% by weight, and more preferably 1 to 10% by weight based on the weight of the varnish in order to suppress unevenness or pinholes formed during coating application.

Thirteenth, a liquid crystal alignment film will be explained. The liquid crystal alignment film is formed by heating a coating film of a liquid crystal aligning agent. The liquid crystal alignment film can be obtained by a normal method where a liquid crystal alignment film is prepared from a liquid crystal aligning agent. The liquid crystal alignment film can be obtained, for example, via a coating film step for forming a coating film of a liquid crystal aligning agent, and a heating and drying step, and a heating and calcining step. The film may gain anisotropy by irradiation with light, after the coating film step and the heating and drying step, or after the heating and calcining step, as requested.

The coating film can be formed by applying a liquid crystal aligning agent to the substrate of a liquid crystal display device. Examples of the substrate include a glass substrate on which an ITO (indium tin oxide) electrode, an IZO ($In_2O_3$—ZnO) electrode, an IGZO (In—Ga—$ZnO_4$) electrode, a color filter or the like may be formed. A spinner method, a printing method, a dipping method, a dropping method, an ink-jet method and so forth are generally known for applying a liquid crystal aligning agent to the substrate.

A method of heat treatment in an oven or an infrared furnace, a method of heat treatment on a hot plate, and so forth are known as the heating and drying step. It is desirable that the heating and drying step should be carried out at a temperature where the evaporation of the solvent is possible. It is more desirable that the step should be carried out at a relatively lower temperature in comparison with the temperature for the heating and calcining step. Specifically, the heating and drying step is preferably in the range of 30° C. to 150° C., and more preferably in the range of 50° C. to 120° C.

The heating and calcining step can be carried out under the conditions required for the dehydration and ring closure of the polyamic acid or its derivatives. A method of heat treatment in an oven or an infrared furnace, a method of heat treatment on a hot plate, and so forth are known for the calcination of the coating film. In general, the step is carried out preferably at a temperature such as 100 to 300° C. for 1 minute to 3 hours, more preferably 120 to 280° C., and further preferably 150 to 250° C.

The method for forming the liquid crystal alignment film in the photoalignment method is as follows. After the coating film of the liquid crystal aligning agent has been heated and dried, the coating film gains anisotropy by irradiation with linearly polarized light or non-polarized light of radiation, and the film can be formed by heating and calcining the coating film. Or after the coating film has been heated and dried, and heated and calcined, irradiation with linearly polarized light or non-polarized light of radiation gives the film. It is desirable that the irradiating step of radiation should be carried out before the heating and calcining step.

A procedure in which an alignment film gains the ability for orientation of liquid crystals is as follows. A liquid crystal aligning agent of the invention is applied to a substrate, which is dried by preheating. When the film is irradiated with linearly polarized ultraviolet light via a polarizing plate, a reactive group in a polymer chain that is roughly in a direction parallel to the polarizing direction is photodegraded. Because of this, components in a direction roughly perpendicular to the polarizing direction of ultraviolet light become dominant in the polymer chain of the film. The substrate is heated, and dehydration and ring closure of the polyamic acid are carried out, giving the polyimide film, and then a device is assembled using this substrate. When a liquid crystal composition is injected to the device, the liquid crystal molecules are aligned in the direction of the polymer chain. Accordingly, the liquid crystal molecules are oriented in the direction perpendicular to the polarizing direction. The film may be irradiated with linearly polarized ultraviolet light before the heating step for polyimidation or after polyimidation by heating.

Furthermore, the coating film can be irradiated with linearly polarized light or non-polarized light of radiation in order to increase the ability for orientation of liquid crystals in the liquid crystal alignment film while being heated. The irradiation with radiation may be carried out in the heating and drying step or in the heating and calcining step of a coating film, or between both of them. The temperature in the heating and drying step is preferably in the range of 30° C. to 150° C., and more preferably in the range of 50° C. to 120° C. The temperature in the heating and calcining step is preferably in the range of 30° C. to 300° C., and more preferably in the range of 50° C. to 250° C.

For example, ultraviolet light or visible light including light with wavelength of 150 to 800 nm can be used as radiation, and ultraviolet light including light of 300 to 400 nm is desirable. Linearly polarized light or non-polarized light can be used. The light is not especially limited, if the coating film gains the ability for orientation of liquid crystals by the action of the light. Linearly polarized light is desirable when a large orientation force is necessary to liquid crystal molecules.

The liquid crystal alignment film can exhibit a high ability for orientation of liquid crystals by photo-irradiation with light of low energy. The light dose of linearly polarized light in the irradiating step of radiation is preferably 0.05 to 20 $J/cm^2$, and more preferably 0.5 to 10 $J/cm^2$. The wavelength of linearly polarized light is preferably 200 to 400 nm, and more preferably 300 to 400 nm. The irradiation angle of linearly polarized light to a film surface is not especially limited. When a large orientation force to liquid crystal molecules is necessary, it is desirable in view of a decrease in orientation treatment time that the light should be perpendicular to the surface of the film if possible. The liquid crystal alignment film can orient liquid crystal molecules in the direction perpendicular to the polarization direction of linearly polarized light by irradiation with linearly polarized light.

When a pretilt angle is necessary, light irradiated to the film may be of linearly polarized light or non-polarized light as described above. The light dose is preferably 0.05 to 20 J/cm$^2$, and especially preferably 0.5 to 10 J/cm$^2$, and the wavelength is preferably 250 to 400 nm, and especially preferably 300 to 380 nm. The irradiation angle of light to the film surface is not especially limited, and 30 to 60 degrees are desirable in view of a decrease in orientation treatment time.

A light source used in the irradiating step includes an ultra-high-pressure mercury lamp, a high-pressure mercury lamp, a low-pressure mercury lamp, a deep UV lamp, a halogen lamp, a metal halide lamp, a high-power metal halide lamp, a xenon lamp, a mercury-xenon lamp, an excimer lamp, a KrF-excimer lasers, a fluorescent lamp, an LED lamp, a sodium lamp and a microwave exciting electrodeless lamp, those of which can be used without limitation.

The film thickness of the liquid crystal alignment film is not especially limited, and is preferably 10 to 300 nm, and more preferably 30 to 150 nm. The film thickness can be measured with known thickness meter such as a meter showing the difference in level and an ellipsometer.

The alignment film is characterized by an especially large anisotropy of orientation. The magnitude of such anisotropy can be evaluated by polarized infrared spectroscopy described in JP 2005-275364 A and so forth. The magnitude is also evaluated by ellipsometry that is shown in examples described below. It is believed that an alignment film having a larger anisotropy of a film has a larger orientation force to a liquid crystal composition.

The liquid crystal layer, that is the layer of liquid crystal composition, is formed in which a liquid crystal composition is sandwiched between a pair of substrates where the surfaces of liquid crystal alignment films are opposed to each other. In the formation of the liquid crystal layer, a spacer, such as fine particles and a plastic sheet, can be located between a pair of the substrates to form a suitable distance, as requested.

EXAMPLES

The invention will be explained in more detail by way of examples. The invention is not limited to the examples. The invention includes a mixture of the composition in Composition Example M1 and the composition in Composition Example M2. The invention also includes a mixture prepared by mixing at least two compositions in Composition Examples. The invention includes a polyamic acid prepared from a mixture of two tetracarboxylic acid dianhydrides described in Synthetic Examples 2 and 3. The invention includes a polyamic acid prepared from a mixture of at least two starting materials (a diamine, a tetracarboxylic acid dianhydride or its derivatives) described in Synthetic Examples. The same rule applies to examples such as the production of devices. Compounds prepared herein were identified by methods such as NMR analysis. The characteristics of the compounds, the compositions and the devices were measured by the methods described below.

NMR Analysis

A model DRX-500 apparatus made by Bruker BioSpin Corporation was used for measurement. In the measurement of $^1$H-NMR, a sample was dissolved in a deuterated solvent such as CDCl$_3$, and the measurement was carried out under the conditions of room temperature, 500 MHz and the accumulation of 16 scans. Tetramethylsilane (TMS) was used as an internal standard. In the measurement of $^{19}$F-NMR, CFCl$_3$ was used as the internal standard, and 24 scans were accumulated. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

Gas Chromatographic Analysis

A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was a Model C-R5A Chromatopac Integrator made by Shimadzu Corporation or its equivalent. The resulting gas chromatogram showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometer), Rtx-1 made by Restek Corporation (length 30 meters, bore 0.32 millimeter, film thickness 0.25 micrometer), and BP-1 made by SGE International Pty. Ltd. (length 30 meters, bore 0.32 millimeter, film thickness 0.25 micrometer). A capillary column CBP1-M50-025 (length 50 meters, bore 0.25 millimeter, film thickness 0.25 micrometer) made by Shimadzu Corporation may also be used for the purpose of avoiding an overlap of peaks of the compounds.

The ratio of the liquid crystal compounds included in the composition may be calculated according to the following method. The liquid crystal compounds (a mixture) are detected by use of a gas chromatograph (FID). The ratio of peak areas in the gas chromatogram corresponds to the ratio (ratio by weight) of the liquid crystal compounds. When the capillary column described above is used, the correction coefficient of respective liquid crystal compounds may be regarded as 1 (one). Accordingly, the ratio (percentage by weight) of the liquid crystal compounds can be calculated from the ratio of peak areas.

Samples for Measurement

A composition itself was used as a sample when the characteristics of the composition or the device were measured. When the characteristics of a compound were measured, a sample for measurement was prepared by mixing this compound (15% by weight) with mother liquid crystals (85% by weight). The characteristic values of the compound were calculated from the values obtained from measurements by an extrapolation method: (Extrapolated value)= (Measured value of sample)−0.85×(Measured value of mother liquid crystals)/0.15. When a smectic phase (or crystals) deposited at 25° C. at this ratio, the ratio of the compound to the mother liquid crystals was changed in the order of (10% by weight: 90% by weight), (5% by weight: 95% by weight) and (1% by weight: 99% by weight). The values of the maximum temperature, the optical anisotropy, the viscosity and the dielectric anisotropy regarding the compound were obtained by means of this extrapolation method.

The mother liquid crystals described below were used. The ratio of the component compounds were expressed as a percentage by weight.

[Structure: $C_3H_7$–(cyclohexane)–(benzene)–CN] 24%

[Structure: $C_5H_{11}$–(cyclohexane)–(benzene)–CN] 36%

[Structure: $C_7H_{15}$–(cyclohexane)–(benzene)–CN] 25%

[Structure: $C_5H_{11}$–(cyclohexane)–(benzene)–(benzene)–CN] 15%

Measurement Methods

The characteristics were measured according to the following methods. Most are methods described in the JEITA standards (JEITA-ED-2521B) which was deliberated and established by Japan Electronics and Information Technology Industries Association (abbreviated to JEITA), or the modified methods. No thin film transistors (TFT) were attached to a TN device used for measurement.

(1) Maximum Temperature of a Nematic Phase (NI; ° C.):

A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature."

(2) Minimum Temperature of a Nematic Phase (Tc; ° C.):

A sample having a nematic phase was placed in glass vials and then kept in freezers at temperatures of 0° C., –10° C., –20° C., –30° C. and –40° C. for 10 days, and then the liquid crystal phases were observed. For example, when the sample maintained the nematic phase at –20° C. and changed to crystals or a smectic phase at –30° C., Tc was expressed as <–20° C. A lower limit of the temperature range of a nematic phase may be abbreviated to "the minimum temperature."

(3) Viscosity (Bulk Viscosity; η; Measured at 20° C.; mPa·s):

An E-type viscometer made by Tokyo Keiki Inc. was used for measurement.

(4) Viscosity (rotational viscosity; γ1; measured at 25° C.; mPa·s):

The measurement was carried out according to the method described in M. Imai, et al., Molecular Crystals and Liquid Crystals, Vol. 259, 37 (1995). A sample was poured into a TN device in which the twist angle was 0 degrees and the distance between the two glass substrates (cell gap) was 5 micrometers. A voltage was applied to this device and increased stepwise with an increment of 0.5 volt in the range of 16 to 19.5 volts. After a period of 0.2 second with no voltage, a voltage was applied repeatedly under the conditions of a single rectangular wave alone (rectangular pulse; 0.2 second) and of no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of dielectric anisotropy necessary for this calculation was obtained by use of the device that had been used for the measurement of rotational viscosity, according to the method that will be described below.

(5) Optical Anisotropy (Refractive Index Anisotropy; an; Measured at 25° C.):

The measurement was carried out using an Abbe refractometer with a polarizing plate attached to the ocular, using light at a wavelength of 589 nanometers. The surface of the main prism was rubbed in one direction, and then a sample was placed on the main prism. The refractive index ($n\|$) was measured when the direction of the polarized light was parallel to that of rubbing. The refractive index ($n\perp$) was measured when the direction of polarized light was perpendicular to that of rubbing. The value of the optical anisotropy ($\Delta n$) was calculated from the equation: $\Delta n = n\| - n\perp$.

(6) Dielectric Anisotropy ($\Delta\epsilon$; Measured at 25° C.):

A sample was poured into a TN device in which the distance between the two glass substrates (cell gap) was 9 micrometers and the twist angle was 80 degrees. Sine waves (10 V, 1 kHz) were applied to this device, and the dielectric constant ($\epsilon\|$) in the major axis direction of liquid crystal molecules was measured after 2 seconds. Sine waves (0.5 V, 1 kHz) were applied to this device and the dielectric constant ($\epsilon\perp$) in the minor axis direction of the liquid crystal molecules was measured after 2 seconds. The value of dielectric anisotropy was calculated from the equation: $\Delta\epsilon = \epsilon\| - \epsilon\perp$.

(7) Threshold Voltage (Vth; Measured at 25° C.; V):

An LCD evaluation system Model LCD-5100 made by Otsuka Electronics Co., Ltd. was used for measurement. The light source was a halogen lamp. A sample was poured into a TN device having a normally white mode, in which the distance between the two glass substrates (cell gap) was 4.45/Δn (micrometers) and the twist angle was 80 degrees. A voltage to be applied to this device (32 Hz, rectangular waves) was stepwise increased in 0.02 V increments from 0 V up to 10 V. The device was perpendicularly irradiated with light simultaneously, and the amount of light passing through the device was measured. A voltage-transmittance curve was prepared, in which the maximum amount of light corresponded to 100% transmittance and the minimum amount of light corresponded to 0% transmittance. The threshold voltage was expressed as voltage at 90% transmittance.

(8) Voltage Holding Ratio (VHR-1; Measured at 25° C.; %):

A TN device used for measurement had a polyimide-alignment film, and the distance between the two glass substrates (cell gap) was 5 micrometers. A sample was poured into the device, and then this device was sealed with a UV-curable adhesive. A pulse voltage (60 microseconds at 5 V) was applied to this TN device and the device was charged. A decreasing voltage was measured for 16.7 milliseconds with a high-speed voltmeter, and area A between the voltage curve and the horizontal axis in a unit cycle was obtained. Area B was an area without the decrease. The voltage holding ratio was expressed as a percentage of area A to area B.

(9) Voltage Holding Ratio (VHR-2; Measured at 80° C.; %):

The voltage holding ratio was measured by the method described above, except that it was measured at 80° C. instead of 25° C. The resulting values were represented by the symbol VHR-2.

(10) Voltage Holding Ratio (VHR-3; Measured at 25° C.; %):

The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra-high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

(11) Voltage Holding Ratio (VHR-4; Measured at 25° C.; %):

A TN device into which a sample was poured was heated in a constant-temperature bath at 80° C. for 500 hours, and then the stability to heat was evaluated by measuring the voltage holding ratio. In the measurement of VHR-4, a decreasing voltage was measured for 16.7 milliseconds. A composition having a large VHR-4 has a high stability to heat.

(12) Response Time ($\tau$; measured at 25° C.; millisecond):

An LCD evaluation system Model LCD-5100 made by Otsuka Electronics Co., Ltd. was used for measurement. The light source was a halogen lamp. The low-pass filter was set at 5 kHz. A sample was poured into a FFS device assembled in Examples described below. This device was sealed with a UV-curable adhesive. Rectangular waves (60 Hz, 5 V, 0.5 second) were applied to this device. The device was perpendicularly irradiated with light simultaneously, and the amount of light passing through the device was measured. The transmittance was regarded as 100% when the amount of light reached a maximum. The transmittance was regarded as 0% when the amount of light reached a minimum. Rise time ($\tau r$; millisecond) was the time required for a change from 90% to 10% transmittance. Fall time ($\tau f$; millisecond) was the time required for a change from 10% to 90% transmittance. The response time was expressed as the sum of the rise time and the fall time thus obtained. The response time is preferably 60 ms or less, and more preferably 40 ms or less.

(13) Elastic Constants (K; Measured at 25° C.; pN):

A LCR meter Model HP 4284-A made by Yokokawa Hewlett-Packard, Ltd. was used for measurement. A sample was poured into a homogeneous device in which the distance between the two glass substrates (cell gap) was 20 micrometers. An electric charge of 0 volts to 20 volts was applied to this device, and the electrostatic capacity and the applied voltage were measured. The measured values of the electric capacity (C) and the applied voltage (V) were fitted to equation (2.98) and equation (2.101) on page 75 of "Ekisho Debaisu Handobukku" (Liquid Crystal Device Handbook, in English; The Nikkan Kogyo Shimbun, Ltd., Japan) and the values of K11 and K33 were obtained from equation (2.99). Next, the value of K22 was calculated from equation (3.18) on page 171 of the book and the values of K11 and K33 thus obtained. The elastic constant K was expressed as an average value of K11, K22 and K33.

(14) Specific Resistance ($\rho$; Measured at 25° C.; $\Omega$cm):

A sample of 1.0 milliliter was poured into a vessel equipped with electrodes. A DC voltage (10 V) was applied to the vessel, and the DC current was measured after 10 seconds. The specific resistance was calculated from the following equation: (specific resistance)=[(voltage)×(electric capacity of vessel)]/[(DC current)×(dielectric constant in vacuum)].

(15) Helical Pitch (P; Measured at Room Temperature; Micrometer):

The helical pitch was measured according to the wedge method (see page 196 of "Ekishou Binran" (Liquid Crystal Handbook, in English; Maruzen, Co., LTD., Japan, 2000). After a sample had been injected into a wedge-shaped cell and the cell had been allowed to stand at room temperature for 2 hours, the distance (d2−d1) between disclination lines was observed with a polarizing microscope (Nikon Corporation, Model MM-40/60 series). The helical pitch (P) was calculated from the following equation, wherein $\theta$ was defined as the angle of the wedge cell: P=2×(d2−d1)×tan $\theta$.

(16) Dielectric constant in the minor axis direction ($\in\perp$; measured at 25° C.):

A sample was poured into a TN device in which the distance between the two glass substrates (cell gap) was 9 micrometers and the twist angle was 80 degrees. Sine waves (0.5 V, 1 kHz) were applied to this device and the dielectric constant ($\in\perp$) in the minor axis direction of the liquid crystal molecules was measured after 2 seconds.

(17) Flicker Rate (Measured at 25° C.; %):

A multimedia display tester 3298F made by Yokogawa Electric Corporation was used for measurement. The light source was LED. A sample was poured into a FFS device assembled in Examples described below. This device was sealed with a UV-curable adhesive. A voltage was applied to the device and a voltage was measured when the amount of light passed through the device reached a maximum. The sensor was approximated to the device while this voltage was applied to the device, and the flicker rate displayed was recorded. The flicker rate is preferably 2% or less, and more preferably 1% or less.

(18) Weight Average Molecular Weight (Mw):

The weight average molecular weight of a polyamic acid was measured by a GPC method using 2695 separation module 2414 differential refractometer made by Waters Corporation, and was expressed in terms of polystyrene equivalents. The resulting polyamic acid was diluted with a phosphoric acid-DMF mixed solution (phosphoric acid/ DMF=0.6/100, in a weight ratio), giving about approximately 2% by weight concentration of the polyamic acid. A column used was HSPgel RT MB-M made by Waters Corporation, and the measurement was carried out under the conditions of 50° C. of the column temperature and 0.40 mL/min of the current velocity using the mixed solvent as an eluent A TSK standard polystyrene made by Tosoh Corporation was used as the standard polystyrene.

(19) Pretilt Angle:

A spectroscopic ellipsometer M-2000U made by J. A. Woollam Co. Inc. was used for the measurement of pretilt angles.

(20) AC Ghost Images (Brightness Change):

In the liquid crystal display device that will be described below, the brightness-voltage characteristics (B-V characteristics) were measured. This was referred to as brightness-voltage characteristics before stressed [B (before)]. Next, direct current 4.5 V, 60 Hz) was applied for 20 minutes to the device, and no voltages for 1 second, and then the brightness-voltage characteristics (B-V characteristics) were measured again. This was referred to as brightness-voltage characteristics after stressed [B (after)]. The brightness change (ΔB; %) was calculated from these values by the following equation:

$$\Delta B(\%)=[B(\text{after})-B(\text{before})]/B(\text{before}) \quad \text{(equation 1)}$$

These measurements were carried out by referring WO 2000-43833 A. The smaller value of ΔB (%) at a voltage of 0.75 V means a smaller generation of AC ghost images.

(21) Orientational Stability (Stability of Liquid Crystal Orientational Axis):

In the liquid crystal display device that will be described below, the change of a liquid crystal orientational axis in a side of electrode was evaluated. A liquid crystal orientation angle [φ(before)] before stressed in the side of an electrode was measured, and rectangular waves (4.5 V, 60 Hz) were applied for 20 minutes to the device, and the device was short-circuited for 1 second, and then the liquid crystal orientation angle [φ(after)] in the side of the electrode was measured after 1 second and 5 minutes. The change (Δφ, deg.) of the liquid crystal orientation angle after 1 second and 5 minutes was calculated from these values by the following equation:

$$\Delta\varphi(\text{deg.})=\varphi(\text{after})-\varphi(\text{before}) \quad \text{(equation 2)}$$

The measurement was performed by reference to J. Hilfiker, B. Johs, C. Herzinger, J. F. Elman, E. Montbach, D. Bryant, and P. J. Bos, Thin Solid Films, 455-456, (2004) 596-600. The smaller value of Δφ means that the change ratio of the liquid crystal orientational axis is smaller, and the stability of liquid crystal orientational axis is better.

(22) Volume resistivity (p; measured at 25° C.; Ω·cm):

A polyimide film was formed on a glass substrate covered with ITO entirely. Aluminum was deposited to the side of the alignment film on the substrate, which was referred to as an upper electrode (electrode surface area: 0.23 cm²). A voltage of 3 V was applied between the ITO electrode and the upper electrode, and the volume resistivity was calculated from a current value after 300 seconds.

(23) Permittivity (∈; measured at 25° C.):

A polyimide film was prepared on a substrate covered with ITO entirely. Aluminum was deposited to the side of the alignment film on the substrate, which was referred to as an upper electrode (electrode surface area: 0.23 cm²). An AC voltage (1 V, frequency 1 kHz) was applied between the ITO electrode and the upper electrode, and the electric capacity (C) of the film was measured. The permittivity (∈) of the film was calculated from this value by the following equation.

$$\in=(C\times d)/(\in_0 \times S) \quad \text{(equation 3)}$$

where d is the film thickness of the polyimide film, $\in_0$ is permittivity in vacuum, and S is the electrode surface area.

(24) Abbreviations:

Abbreviations of solvents and additives used in Examples are as follows.

Solvent
NMP: N-Methyl-2-pyrrolidone.
BC: Butyl cellosolve (ethylene glycol monobutyl ether).
Additive
Additive (Ad1): Bis[4-(allylbicyclo[2.2.1]hept-5-ene-2,3-dicarboximide)phenyl]methane.
Additive (Ad2): N,N,N',N'-Tetraglycidyl-4,4'-diaminodiphenylmethane.
Additive (Ad3): 3-Aminopropyltriethoxysilane.
Additive (Ad4): 2-(3,4-Epoxycyclohexyl)ethyltrimethoxysilane.

The compounds described in Examples were expressed in terms of symbols according to the definition in Table 3 described below. In Table 3, the configuration of 1,4-cyclohexylene is trans. The parenthesized number next to a symbolized compound in Example corresponds to the number of the compound. The symbol (-) means any other liquid crystal compound. The ratio (percentage) of a liquid crystal compound is expressed as a percentage by weight (% by weight) based on the weight of the liquid crystal composition. Last, the values of characteristics of the composition are summarized.

TABLE 3

Method of Description of Compounds using Symbols
R—(A₁)—Z₁— . . . —Z n—(Aₙ)—R'

| | Symbol |
|---|---|
| 1) Left-terminal Group R— | |
| $C_nH_{2n+1}$— | n- |
| $C_nH_{2n+1}O$— | nO— |
| $C_mH_{2m+1}OC_nH_{2n}$— | mOn— |
| $CH_2=CH$— | V— |
| $C_nH_{2n+1}$—CH=CH— | nV— |
| $CH_2=CH$—$C_nH_{2n}$— | Vn— |
| $C_mH_{2m+1}$—CH=CH—$C_nH_{2n}$— | mVn— |
| $CF_2=CH$— | VFF— |
| $CF_2=CH$—$C_nH_{2n}$— | VFFn— |
| F—$C_nH_{2n}$— | Fn— |
| 2) Right-terminal Group —R' | |
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —$C_nH_{2n}$—CH=CH—$C_mH_{2m+1}$ | —nVm |
| —CH=$CF_2$ | —VFF |
| —$COOCH_3$ | —EMe |
| —F | —F |
| —Cl | —CL |
| —$OCF_3$ | —OCF3 |
| —$CF_3$ | —CF3 |
| —CN | —C |
| 3) Bonding Group —$Z_n$— | |
| —$C_2H_4$— | 2 |
| —COO— | E |
| —CH=CH— | V |
| —C≡C— | T |
| —$CF_2O$— | X |
| —$CH_2O$— | 1O |
| 4) Ring —$A_n$— | |
| 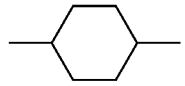 | H |
| 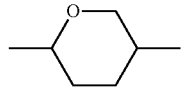 | Dh |
| 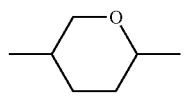 | dh |
| 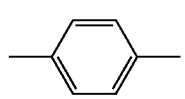 | B |
| 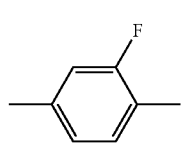 | B(F) |

TABLE 3-continued

Method of Description of Compounds using Symbols
R—(A₁)—Z₁— . . . —Z n—(Aₙ)—R'

| Structure | Symbol |
|---|---|
| (fluorobenzene, 2F) | B(2F) |
| (difluorobenzene) | B(F,F) |
| (2F,5F difluorobenzene) | B(2F,5F) |
| (dioxane) | G |
| (pyrimidine) | Py |
| (2F,3F difluorobenzene) | B(2F,3F) |

5) Examples of Description

Example 1. V-HHB-1

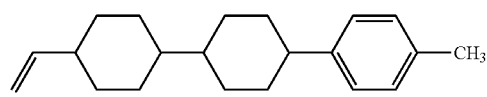

Example 2. 3-BB(F)B(F,F)-F

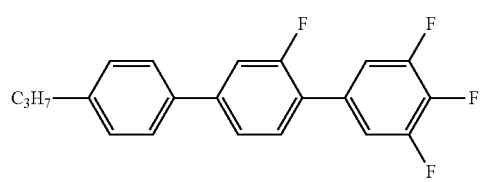

Example 3. 4-BB(F)B(F,F)XB(F,F)-F

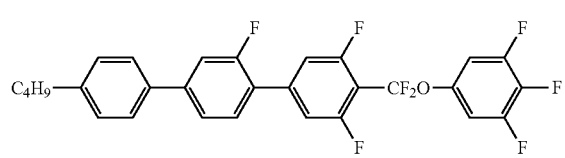

Example 4. 5-GB(F,F)XB(F,F)-F (structure shown: C₅H₁₁ attached to dioxane, then difluorobenzene, —CF₂O—, trifluorobenzene—F)

Composition Example M1

| Compound | Code | % |
|---|---|---|
| 3-HHXB(F,F)-F | (1-4) | 13% |
| 3-BBXB(F,F)-F | (1-17) | 4% |
| 3-BB(F,F)XB(F,F)-F | (1-18) | 10% |
| 3-HBBXB(F,F)-F | (1-23) | 6% |
| 3-HBB(F,F)XB(F,F)-F | (1-24) | 6% |
| 3-GB(F)B(F,F)XB(F,F)-F | (1-27) | 3% |
| 4-GB(F)B(F,F)XB(F,F)-F | (1-27) | 3% |
| 3-HH-V | (2-1) | 32% |
| 3-HH-V1 | (2-1) | 7% |
| V-HHB-1 | (2-5) | 6% |
| V2-HHB-1 | (2-5) | 6% |
| 1-BB(F)B-2V | (2-7) | 4% |

NI = 84.5° C.; Tc < −30° C.; Δn = 0.101; Δε = 7.6; Vth = 1.56 V; η = 12.1 mPa · s; VHR-1 = 99.1%; VHR-2 = 98.2%; VHR-3 = 98.1%.

Composition Example M2

| Compound | Code | % |
|---|---|---|
| 3-HHXB(F,F)-CF3 | (1-5) | 4% |
| 3-GB(F,F)XB(F,F)-F | (1-14) | 5% |
| 3-BB(F)B(F,F)-F | (1-15) | 9% |
| 3-BB(F,F)XB(F,F)-F | (1-18) | 17% |
| 3-HBBXB(F,F)-F | (1-23) | 7% |
| 3-GB(F)B(F,F)XB(F,F)-F | (1-27) | 2% |
| 3-BB(F)B(F,F)XB(F,F)-F | (1-29) | 2% |
| 4-BB(F)B(F,F)XB(F,F)-F | (1-29) | 6% |
| 5-BB(F)B(F,F)XB(F,F)-F | (1-29) | 6% |
| 3-HH-V | (2-1) | 21% |
| V-HHB-1 | (2-5) | 9% |
| V2-HHB-1 | (2-5) | 9% |
| 1-BB(F)B-2V | (2-7) | 3% |

NI = 79.5° C.; Tc < −30° C.; Δn = 0.129; Δε = 15.9; Vth = 1.25 V; η = 21.2 mPa · s.

Composition Example M3

| Compound | Code | % |
|---|---|---|
| 3-HB(F)B(F,F)-F | (1-9) | 5% |
| 3-GB(F,F)-F | (1-12) | 6% |
| 3-BB(F,F)XB(F,F)-F | (1-18) | 2% |
| 4-GB(F)B(F,F)XB(F,F)-F | (1-27) | 3% |
| 4-BB(F)B(F,F)XB(F,F)-F | (1-29) | 6% |
| 3-HH-V | (2-1) | 31% |
| 3-HH-V1 | (2-1) | 6% |
| 1-HH-2V1 | (2-1) | 6% |
| V-HHB-1 | (2-5) | 14% |
| V2-HHB-1 | (2-5) | 12% |
| 3-HHB-1 | (2-5) | 3% |

-continued

| | | |
|---|---|---|
| 3-HHB-O1 | (2-5) | 3% |
| 2-BB(F)B-3 | (2-7) | 3% |

NI = 92.1° C.; Tc < −20° C.; Δn = 0.095; Δε = 4.1; Vth = 2.05 V; η = 13.3 mPa · s.

Composition Example M4

| | | |
|---|---|---|
| 3-GB(F,F)XB(F)-F | (1-13) | 4% |
| 3-BB(F,F)XB(F,F)-F | (1-18) | 18% |
| 3-GB(F)B(F,F)XB(F,F)-F | (1-27) | 5% |
| 4-GB(F)B(F,F)XB(F,F)-F | (1-27) | 3% |
| 5-GB(F)B(F,F)XB(F,F)-F | (1-27) | 3% |
| 3-BB(F,F)XB(F)B(F,F)-F | (1-30) | 5% |
| 3-HH-V | (2-1) | 24% |
| 3-HH-V1 | (2-1) | 8% |
| V-HHB-1 | (2-5) | 10% |
| V2-HHB-1 | (2-5) | 10% |
| 3-HHB-1 | (2-5) | 4% |
| 3-HBB-2 | (2-6) | 6% |

NI = 81.8° C.; Tc < −20° C.; Δn = 0.105; Δε = 9.2; Vth = 1.46 V; η = 15.6 mPa · s.

Composition Example M5

| | | |
|---|---|---|
| 3-HHB(F,F)-F | (1-2) | 5% |
| 3-GHB(F,F)-F | (1-7) | 10% |
| 3-HBB(F,F)-F | (1-8) | 10% |
| 3-HHBB(F,F)-F | (1-19) | 6% |
| 3-HBB(F,F)XB(F,F)-F | (1-24) | 4% |
| 4-GB(F)B(F,F)XB(F)-F | (1-26) | 3% |
| 4-GB(F)B(F,F)XB(F,F)-F | (1-27) | 3% |
| 3-HH-V | (2-1) | 34% |
| 3-HH-V1 | (2-1) | 7% |
| V-HHB-1 | (2-5) | 7% |
| 3-BB(F)B-5 | (2-7) | 2% |
| 3-HHEBH-3 | (2-10) | 5% |
| 5-HBB(F)B-2 | (2-13) | 4% |

NI = 97.9° C.; Tc < −20° C.; Δn = 0.100; Δε = 6.8; Vth = 1.80 V; η = 21.5 mPa · s.

Composition Example M6

| | | |
|---|---|---|
| 3-HHEB(F,F)-F | (1-3) | 3% |
| 3-GB(F)B(F,F)-F | (1-12) | 10% |
| 4-GB(F)B(F,F)XB(F,F)-F | (1-27) | 3% |
| 4-BB(F)B(F,F)XB(F,F)-F | (1-29) | 6% |
| 3-B(2F,3F)BXB(F,F)-F | (1-33) | 3% |
| 3-HB(2F,3F)BXB(F,F)-F | (1-34) | 3% |
| 3-HHB-F | (1) | 5% |
| 3-HH-V1 | (2-1) | 6% |
| 5-HH-V | (2-1) | 14% |
| 3-HH-2V1 | (2-1) | 6% |
| 3-HH-4 | (2-1) | 11% |
| 7-HB-1 | (2-2) | 3% |
| 5-HB-O2 | (2-2) | 5% |
| 3-HHEH-3 | (2-4) | 3% |
| V-HHB-1 | (2-5) | 6% |
| V2-HHB-1 | (2-5) | 9% |
| 2-BB(F)B-3 | (2-7) | 4% |

NI = 90.0° C.; Tc < −30° C.; Δn = 0.098; Δε = 6.0; Vth = 1.89 V; η = 18.6 mPa · s.

Composition Example M7

| | | |
|---|---|---|
| 3-GB(F,F)XB(F,F)-F | (1-14) | 8% |
| 3-BB(F,F)XB(F,F)-F | (1-18) | 5% |
| 3-HBBXB(F,F)-F | (1-23) | 6% |
| 3-HBB(F,F)XB(F,F)-F | (1-24) | 7% |
| 3-BB(F,F)XB(F)-OCF3 | (1) | 5% |
| 3-HH-V | (2-1) | 12% |
| 4-HH-V | (2-1) | 8% |
| F3-HH-V | (2-1) | 11% |
| V-HHB-1 | (2-5) | 7% |
| 3-HHB-3 | (2-5) | 4% |
| V-HBB-2 | (2-6) | 7% |
| V2-BB(F)B-1 | (2-7) | 3% |
| 2-BB(2F,3F)B-3 | (3-9) | 12% |
| 3-HBB(2F,3F)-O2 | (3-13) | 5% |

NI = 84.9° C.; Tc < −30° C.; Δn = 0.125; Δε = 5.6; Vth = 1.82 V; η = 13.8 mPa · s.

Composition Example M8

| | | |
|---|---|---|
| 3-HHXB(F,F)-F | (1-4) | 9% |
| 3-BB(F,F)XB(F,F)-F | (1-18) | 16% |
| 3-dhBB(F,F)XB(F,F)-F | (1-25) | 8% |
| 3-BB(F)B(F,F)XB(F,F)-F | (1-29) | 5% |
| 3-HH-V | (2-1) | 22% |
| 3-HH-V1 | (2-1) | 10% |
| 1-BB-5 | (2-3) | 8% |
| 3-HHB-O1 | (2-5) | 5% |
| 3-HBB-2 | (2-6) | 5% |
| 1V-HBB-2 | (2-6) | 5% |
| 3-HB(F)BH-3 | (2-12) | 4% |
| 5-HB(F)BH-3 | (2-12) | 3% |

NI = 70.0° C.; Tc < −20° C.; Δn = 0.096; Δε = 7.3; Vth = 1.52 V; η = 11.4 mPa · s.

Composition Example M9

| | | |
|---|---|---|
| 3-BB(F)B(F,F)-F | (1-15) | 6% |
| 3-BB(F)B(F,F)-CF3 | (1-16) | 3% |
| 3-BB(F,F)XB(F,F)-F | (1-18) | 4% |
| 3-HBBXB(F,F)-F | (1-23) | 5% |
| 4-GB(F)B(F,F)XB(F,F)-F | (1-27) | 4% |
| 4-BB(F)B(F,F)XB(F,F)-F | (1-29) | 7% |
| 3-BB(2F,3F)BXB(F,F)-F | (1-35) | 2% |
| 3-HH-V | (2-1) | 30% |
| 3-HH-V1 | (2-1) | 6% |
| 3-HH-VFF | (2-1) | 8% |
| 3-HB-O2 | (2-2) | 3% |
| V-HHB-1 | (2-5) | 5% |
| 1-BB(F)B-2V | (2-7) | 4% |
| 2-BB(F)B-2V | (2-7) | 4% |
| 3-HB(2F,3F)-O2 | (3-1) | 3% |
| 3-BB(2F,3F)-O2 | (3-4) | 3% |
| 3-HHB(2F,3F)-O2 | (3-6) | 3% |

NI = 75.2° C.; Tc < −20° C.; Δn = 0.111; Δε = 5.4; Vth = 1.85 V; η = 12.2 mPa · s.

Composition Example M10

| | | |
|---|---|---|
| 3-HGB(F,F)-F | (1-6) | 6% |
| 4-GB(F)B(F,F)XB(F,F)-F | (1-27) | 3% |
| 3-BB(F)B(F,F)XB(F,F)-F | (1-29) | 2% |
| 4-BB(F)B(F,F)XB(F,F)-F | (1-29) | 5% |
| 5-BB(F)B(F,F)XB(F,F)-F | (1-29) | 6% |
| 3-HHB-CL | (1) | 3% |
| 3-HH-V | (2-1) | 30% |
| 2-HH-3 | (2-1) | 7% |

-continued

| | | |
|---|---|---|
| V-HHB-1 | (2-5) | 15% |
| V2-HHB-1 | (2-5) | 8% |
| 3-HHEBH-4 | (2-10) | 3% |
| 5-HBB(F)B-2 | (2-13) | 7% |
| 5-HBB(F)B-3 | (2-13) | 5% |

NI = 117.6° C.; Tc < −30° C.; Δn = 0.115; Δε = 4.2; Vth = 2.45 V; η = 14.5 mPa · s.

Composition Example M11

| | | |
|---|---|---|
| 3-BB(F)B(F,F)-F | (1-15) | 21% |
| 2O-B(2F,3F)BXB(F,F)-F | (1-33) | 4% |
| 3-HB-CL | (1) | 5% |
| 3-HH-V | (2-1) | 25% |
| 4-HH-V1 | (2-1) | 3% |
| V2-BB-1 | (2-3) | 5% |
| 1V2-BB-1 | (2-3) | 5% |
| 1-BB(F)B-2V | (2-7) | 8% |
| 2-BB(F)B-2V | (2-7) | 8% |
| 3-BB(F)B-2V | (2-7) | 8% |
| 5-B(F)BB-2 | (2-8) | 4% |
| 5-HBBH-1O1 | (—) | 4% |

NI = 78.2° C.; Tc < −10° C.; Δn = 0.166; Δε = 3.8; Vth = 2.47 V; η = 25.5 mPa · s.

Composition Example M12

| | | |
|---|---|---|
| 3-HHXB(F,F)-F | (1-4) | 2% |
| 3-GB(F)B(F)-F | (1-11) | 8% |
| 3-GB(F)B(F)B(F)-F | (1-21) | 2% |
| 4-GBB(F)B(F,F)-F | (1-22) | 3% |
| 3-BB(2F,3F)XB(F,F)-F | (1-32) | 9% |
| 3-HHB(F)-F | (1) | 3% |
| 3-HBB(F)-F | (1) | 3% |
| 3-HH-V | (2-1) | 30% |
| F3-HH-V | (2-1) | 8% |
| 3-HB-O2 | (2-2) | 5% |
| V-HBB-2 | (2-6) | 6% |
| 1-BB(F)B-2V | (2-7) | 4% |
| 2-BB(F)B-2V | (2-7) | 6% |
| 3-BB(F)B-2V | (2-7) | 5% |
| 5-HBBH-3 | (2-11) | 3% |
| 3-dhBB(2F,3F)-O2 | (3-14) | 3% |

NI = 82.2° C.; Tc < −30° C.; Δn = 0.124; Δε = 3.1; Vth = 2.41 V; η = 16.4 mPa · s.

Composition Example M13

| | | |
|---|---|---|
| 5-HXB(F,F)-F | (1-1) | 3% |
| 3-BB(F)B(F,F)XB(F)-F | (1-28) | 5% |
| 4-BB(F)B(F,F)XB(F,F)-F | (1-29) | 4% |
| 3-BB(F)B(F,F)XB(F)B(F,F)-F | (1-31) | 3% |
| 3-HHXB(F,F)-OCF3 | (1) | 7% |
| 3-HH2B(F,F)-F | (1) | 4% |
| 3-HH-V | (2-1) | 44% |
| 3-HH-V1 | (2-1) | 5% |
| V-HHB-1 | (2-5) | 7% |
| V2-HHB-1 | (2-5) | 5% |
| 3-HHB-1 | (2-5) | 3% |
| 2-BB(F)B-2V | (2-7) | 3% |
| 3-BB(F)B-2V | (2-7) | 3% |
| 3-HB(F)HH-5 | (2-9) | 4% |

NI = 100.6° C.; Tc < −20° C.; Δn = 0.101; Δε = 3.6; Vth = 2.35 V; η = 10.2 mPa · s.

Composition Example M14

| | | |
|---|---|---|
| 3-HBEB(F,F)-F | (1-10) | 5% |
| 3-HBBXB(F,F)-F | (1-23) | 10% |
| 3-BB(F)B(F,F)XB(F,F)-F | (1-29) | 2% |
| 4-BB(F)B(F,F)XB(F,F)-F | (1-29) | 7% |
| 3-HBB-F | (1) | 3% |
| 3-dhB(F,F)XB(F,F)-F | (1) | 8% |
| 3-HH-V | (2-1) | 35% |
| 1-HH-2V1 | (2-1) | 5% |
| 3-HH-2V1 | (2-1) | 4% |
| 3-HH-O1 | (2-1) | 5% |
| V-HHB-1 | (2-5) | 8% |
| 3-HHB-1 | (2-5) | 4% |
| 3-HB(F)BH-3 | (2-12) | 4% |

NI = 85.6° C.; Tc < −30° C.; Δn = 0.096; Δε = 5.5; Vth = 1.75 V; η = 13.7 mPa · s.

1. Preparation of polyamic acid solutions (component A

Synthetic Example 1

In a brown four-neck flask 50 mL equipped with a thermometer, a stirrer, an inlet for starting materials and a nitrogen gas inlet, 1.7806 g of diamine (DI-5-12, m=5) and 18.5 g of dry NMP were placed, and stirred to dissolve under a stream of dry nitrogen. Then, 1.2194 g of tetracarboxylic acid dianhydride (XI-1-1) and 18.5 g of dry NMP were added, and the mixture was stirred at room temperature for 24 hours. 10.0 g of BC was added to this reaction mixture to give a polyamic acid solution with a polymer solid content of 6% by weight. The polyamic acid solution was referred to as PAA1. The weight-average molecular weight of the polyamic acid included in PAA1 was 38,000.

Synthetic Examples 2 to 16

Polyamic acid solutions (PAA2) to (PAA16) with a polymer solid content of 6% by weight were prepared according to Synthetic Example 1 except that the type of tetracarboxylic acid dianhydrides and diamines were changed. Polyamic acid solutions (PAA1) to (PAA16) were referred to as component A. Table 4 summarizes the results.

TABLE 4

Preparation pf polyamic acids (PAA1) to (PAA16)

| Synthetic Examples No. | Polyamic acids No. | Starting materials of the Polyamic acids | | Weight average molecular weight |
|---|---|---|---|---|
| | | Tetracarboxylic acid dianhydrides (mol %) | Diamines (mol %) | |
| 1 | PAA1 | XI-1-1 (100) | DI-5-12 (m = 5) (100) | 38,000 |
| 2 | PAA2 | XI-1-1 (100) | DI-5-12 (m = 5) (50) DI-4-1 (50) | 42,000 |
| 3 | PAA3 | XI-1-2 (100) | DI-5-12 (m = 5) (100) | 41,500 |
| 4 | PAA4 | XI-1-2 (100) | DI-5-12 (m = 5) (50) DI-4-1 (50) | 35,250 |
| 5 | PAA5 | XI-1-3 (100) | DI-5-12 (m = 5) (100) | 45,650 |
| 6 | PAA6 | XI-1-3 (100) | DI-5-12 (m = 5) (50) DI-4-1 (50) | 40,420 |
| 7 | PAA7 | XI-1-5 (100) | DI-5-12 (m = 5) (100) | 41,100 |

TABLE 4-continued

Preparation pf polyamic acids (PAA1) to (PAA16)

| Synthetic Examples No. | Polyamic acids No. | Starting materials of the Polyamic acids | | Weight average molecular weight |
|---|---|---|---|---|
| | | Tetracarboxylic acid dianhydrides (mol %) | Diamines (mol %) | |
| 8 | PAA8 | XI-1-5 (100) | DI-5-12 (m = 5) (50) DI-4-1 (50) | 37,800 |
| 9 | PAA9 | XI-1-1 (100) | DI-5-12 (m = 5) (80) DI-4-d (20) | 45,200 |
| 10 | PAA10 | XI-1-5 (100) | DI-5-12 (m = 5) (80) DI-4-d (20) | 38,500 |
| 11 | PAA11 | XI-1-1 (100) | DI-4-1 (80) DI-4-d (20) | 42,000 |
| 12 | PAA12 | XI-1-5 (100) | DI-4-1 (80) DI-4-d (20) | 35,900 |
| 13 | PAA13 | XI-1-1 (100) | DI-5-28 (100) | 45,000 |
| 14 | PAA14 | XI-12 (100) | DI-5-28 (100) | 47,250 |
| 15 | PAA15 | AN-1-1 (100) | DI-5-28 (100) | 44,000 |
| 16 | PAA16 | XI-1-1 (100) | DI-5-12 (m = 2) (100) | 41,200 |

2. Preparation of polyamic acid ester solutions (component B

Synthetic Example 17

In a brown four-neck flask 50 mL equipped with a thermometer, a stirrer, an inlet for starting materials and a nitrogen gas inlet, 1.4725 g of diamine (DI-5-12, m=5), 18.5 g of dry NMP and 0.407 g of pyridine as a base were placed, and stirred to dissolve under a stream of dry nitrogen. Then, 1.5275 g of dimethyl 1,3-bis(chlorocarbonyl)-1,3-dimethyl-cyclobutane-2,4-dicarboxylate and 18.5 g of dry NMP were added, and the mixture was stirred under water-cooling for 6 hours. The pyridine was removed by distillation, and 10.0 g of NMP was added to this reaction mixture to give a polyamic acid ester solution with a polymer solid content of 6% by weight. The polyamic acid ester solution was referred to as PAE1. The weight-average molecular weight of the polyamic acid ester included in PAE1 was 11,000.

Synthetic Examples 18 to 27

Polyamic acid ester solutions (PAE2) to (PAE11) with a polymer solid content of 6% by weight were prepared according to Synthetic Example 17 except that the type of tetracarboxylic acid diester dichlorides and diamines were changed. Polyamic acid ester solutions (PAE2) to (PAE11) were referred to as component B. Table 5 summarizes the results.

TABLE 5

Preparation of polyamic acid esters (PAE1) to (PAE11)

| Synthetic Examples No. | Polyamic acid esters No. | Starting materials of the Polyamic acid esters | | Weight average molecular weight |
|---|---|---|---|---|
| | | Tetracarboxylic acid diester dichlorides[1] [2] (mol %) | Diamines (mol %) | |
| 17 | PAE1 | Compound (d-2) (100) | DI-5-12 (m = 5) (100) | 11,000 |
| 18 | PAE2 | Compound (d-2) (100) | DI-5-12 (m = 5) (50) DI-4-1 (50) | 11,250 |
| 19 | PAE3 | Compound (d-2) (100) | DI-4-1 (100) | 12,050 |
| 20 | PAE4 | Compound (d-1) (100) | DI-5-12 (m = 5) (100) | 10,200 |
| 21 | PAE5 | Compound (d-1) (100) | DI-5-12 (m = 5) (50) DI-4-1 (50) | 9,800 |
| 22 | PAE6 | Compound (d-1) (100) | DI-4-1 (100) | 10,500 |
| 23 | PAE7 | Compound (d-2) (100) | DI-4-10 (50) DI-4-1 (50) | 10,700 |
| 24 | PAE8 | Compound (d-2) (100) | DI-5-12 (m = 2) (100) | 11,050 |
| 25 | PAE9 | Compound (d-2) (100) | DI-5-12 (m = 5) (70) DI-4-1 (30) | 12,040 |
| 26 | PAE10 | Compound (d-1) (100) | DI-5-12 (m = 2) (100) | 10,030 |
| 27 | PAE11 | Compound (d-1) (100) | DI-5-12 (m = 2) (70) DI-4-1 (30) | 9,900 |

[1] Compound (d-1): Dimethyl 1,3-bis(chlorocarbonyl)cyclobutan-2,4-dicarboxylate

[2] Compound (d-2): Dimethyl 1,3-bis(chlorocarbonyl)-1,3-dimethylcyclobutan-2,4-dicarboxylate

Example 1

Formation of an Alignment Film from the Polyamic Acid

A mixed solvent of NMP/BC=4/1 (ratio by weight) was added to polyamic acid solution (PAA1) with a polymer solid content of 6% by weight prepared in Synthetic Example 1 to give the liquid crystal aligning agent with a polymer solid content of 4% by weight. The liquid crystal aligning agent was applied to a glass substrate with a column spacer and a glass substrate with an ITO electrode, with a spinner (a spin coater 1H-DX2 made by Mikasa Co., Ltd). Incidentally, the film thickness described below was adjusted by changing the rotating rate of the spinner according to the viscosity of liquid crystal aligning agents, which was applied to the following Examples and Comparative Examples. The coating film was heated and dried at 70° C. for 80 seconds on a hot-plate (an EC hot-plate EC-1200N made by As One Corporation). Then, the coating film was heated at 230° C. for 20 minutes in a clean oven (a clean oven PVHC-231 made by Espec Corporation) to form an alignment film with film thickness of 100±10 nm. The film on the substrate was vertically irradiated with linearly polarized ultraviolet light via a polarizing plate using Multilight ML-501C/B made by Ushio, Inc. The amount of light was measured with an accumulated UV meter UIT-150 (receiver UVD-5365) made by Ushio, Inc. and the exposure energy was adjusted to be 0.5±0.1 J/cm$^2$ at a wavelength of 254 nm by changing the exposure time. After irradiation, the substrate was immersed in ethyl lactate for 3 minutes, and in hyperpure water for 1 minute, and dried at 200° C. for 10 minutes in the clean oven.

Production of Devices

An FFS device was assembled in which two substrates were pasted together, the surfaces of the alignment films were inside, and the directions of linearly polarized ultraviolet light were parallel, and the distance between the substrates was 4 micrometers. An injection inlet for liquid crystals was located at a position where the flow direction of liquid crystals was roughly parallel to the linearly polarized ultraviolet light. The liquid crystal composition in Composition Example M1 was injected to this FFS device, and the response time and the flicker rate were measured. Table 6 summarizes the results. Incidentally, the liquid crystal composition in Composition Example M1 is abbreviated to "Composition M1". The same rule applies to other liquid crystal compositions.

Examples 2 to 13

A mixed solvent of NMP/BC=4/1 (ratio by weight) was added to each of polyamic acid solutions (PAA2) to (PAA12), prepared in Synthetic Examples 2 to 12 and Synthetic Example 16, with a polymer solid content of 6% by weight to give a liquid crystal aligning agent with a polymer solid content of 4% by weight. The device was produced in a similar manner, and the response time and the flicker rate were measured. Table 6 summarizes the results.

TABLE 6

Response time and Flicker rate (Part 1)

| Examples No. | Polyamic acids No. | Compositions No. | Response time (ms) | Flicker rate (%) |
|---|---|---|---|---|
| 1 | PAA1 | M1 | 20.2 | 0.41 |
| 2 | PAA2 | M2 | 35.3 | 0.42 |
| 3 | PAA3 | M3 | 21.7 | 0.26 |
| 4 | PAA4 | M4 | 26.1 | 0.04 |
| 5 | PAA5 | M5 | 35.2 | 0.69 |
| 6 | PAA6 | M6 | 30.9 | 0.30 |
| 7 | PAA7 | M8 | 19.3 | 0.32 |
| 8 | PAA8 | M9 | 20.1 | 0.33 |
| 9 | PAA9 | M10 | 24.1 | 0.16 |
| 10 | PAA10 | M11 | 42.1 | 0.14 |
| 11 | PAA11 | M12 | 26.8 | 0.21 |
| 12 | PAA12 | M13 | 17.0 | 0.57 |
| 13 | PAA16 | M14 | 22.9 | 0.24 |

Example 14

Formation of Alignment Films from the Polyamic Acid and the Polyamic Acid Ester

Polyamic acid solution (PAA13) with a polymer solid content of 6% by weight, which is prepared in Synthetic Example 13, and polyamic acid ester solution (PAE1) with a polymer solid content of 6% by weight, which is prepared in Synthetic Example 17, were mixed in the ratio of 7 to 3. A mixed solvent of NMP/BC=4/1 (weight ratio) was added to the mixture to give a liquid crystal aligning agent with a polymer solid content of 4% by weight. The liquid crystal aligning agent was applied to a glass substrate with a column spacer and a glass substrate with an ITO electrode, with a spinner (a spin coater 1H-DX2 made by Mikasa Co., Ltd). Incidentally, the film thickness described below was adjusted by changing the rotating rate of the spinner according to the viscosity of liquid crystal aligning agents, which was applied to the following Examples and Comparative Examples. The coating film was heated and dried at 70° C. for 80 seconds on a hot-plate (an EC hot-plate EC-1200N made by As One Corporation). Then, the coating film was heated at 230° C. for 20 minutes in a clean oven (a clean oven PVHC-231 made by Espec Corporation) to form an alignment film with film thickness of 100±10 nm. The substrate was vertically irradiated with linearly polarized ultraviolet light via a polarizing plate using Multilight ML-501C/B made by Ushio, Inc. The amount of light was measured with an accumulated UV meter UIT-150 (receiver UVD-S365) made by Ushio, Inc. and the exposure energy was adjusted to be 0.5±0.1 J/cm$^2$ at a wavelength of 254 nm by changing the exposure time. After irradiation, the substrate was immersed in ethyl lactate for 3 minutes, and in hyperpure water for 1 minute, and dried at 200° C. for 10 minutes in the clean oven.

Production of Devices

An FFS device was assembled in which two substrates were pasted together, the surfaces of the alignment films were inside, and the directions of linearly polarized ultraviolet light were parallel, and the distance between the substrates was 4 micrometers. An injection inlet for liquid crystals was located at a position where the flow direction of liquid crystals was roughly parallel to the linearly polarized ultraviolet light. The liquid crystal composition in Composition Example M1 was injected to this FFS device, and the response time and the flicker rate were measured. Table 7 summarizes the results. Incidentally, the liquid crystal composition in Composition Example M1 is abbreviated to "Composition M1". The same rule applies to other liquid crystal compositions.

Examples 15 to 49

Component A was mixed with component B in a manner similar to that in Example 14, and a device was produced in a similar manner. The response time and the flicker rate were measured. Table 7 summarizes the results.

TABLE 7

Response time and Flicker rate (Part 2)

| Examples No. | Aligning agents No. | Starting materials of the Aligning agents | | Compositions No. | Characteristics | |
|---|---|---|---|---|---|---|
| | | Component A (% by weight) | Component B (% by weight) | | Response time (ms) | Flicker rate (%) |
| 14 | PA1 | PAA13 (70) | PAE1 (30) | M1 | 20.1 | 0.34 |
| 15 | PA2 | PAA13 (70) | PAE2 (30) | M2 | 34.9 | 0.33 |
| 16 | PA3 | PAA13 (70) | PAE3 (30) | M3 | 21.5 | 0.20 |
| 17 | PA4 | PAA13 (70) | PAE4 (30) | M4 | 25.4 | 0.02 |
| 18 | PA5 | PAA13 (70) | PAE5 (30) | M5 | 34.8 | 0.56 |
| 19 | PA6 | PAA13 (70) | PAE6 (30) | M6 | 31.1 | 0.24 |
| 20 | PA7 | PAA13 (70) | PAE7 (30) | M9 | 20.5 | 0.25 |
| 21 | PA8 | PAA13 (70) | PAE8 (30) | M10 | 24.4 | 0.13 |
| 22 | PA9 | PAA13 (70) | PAE9 (30) | M11 | 42.2 | 0.12 |
| 23 | PA10 | PAA13 (70) | PAE10 (30) | M13 | 16.8 | 0.46 |
| 24 | PA11 | PAA13 (70) | PAE11 (30) | M14 | 23.0 | 0.19 |
| 25 | PA12 | PAA14 (70) | PAE1 (30) | M1 | 20.4 | 0.31 |
| 26 | PA13 | PAA14 (70) | PAE2 (30) | M2 | 35.4 | 0.29 |
| 27 | PA14 | PAA14 (70) | PAE3 (30) | M3 | 21.6 | 0.21 |
| 28 | PA15 | PAA14 (70) | PAE4 (30) | M4 | 25.2 | 0.03 |
| 29 | PA16 | PAA14 (70) | PAE5 (30) | M5 | 34.6 | 0.57 |
| 30 | PA17 | PAA14 (70) | PAE6 (30) | M6 | 30.9 | 0.21 |
| 31 | PA18 | PAA14 (70) | PAE7 (30) | M9 | 20.7 | 0.24 |
| 32 | PA19 | PAA14 (70) | PAE8 (30) | M10 | 24.8 | 0.14 |
| 33 | PA20 | PAA14 (70) | PAE9 (30) | M11 | 41.9 | 0.11 |
| 34 | PA21 | PAA14 (70) | PAE10 (30) | M13 | 17.2 | 0.45 |
| 35 | PA22 | PAA14 (70) | PAE11 (30) | M14 | 23.3 | 0.20 |
| 36 | PA23 | PAA15 (70) | PAE1 (30) | M1 | 19.9 | 0.34 |
| 37 | PA24 | PAA15 (70) | PAE2 (30) | M2 | 35.1 | 0.36 |
| 38 | PA25 | PAA15 (70) | PAE3 (30) | M3 | 21.3 | 0.21 |
| 39 | PA26 | PAA15 (70) | PAE4 (30) | M4 | 25.7 | 0.04 |
| 40 | PA27 | PAA15 (70) | PAE5 (30) | M5 | 34.5 | 0.59 |
| 41 | PA28 | PAA15 (70) | PAE6 (30) | M6 | 31.7 | 0.26 |
| 42 | PA29 | PAA15 (70) | PAE7 (30) | M9 | 20.1 | 0.23 |
| 43 | PA30 | PAA15 (70) | PAE8 (30) | M10 | 24.6 | 0.15 |
| 44 | PA31 | PAA15 (70) | PAE9 (30) | M11 | 41.8 | 0.10 |
| 45 | PA32 | PAA15 (70) | PAE10 (30) | M13 | 17.2 | 0.49 |
| 46 | PA33 | PAA15 (70) | PAE11 (30) | M14 | 23.0 | 0.22 |
| 47 | PA34 | PAA13 (80) | PAE8 (20) | M7 | 22.9 | 0.61 |
| 48 | PA35 | PAA14 (80) | PAE8 (20) | M8 | 18.7 | 0.27 |
| 49 | PA36 | PAA15 (80) | PAE8 (20) | M12 | 26.9 | 0.18 |

In the third column of Table 6 and the fifth column of Table 7, the type of compositions injected to the FFS devices is described. These are the liquid crystal compositions prepared in Composition Example M1 to Composition Example M14. In these compositions, the maximum temperature (NI) is in the range of 70.0° C. to 117.6° C. The minimum temperature (Tc) is in the range of <−10° C. to <−30° C. The optical anisotropy (Δn) is in the range of 0.095 to 0.129. The dielectric anisotropy (Δ∈) is in the range of 3.1 to 15.9. The viscosity (η) is in the range of 10.2 mPa·s to 25.5 mPa·s. Fourteen liquid crystal compositions with different types of characteristics were injected to a liquid crystal display device with different types of alignment films, and then the response time and flicker rate of the device were measured.

In a liquid crystal display device, a shorter response time is desirable. The response time is preferably 60 ms or less, and more preferably 40 ms or less. A smaller flicker rate is desirable. The flicker rate is preferably 2% or less, and more preferably 1% or less. The response time in Examples 1 to 49 was in the range of 16.8 ms to 42.2 ms and the flicker rate was in the range of 0.02% to 0.69%. These values fell within the more desirable ranges. From these results, we now conclude that the values of the response time and the flicker rate came within such a suitable range, although the types of components in the liquid crystal compositions and the alignment films were quite different. This is the first feature of the invention that is worthy of special mention. In the devices in Examples 5, 12, 18, 29, 40 and 47, the flicker rates were 0.5% or more. The response time of these devices were 35.2 ms, 17.0 ms, 34.8 ms, 34.6 ms, 34.5 ms and 22.9 ms, respectively. These findings shows that the flicker rate is small even in the devices that have short response time. This is the second feature of the invention that is worthy of special mention.

INDUSTRIAL APPLICABILITY

The liquid crystal display device of the invention has characteristics such as a short response time, a large voltage holding ratio, a low threshold voltage, a large contrast ratio, a long service life and a small flicker rate. The device thus can be used for a liquid crystal projector, a liquid crystal television and so forth.

What is claimed is:

1. A liquid crystal display device having an electrode group formed on one or both of a pair of substrates that are opposed to each other, and a plurality of active devices connected to the electrode group, and a liquid crystal alignment film formed on the opposing surfaces of the pair of substrates, and a liquid crystal composition sandwiched in between the pair of substrates, wherein the liquid crystal alignment film comprises a polymer derived from a polyamic acid having a photodegradable group and gains, by photoirradiation that photodegrades the photodegradable group, ability for orientation of liquid crystals so that the polymer has a group formed through the photodegradation of the photodegradable group, and the liquid crystal composition comprises at least one compound represented by formula (1) as a first component:

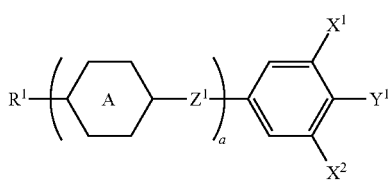
(1)

in formula (1), $R^1$ is alkyl having 1 to 12 carbons, alkoxy having 1 to 12 carbons or alkenyl having 2 to 12 carbons; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine or alkenyloxy having 2 to 12 carbons in which at least one hydrogen has been replaced by fluorine or chlorine; and a is 1, 2, 3 or 4, wherein the photodegradable group is selected from the group of groups represented by formula (XI-1) to formula (XI-16):

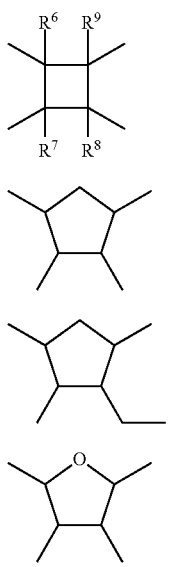

(XI-1)

(XI-2)

(XI-3)

(XI-4)

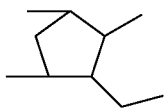
(XI-5)

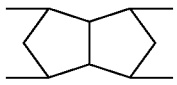
(XI-6)

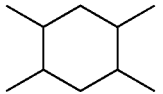
(XI-7)

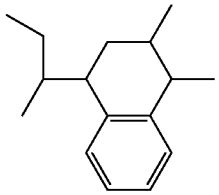
(XI-8)

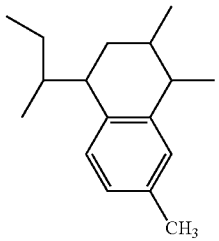
(XI-9)

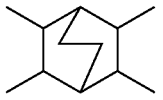
(XI-10)

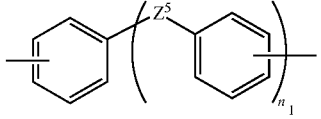
(XI-11)

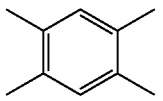
(XI-12)

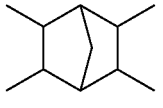
(XI-13)

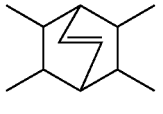
(XI-14)

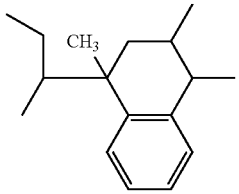
(XI-15)

-continued

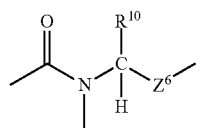
(XI-16)

in formula (XI-1) to formula (XI-16), $R^6$, $R^7$, $R^8$ and $R^9$ are independently hydrogen, halogen, alkyl having 1 to 6 carbons, alkenyl having 2 to 6 carbons, alkynyl having 2 to 6 carbons or phenyl; $R^{10}$ is hydrogen, alkyl having 1 to 10 carbons or cycloalkyl having 3 to 10 carbons; $n_1$ is an integer from 1 to 4; when $n_1$ is 1, $Z^5$ is —SCH$_2$—, and when $n_1$ is 2, 3 or 4, $Z^5$ is a single bond, —SCH$_2$— or —CH$_2$S—, with the proviso that at least one of $Z^5$ is —SCH$_2$— or —CH$_2$S—; and $Z^6$ is a group comprising an aromatic ring.

2. The liquid crystal display device according to claim 1, wherein the first component is at least one compound selected from the group of compounds represented by formula (1-1) to formula (1-35):

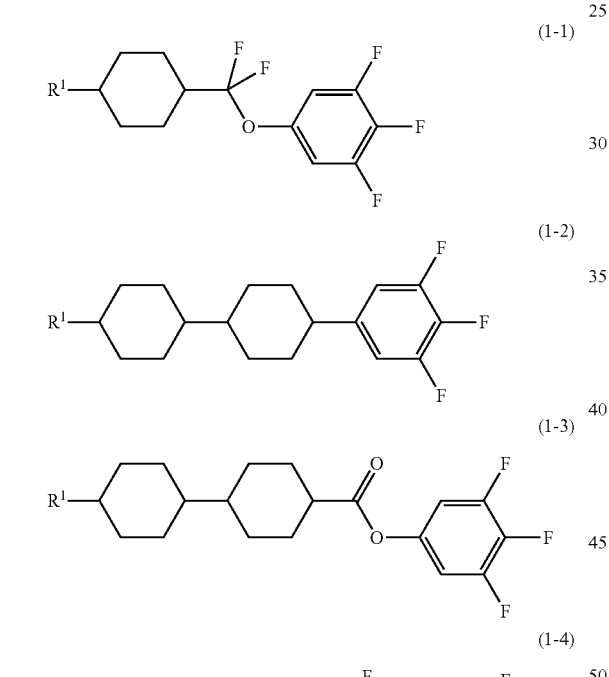
(1-1)

(1-2)

(1-3)

(1-4)

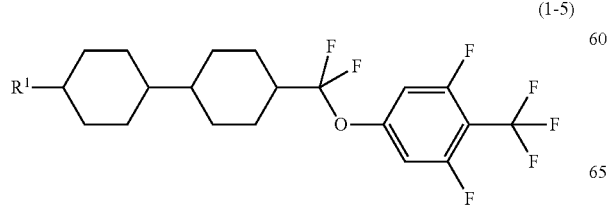
(1-5)

-continued

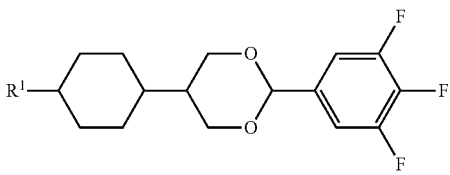
(1-6)

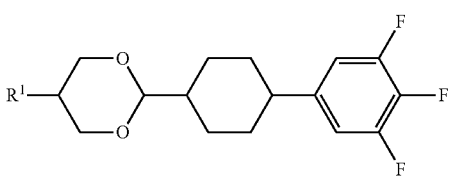
(1-7)

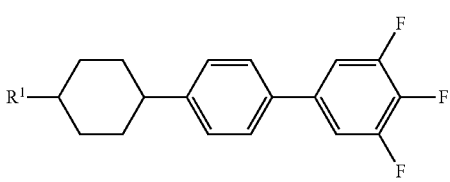
(1-8)

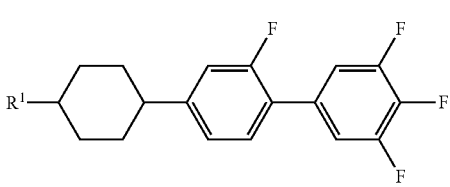
(1-9)

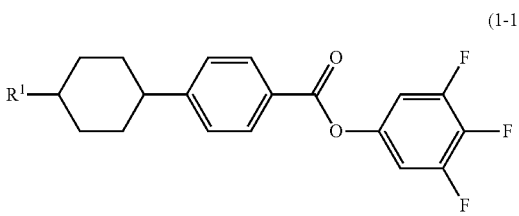
(1-10)

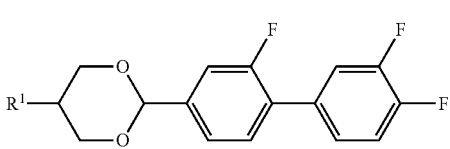
(1-11)

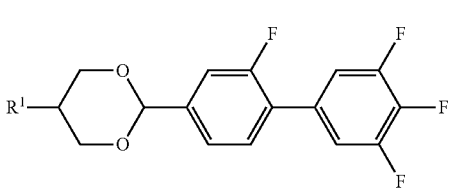
(1-12)

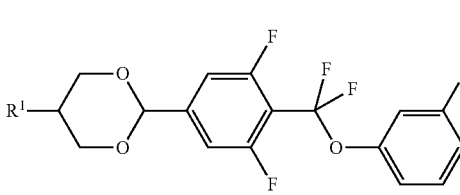
(1-13)

(1-14)
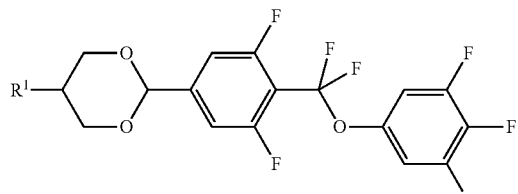
(1-15)
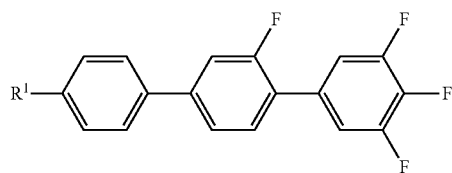
(1-16)
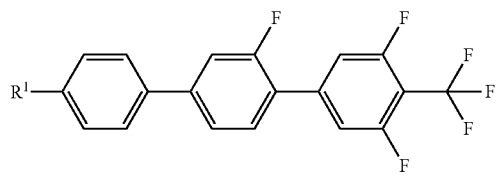
(1-17)
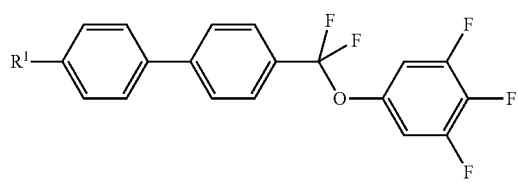
(1-18)
(1-19)
(1-20)
(1-21)
(1-22)
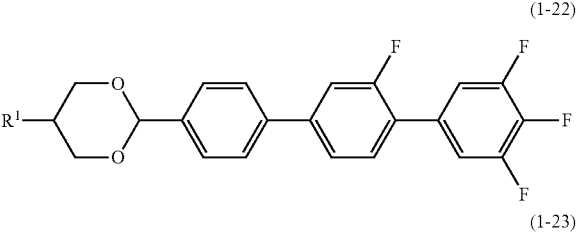
(1-23)
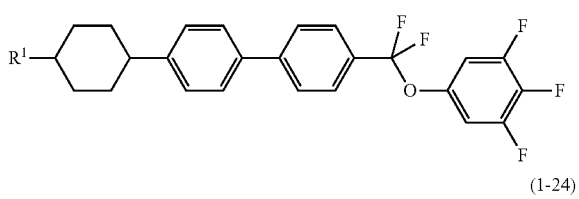
(1-24)
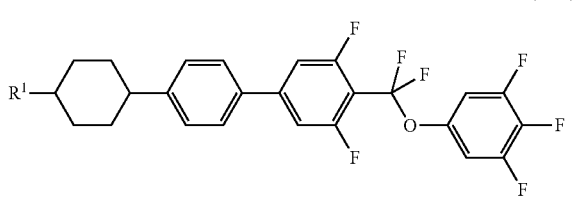
(1-25)
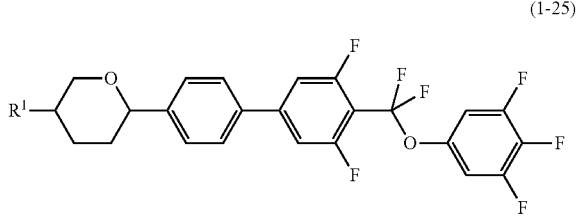
(1-26)
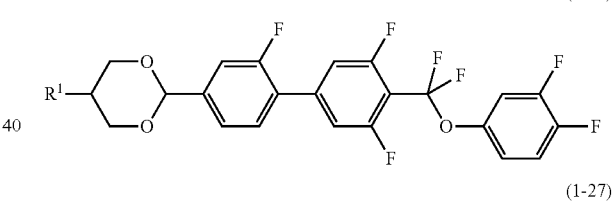
(1-27)
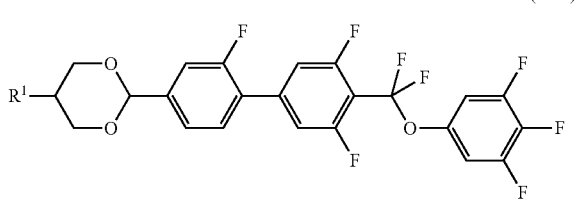
(1-28)
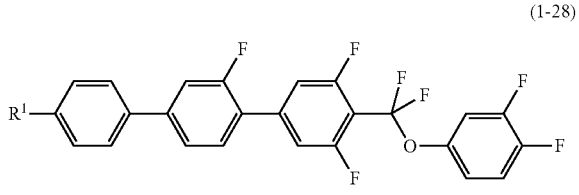
(1-29)
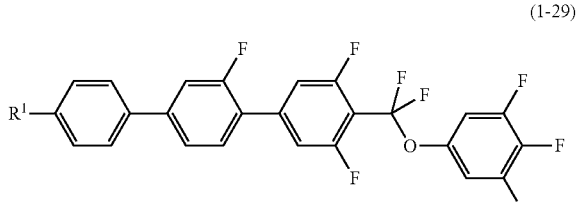

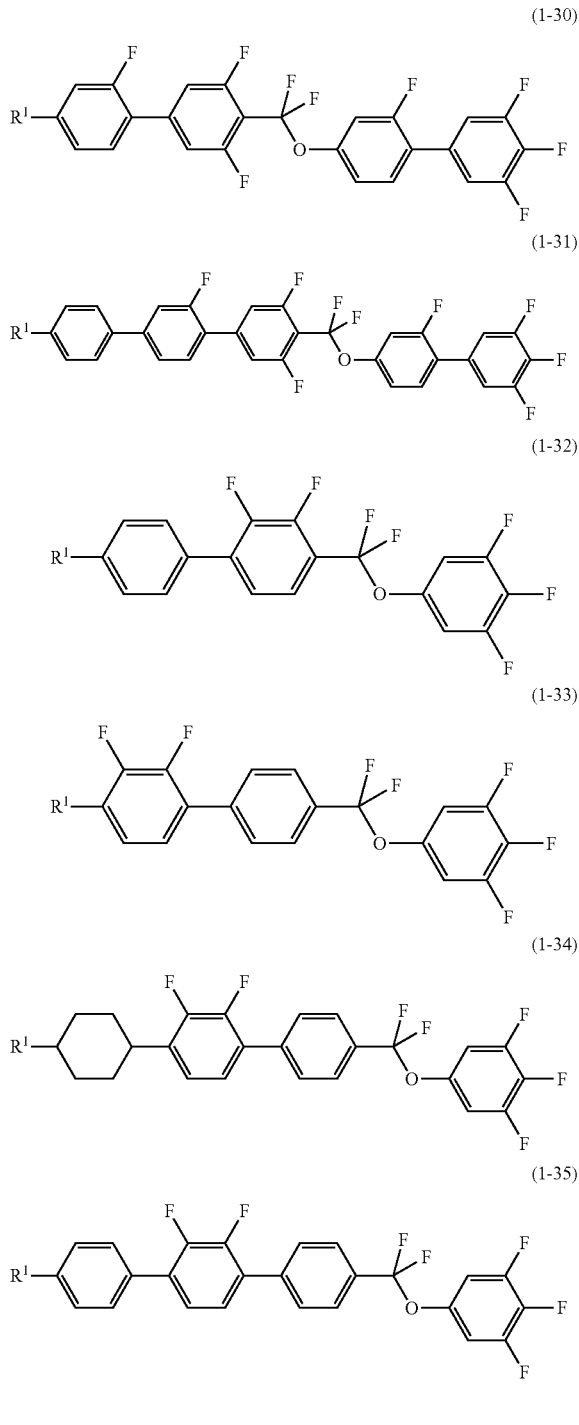

in formula (1-1) to formula (1-35), $R^1$ is alkyl having 1 to 12 carbons, alkoxy having 1 to 12 carbons or alkenyl having 2 to 12 carbons.

3. The liquid crystal display device according to claim 1, wherein the ratio of the first component is in the range of 10% by weight to 90% by weight based on the weight of the liquid crystal composition.

4. The liquid crystal display device according to claim 1, wherein the liquid crystal composition comprises at least one compound selected from the group of compounds represented by formula (2) as a second component:

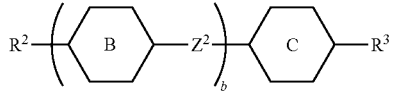

in formula (2), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine or alkenyl having 2 to 12 carbons in which at least one hydrogen has been replaced by fluorine or chlorine; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; and b is 1, 2 or 3.

5. The liquid crystal display device according to claim 4, wherein the second component is at least one compound selected from the group of compounds represented by formula (2-1) to formula (2-13):

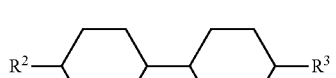

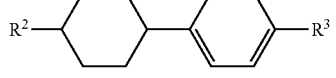

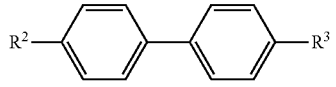

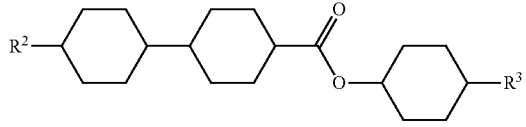

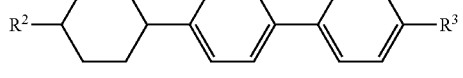

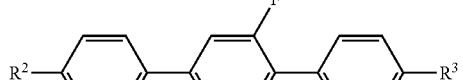

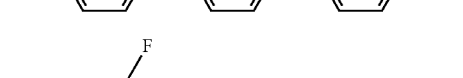

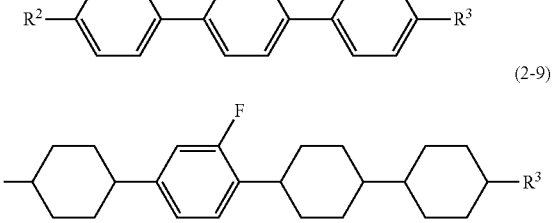

(2-10)
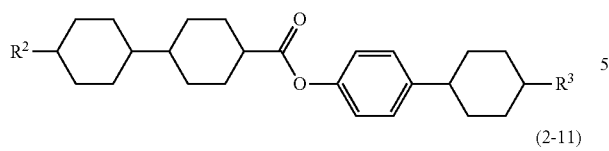

(2-11)
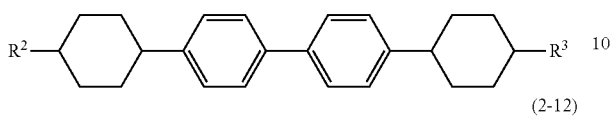

(2-12)
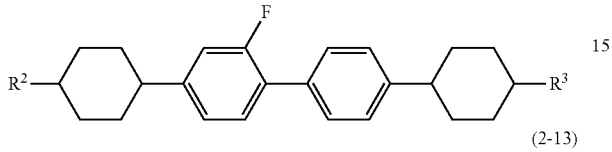

(2-13)
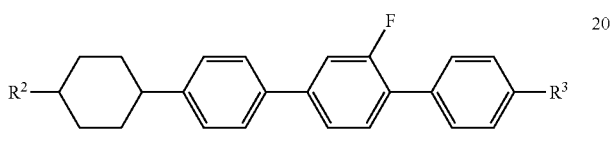

in formula (2-1) to formula (2-13), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine or alkenyl having 2 to 12 carbons in which at least one hydrogen has been replaced by fluorine or chlorine.

6. The liquid crystal display device according to claim 4, wherein the ratio of the second component is in the range of 10% by weight to 90% by weight based on the weight of the liquid crystal composition.

7. The liquid crystal display device according to claim 1, wherein the liquid crystal composition comprises at least one compound selected from the group of compounds represented by formula (31 as a third component:

(3)
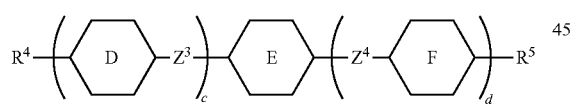

in formula (3), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine; ring D and ring F are independently 1,4-cyclohexylene, 1,4-cyclohexylene, 1,4-phenylene, 1,4-phenylene in which at least one hydrogen has been replaced by fluorine or chlorine or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, d is 0 or 1; and the sum of c and d is 3 or less.

8. The liquid crystal display device according to claim 7, wherein the third component is at least one compound selected from the group of compounds represented by formula (3-1) to formula (3-21):

(3-1)
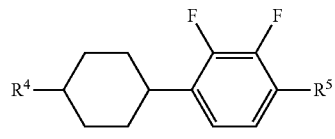

(3-2)
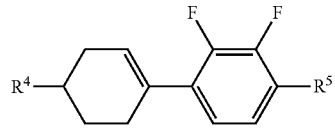

(3-3)
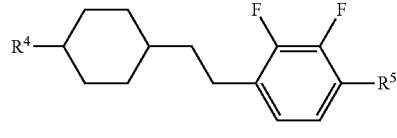

(3-4)
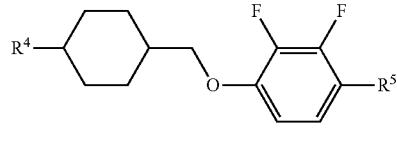

(3-5)
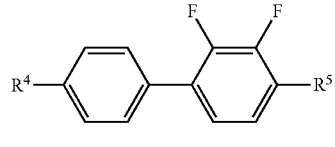

(3-6)
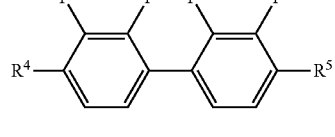

(3-7)
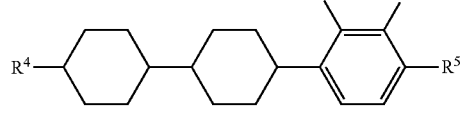

(3-8)
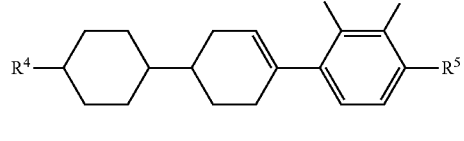

(3-9)
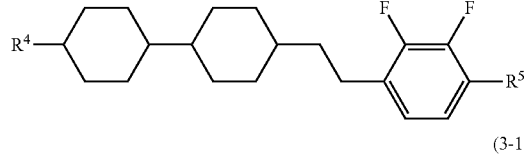

(3-10)
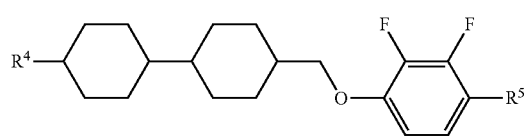

(3-11)
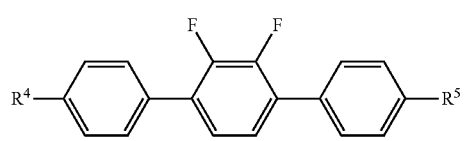

-continued

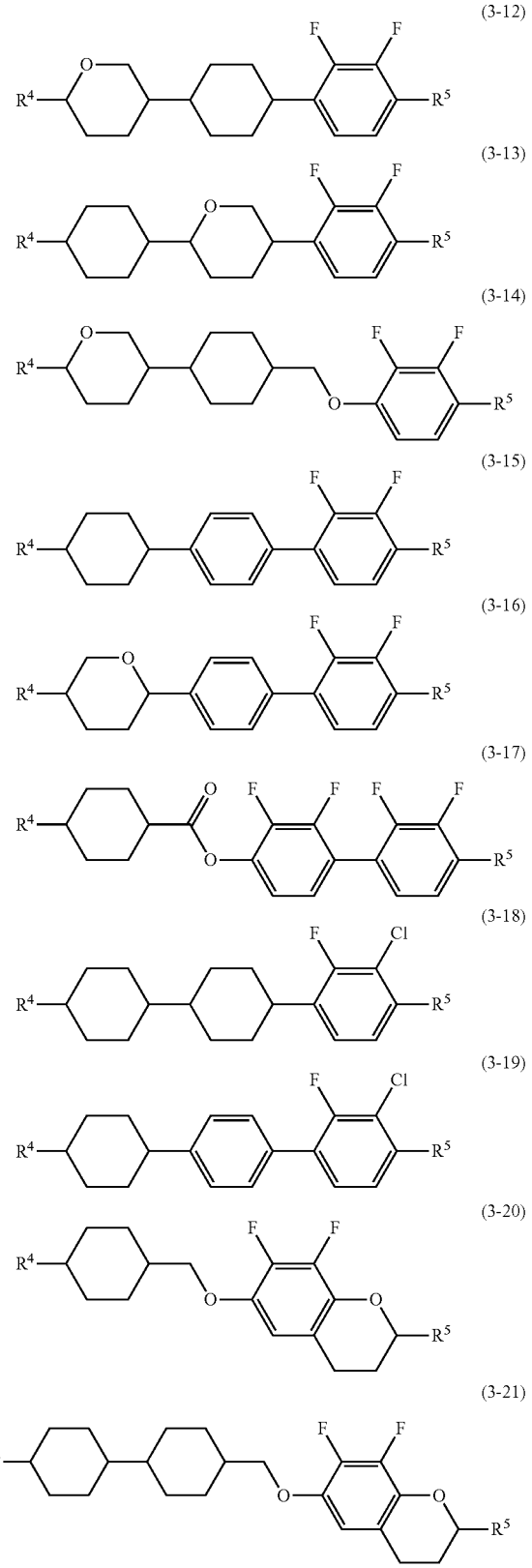

in formula (3-1) to formula (3-21), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine.

9. The liquid crystal display device according to claim 7, wherein the ratio of the third component is in the range of 3% by weight to 30% by weight based on the weight of the liquid crystal composition.

10. The liquid crystal display device according to claim 1, wherein the liquid crystal alignment film comprises a polymer derived by further using at least one compound selected from the group of compounds represented by formula (DI-1) to formula (DI-15):

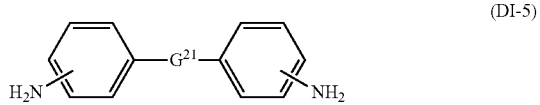

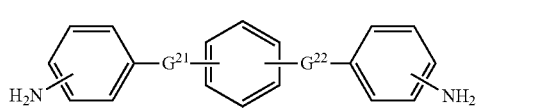

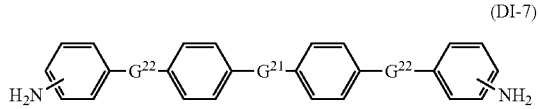

in formula (DI-1) to formula (DI-7), k is an integer from 1 to 12; $G^{21}$ is a single bond, —NH—, —O—, —S—, —S—S—, —SO$_2$—, —CO—, —CONH—, —CON(CH$_3$)—, —NHCO—, —C(CH$_3$)$_2$—, —C(CF$_3$)$_2$—, —(CH$_2$)$_m$—, —O—(CH$_2$)—, —O—, —N(CH$_3$)—, —(CH$_2$)$_n$—N(CH$_3$)—, —COO—, —COS— or —S—(CH$_2$)$_m$—S—; m is an integer from 1 to 12; n is an integer from 1 to 5; $G^{22}$ is a single bond, —O—, —S—, —CO—, —C(CH$_3$)$_2$—, —C(CF$_3$)$_2$— or alkylene having 1 to 10 carbons; at least one hydrogen on the cyclohexane ring or the benzene ring may be replaced by fluorine, —CH$_3$, —OH, —CF$_3$, —CO$_2$H, —CONH$_2$ or benzyl, and in formula (DI-4), at least one hydrogen on the benzene ring may be replaced by the following monovalent group represented by formula (DI-4-a) to formula (DI-4-d);

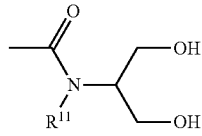

(DI-4-b)

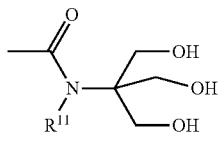

(DI-4-c)

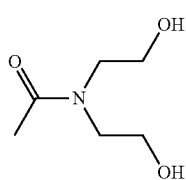

(DI-4-d)

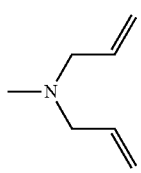

$R^{11}$ is hydrogen or —$CH_3$; and a group can be bonded to any one of carbon atoms constituting a ring when the bonding position of the group is not fixed to any one of the carbon atoms, and —$NH_2$ is bonded to any one of the bonding positions on a cyclohexane ring or a benzene ring excluding the bonding position of $G^{21}$ or $G^{22}$; and (DI-8)

$$H_2N\!-\!G^{23}\!-\!\!\left(\!\!\begin{array}{c}R^{12}\\ |\\ Si\!-\!O\\ |\\ R^{13}\end{array}\!\!\right)_{\!\!p}\!\!\begin{array}{c}R^{12}\\ |\\ Si\!-\!G^{23}\!-\!NH_2\\ |\\ R^{13}\end{array}$$

(DI-9)

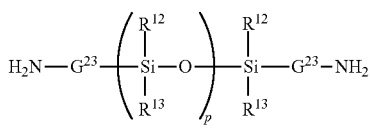

(DI-10)

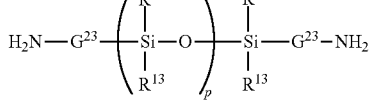

(DI-11)

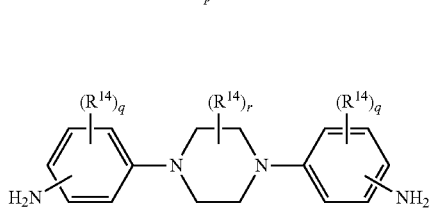

(DI-12)

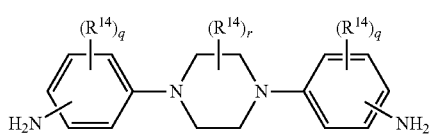

in formula (DI-8) to formula (DI-12), $R^{12}$ and $R^{13}$ are independently alkyl having 1 to 3 carbons or phenyl; $G^{23}$ is alkylene having 1 to 6 carbons, phenylene or phenylene in which at least one hydrogen has been replaced by alkyl; p is an integer from 1 to 10; $R^{14}$ is alkyl having 1 to 5 carbons, alkoxy having 1 to 5 carbons or chlorine; q is an integer from 0 to 3; r is an integer from 0 to 4; $R^{15}$ is hydrogen, alkyl having 1 to 4 carbons, phenyl or benzyl; $G^{24}$ is —$CH_2$— or —NH—; $G^{25}$ is a single bond, alkylene having 2 to 6 carbons or 1,4-phenylene; s is 0 or 1; a group can be bonded to any one of carbon atoms constituting a ring when the bonding position of the group is not fixed to any one of the carbon atoms; and —$NH_2$ is bonded to any one of the bonding positions on a benzene ring; and (DI-13)

$$H_2N\underset{H}{\overset{}{\diagdown}}N\underset{}{\overset{O}{\diagdown}}\!\!-\!\!G^{31}\!\!-\!\!\underset{}{\overset{O}{\diagdown}}N\underset{H}{\overset{}{\diagdown}}NH_2$$

(DI-14)

$$H_2N\underset{H}{\overset{}{\diagdown}}N\underset{}{\overset{O}{\diagdown}}\!\!-\!\!(K)\!\!-\!\!\underset{}{\overset{O}{\diagdown}}N\underset{H}{\overset{}{\diagdown}}NH_2$$

(DI-15)

$$H_2N\underset{H}{\overset{}{\diagdown}}N\underset{}{\overset{O}{\diagdown}}\!\!-\!\!(L)\!\!-\!\!G^{31}\!\!-\!\!(L)\!\!-\!\!\underset{}{\overset{O}{\diagdown}}N\underset{H}{\overset{}{\diagdown}}NH_2$$

in formula (DI-13) to formula (DI-15), $G^{31}$ is a single bond, alkylene having 1 to 20 carbons, —CO—, —O—, —S—, —$SO_2$—, —$C(CH_3)_2$— or —$C(CF_3)_2$—; ring K is a cyclohexane ring, a benzene ring or a naphthalene ring, and in these groups at least one hydrogen may be replaced by methyl, ethyl or phenyl; and ring L is a cyclohexane ring or a benzene ring, and in these groups at least one hydrogen may be replaced by methyl, ethyl or phenyl.

11. The liquid crystal display device according to claim 1, wherein the liquid crystal alignment film comprises a polymer derived by further using a compound selected from the group of compounds represented by formula (DI-1-3), formula (DI-4-1), formula (DI-5-1), formula (DI-5-5), formula (DI-5-9), formula (DI-5-12), formula (DI-5-22), formula (DI-5-28), formula (DI-5-30), formula (DI-5-31), formula (DI-7-3), formula (DI-9-1), formula (DI-13-1), formula (DI-13-2), formula (DI-14-1) and formula (DI-14-2):

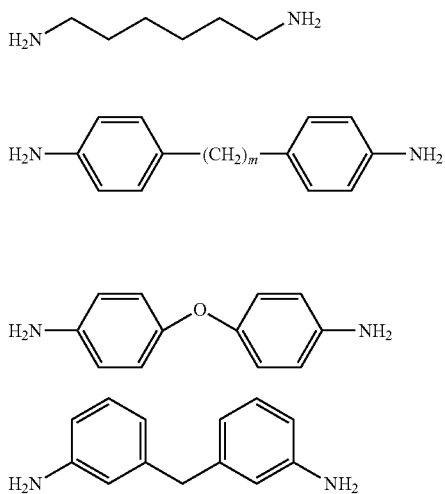
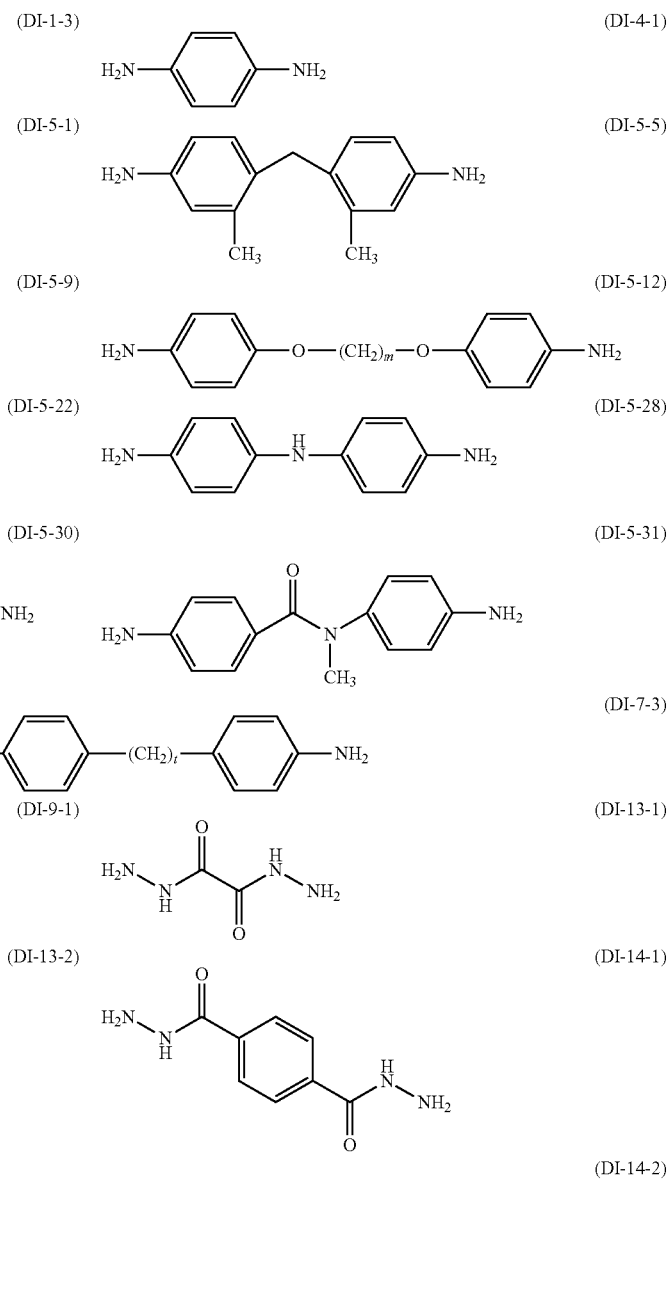

in formula (DI-1-3), formula (DI-4-1), formula (DI-5-1), formula (DI-5-5), formula (DI-5-9), formula (DI-5-12), formula (DI-5-22), formula (DI-5-28), formula (DI-5-30), formula (DI-5-31), formula (DI-7-3), formula (DI-9-1), formula (DI-13-1), formula (DI-13-2), formula (DI-14-1) and formula (DI-14-2), m is an integer from 1 to 12; n is an integer from 1 to 5; and t is 1 or 2.

12. The liquid crystal display device according to claim 1, wherein the operating mode of the liquid crystal display device is a TN mode, an ECB mode, an OCB mode, an IPS mode, an FFS mode, a PSA mode, or an FPA mode, and the driving mode of the liquid crystal display device is an active matrix mode.

13. A liquid crystal composition used for the liquid crystal display device according to claim 1.

14. The liquid crystal composition according to claim 13, wherein at 25° C., the elastic constant (K) is 13 pN or more and the ratio of the elastic constant (K) to the viscosity (n) is 0.8 nN/Pa·s (nm$^2$/s) or more.

15. A liquid crystal display device, wherein the device comprises the liquid crystal composition according to claim 14, and the flicker rate at 25° C. is in the range of 0% to 1%.

16. A liquid crystal alignment film used for the liquid crystal display device according to claim 1.

17. The liquid crystal alignment film according to claim 16, wherein the volume resistivity (p) at 25° C. is $1.0 \times 10^{14}$ Ωcm or more.

18. The liquid crystal alignment film according to claim 16, wherein the dielectric constant (c) at 25° C. is in the range of 3 to 5.

19. The liquid crystal display device according to claim 4, wherein the liquid crystal composition comprises at least one compound selected from the group of compounds represented by formula (3) as a third component:

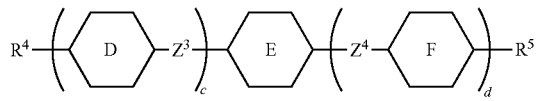

in formula (3), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by fluorine or chlorine; ring D and ring F are independently 1,4-cyclohexylene, 1,4-cyclohexylene, 1,4-phenylene, 1,4-phenylene in which at least one hydrogen has been replaced by fluorine or chlorine or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, d is 0 or 1; and the sum of c and d is 3 or less.

* * * * *